United States Patent
Moore

(10) Patent No.: US 11,568,068 B2
(45) Date of Patent: *Jan. 31, 2023

(54) IMPLEMENTATION OF A FILE SYSTEM ON A BLOCK CHAIN

(71) Applicant: SpiderOak, Inc., Lenexa, KS (US)

(72) Inventor: Jonathan Andrew Crockett Moore, Portland, OR (US)

(73) Assignee: SpiderOak, Inc., Lenexa, KS (US)

(*) Notice: Subject to any disclaimer, the term of this patent is extended or adjusted under 35 U.S.C. 154(b) by 5 days.

This patent is subject to a terminal disclaimer.

(21) Appl. No.: 17/359,252

(22) Filed: Jun. 25, 2021

(65) Prior Publication Data

US 2022/0058284 A1   Feb. 24, 2022

Related U.S. Application Data

(63) Continuation of application No. 17/180,442, filed on Feb. 19, 2021, now Pat. No. 11,087,016.

(Continued)

(51) Int. Cl.
*G06F 21/60*   (2013.01)
*G06F 21/31*   (2013.01)
(Continued)

(52) U.S. Cl.
CPC ............ *G06F 21/604* (2013.01); *G06F 21/31* (2013.01); *G06F 21/57* (2013.01); *G06F 21/602* (2013.01);
(Continued)

(58) Field of Classification Search
CPC ........ G06F 21/604; G06F 21/31; G06F 21/57; G06F 21/602; G06F 21/6218;
(Continued)

(56) References Cited

U.S. PATENT DOCUMENTS 7,280,956 B2   10/2007   Cross et al.
9,935,772 B1   4/2018   Madisetti et al.
(Continued)

FOREIGN PATENT DOCUMENTS

EP   3879749 A1   9/2021

OTHER PUBLICATIONS

Abraham, Ittai "Dont Trust. Verify. and Checkpoint?" Sep. 13, 2019, p. 1-3.*

(Continued)

*Primary Examiner* — Christopher A Revak
(74) *Attorney, Agent, or Firm* — Perkins Coie LLP

(57) ABSTRACT

Disclosed is a system to efficiently compute validity of a block chain controlling access to an encrypted data. The block chain defines user permissions to access the encrypted data. The system creates a computational checkpoint proving a validity of the block chain based on the user permissions defined in the block chain. The system performs an expensive computation from an initial block in the block chain to a last block in the block chain, wherein the expensive computation validates each block between the initial block and the last block. The system creates a proof of the validity of the block chain based on the expensive computation and stores the proof after the last block in the block chain. The system can provide the proof of the validity, without performing the expensive computation, where verifying the proof is at least ten times faster than the expensive computation.

33 Claims, 34 Drawing Sheets

Related U.S. Application Data

(60) Provisional application No. 63/068,051, filed on Aug. 20, 2020.

(51) Int. Cl.
  *G06F 21/62* (2013.01)
  *G06F 21/57* (2013.01)
  *H04L 9/06* (2006.01)
  *H04L 9/00* (2022.01)

(52) U.S. Cl.
  CPC ........ *G06F 21/6218* (2013.01); *H04L 9/0643* (2013.01); *G06F 2221/2107* (2013.01); *G06F 2221/2141* (2013.01); *H04L 9/50* (2022.05)

(58) Field of Classification Search
  CPC ..... G06F 2221/2107; G06F 2221/2141; G06F 21/645; H04L 9/0643; H04L 9/50; H04L 9/085; H04L 9/0894; H04L 9/3239; H04L 9/3255
  See application file for complete search history.

(56) References Cited

U.S. PATENT DOCUMENTS

| | | | |
|---|---|---|---|
| 10,193,695 | B1 | 1/2019 | Endress et al. |
| 10,425,426 | B1* | 9/2019 | Simons .................. H04L 9/3239 |
| 10,699,269 | B1 | 6/2020 | Blankstein et al. |
| 10,756,884 | B2 | 8/2020 | Vouk et al. |
| 10,762,197 | B1 | 9/2020 | Yu et al. |
| 11,005,653 | B2 | 5/2021 | Chopart |
| 11,080,412 | B1* | 8/2021 | Moore .................. G06F 21/602 |
| 2002/0072334 | A1 | 6/2002 | Dunne et al. |
| 2006/0242688 | A1 | 10/2006 | Paramasivam et al. |
| 2008/0282072 | A1 | 11/2008 | Leonard et al. |
| 2014/0068735 | A1 | 3/2014 | Marinov et al. |
| 2015/0278506 | A1 | 10/2015 | Jun et al. |
| 2017/0046526 | A1 | 2/2017 | Chan et al. |
| 2017/0132621 | A1 | 5/2017 | Miller et al. |
| 2017/0236123 | A1 | 8/2017 | Ali et al. |
| 2017/0353309 | A1 | 12/2017 | Gray |
| 2018/0091596 | A1 | 3/2018 | Alvarez et al. |
| 2018/0152289 | A1* | 5/2018 | Hunt .................... H04L 9/0637 |
| 2018/0227116 | A1 | 8/2018 | Chapman et al. |
| 2018/0288022 | A1 | 10/2018 | Madisetti et al. |
| 2018/0375668 | A1 | 12/2018 | Diehl et al. |
| 2019/0034235 | A1 | 1/2019 | Yang et al. |
| 2019/0080538 | A1 | 3/2019 | Shahidi |
| 2019/0087553 | A1 | 3/2019 | Barak et al. |
| 2019/0190896 | A1 | 6/2019 | Singh |
| 2019/0199518 | A1 | 6/2019 | Rady |
| 2019/0273616 | A1 | 9/2019 | Bres |
| 2019/0288850 | A1 | 9/2019 | Beecham et al. |
| 2019/0295336 | A1 | 9/2019 | Jones |
| 2019/0317924 | A1 | 10/2019 | Alimi et al. |
| 2019/0340013 | A1 | 11/2019 | Celia |
| 2019/0379673 | A1 | 12/2019 | Coonrod |
| 2020/0014537 | A1 | 1/2020 | Ortiz et al. |
| 2020/0034548 | A1 | 1/2020 | Wu et al. |
| 2020/0059365 | A1 | 2/2020 | Hyland |
| 2020/0065802 | A1* | 2/2020 | Mathieson ............ H04L 9/0637 |
| 2020/0073962 | A1* | 3/2020 | Natarajan ............. H04L 9/0643 |
| 2020/0076571 | A1 | 3/2020 | Natarajan et al. |
| 2020/0076596 | A1 | 3/2020 | Chopart |
| 2020/0092086 | A1 | 3/2020 | Raman et al. |
| 2020/0118124 | A1 | 4/2020 | Menon |
| 2020/0127844 | A1 | 4/2020 | Van der Laak et al. |
| 2020/0159697 | A1* | 5/2020 | Wood .................... H04L 9/0637 |
| 2020/0175155 | A1 | 6/2020 | Bhamidipati et al. |
| 2020/0193047 | A1 | 6/2020 | Moore |
| 2020/0202343 | A1 | 6/2020 | Shi et al. |
| 2020/0213085 | A1* | 7/2020 | Fletcher ................ H04L 9/0637 |
| 2020/0252221 | A1 | 8/2020 | Zamani et al. |
| 2020/0320211 | A1 | 10/2020 | Moore |
| 2020/0322132 | A1 | 10/2020 | Covaci et al. |
| 2020/0357075 | A1 | 11/2020 | Dahl |
| 2020/0364205 | A1 | 11/2020 | Novotny et al. |
| 2020/0372138 | A1 | 11/2020 | Li |
| 2020/0402026 | A1 | 12/2020 | Furukawa |
| 2021/0004225 | A1 | 1/2021 | Karunakaran et al. |
| 2021/0026980 | A1 | 1/2021 | Candelario et al. |
| 2021/0035098 | A1* | 2/2021 | Long ..................... G06Q 20/02 |
| 2021/0036860 | A1 | 2/2021 | Ranganathan |
| 2021/0014065 | A1 | 3/2021 | Gourisetti et al. |
| 2021/0064733 | A1 | 3/2021 | Stolbikov et al. |
| 2021/0075870 | A1 | 3/2021 | Kempf et al. |
| 2021/0081557 | A1 | 3/2021 | Thomson-Wood et al. |
| 2021/0083876 | A1 | 3/2021 | Harms |
| 2021/0089422 | A1 | 3/2021 | Kim et al. |
| 2021/0090170 | A1 | 3/2021 | Gilleeney et al. |
| 2021/0092127 | A1 | 3/2021 | Li et al. |
| 2021/0099312 | A1 | 4/2021 | Guo et al. |
| 2021/0109917 | A1 | 4/2021 | Xiao et al. |
| 2021/0110049 | A1 | 4/2021 | Kumar et al. |
| 2021/0112023 | A1 | 4/2021 | Chen et al. |
| 2021/0117896 | A1 | 4/2021 | Koc et al. |
| 2021/0124812 | A1 | 4/2021 | Stolbikov et al. |
| 2021/0126794 | A1 | 4/2021 | Forrester et al. |
| 2021/0133670 | A1 | 5/2021 | Cella et al. |
| 2021/0135867 | A1 | 5/2021 | Zeng et al. |
| 2021/0158342 | A1* | 5/2021 | Bartolucci ......... G06Q 20/3829 |
| 2021/0203476 | A1 | 7/2021 | van de Ruit et al. |
| 2021/0258372 | A1* | 8/2021 | Abdulla ................ H04L 9/3297 |
| 2021/0326352 | A1* | 10/2021 | Manevich ............... G06F 16/27 |
| 2022/0038264 | A1* | 2/2022 | Yakira .................. H04L 63/0442 |

OTHER PUBLICATIONS

PCT/US2021/045577, International Search Report and Written Opinion dated Sep. 3, 2021, 7 pgs.

* cited by examiner

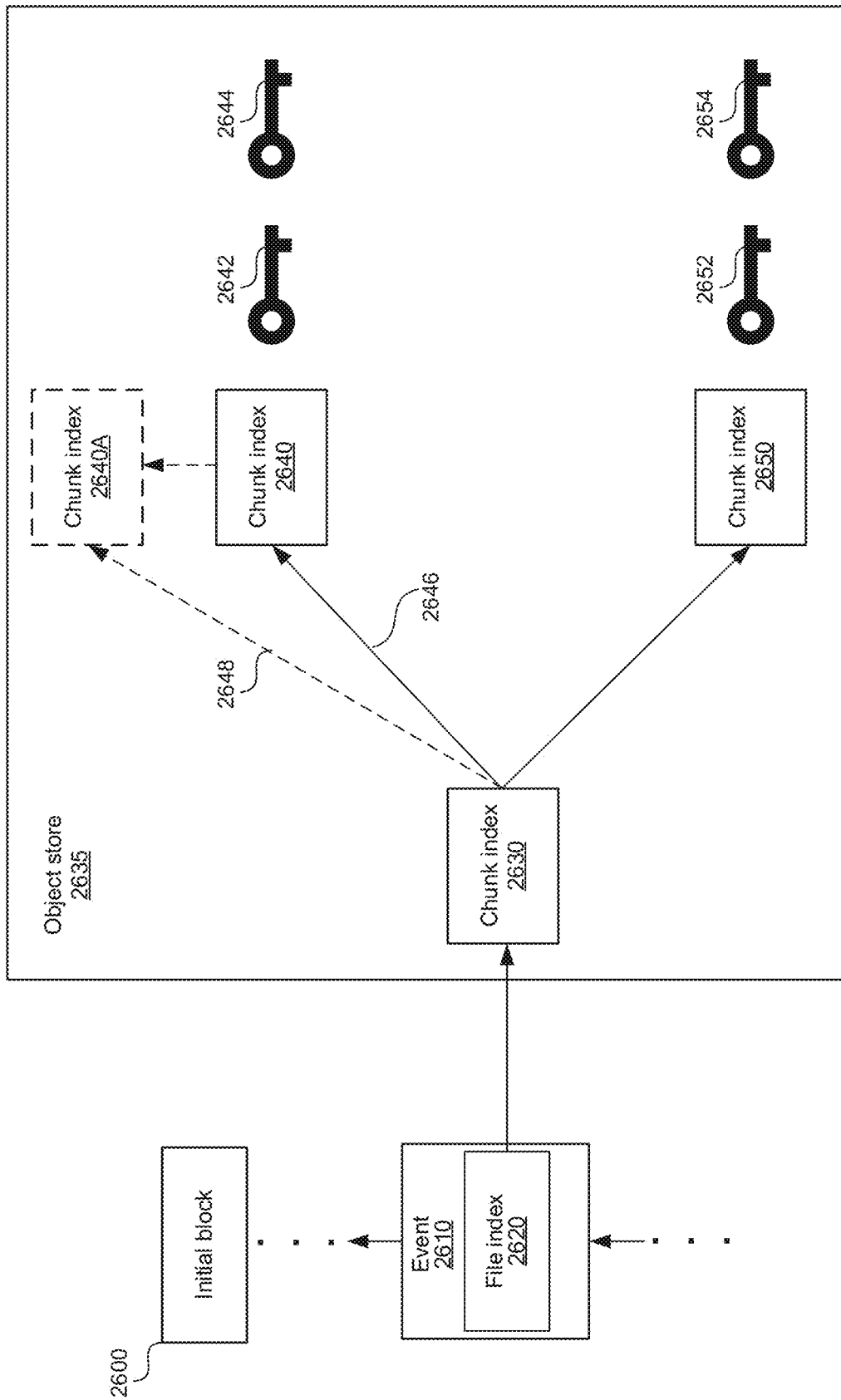

US 11,568,068 B2

IMPLEMENTATION OF A FILE SYSTEM ON A BLOCK CHAIN

CROSS-REFERENCE TO RELATED APPLICATIONS

The present application is a continuation of the U.S. Non-Provisional Utility patent application Ser. No. 17/180,442, filed Feb. 19, 2021, which claims priority to and the benefit of U.S. Provisional Patent Application No. 63/068,051, filed Aug. 20, 2020, both of which are hereby incorporated by reference in their entirety.

TECHNICAL FIELD

The present application is related to managing access to a secured file system, and more specifically, to methods and systems that manage group authority and access to the secured file system in an enterprise environment.

BACKGROUND

The major problem our computing systems face today is that internal threats—that is, threats from our reliance upon a centralized infrastructure and the people that manage and provide it—are a part of the overall threat model. According to Microsoft SharePoint Admin Role documentation, "[g]lobal admins and SharePoint admins don't have automatic access to all sites and each user's OneDrive, but they can give themselves access to any site or OneDrive." Our current approach to infrastructure, that centralizes the management and provision of security and access control with admins allows people access to information without a need-to-know that information. As a result, administrators that do not have the authority to read data stored on the server that they are administering can still gain access and read the data, without the authority to do so.

SUMMARY

Presented here is a system that manages a secure file system, and an authority to access the file system, by granting access only to a user who is authorized to access the file system. Access granted to the user cannot exceed the authority of the user. The user within the system is identified using a cryptographic key unique to each user. The user's authority is recorded in a linear sequence, akin to a block chain, which is distributed among multiple devices. Each of the multiple devices independently verifies the validity of each block in the linear sequence, thus preventing a compromised central server from granting unauthorized access. The validity of the linear sequence is guaranteed by preventing certain operations from being performed on the linear sequence, such as branching of the linear sequence, deletion of the blocks within the linear sequence, and modification of the blocks within the linear sequence. Prior to adding a new block to the linear sequence, the validity of the block is independently computed by each of the devices in the system to ensure that the user requesting the addition of the block has the authority to add the block to the linear sequence, and more specifically, to perform the operation specified by the contents of the block.

The block chain itself may not be encrypted, and the access to the block chain can be regulated by the block chain itself and an access control server operating in an enterprise information technology (IT) environment. To incorporate authority defined in multiple sources, such as the block chain and the access control server, a token can be created containing multiple layers of permissions, i.e. constraints, coming from multiple sources. Each additional permission attenuates the authority granted by the token. When a processor controlling the access to the block chain receives the token, the processor can check the validity of the token and the authority granted by the token to determine whether the requester is authorized to access at least a portion of the block chain.

To speed up the computation of policy and/or authority on the block chain that can be arbitrarily long and accumulated over a long period of time, such as decades, computational checkpoints within the block chain can be created, that prove the correctness of the block chain up to the computational checkpoint. The computational checkpoints can be created using a SNARK or zk-SNARK. Consequently, when the server communicates with a device requesting access to the block chain, the server can preserve network bandwidth and memory of the requesting devices by transmitting the proof of correctness, instead of transmitting the whole block chain to the requesting device. Additionally, a file system including a revision control and garbage collection can be implemented on the block chain.

BRIEF DESCRIPTION OF THE DRAWINGS

FIG. 26A shows a file system implemented using a block chain.

DETAILED DESCRIPTION

Figure 1:
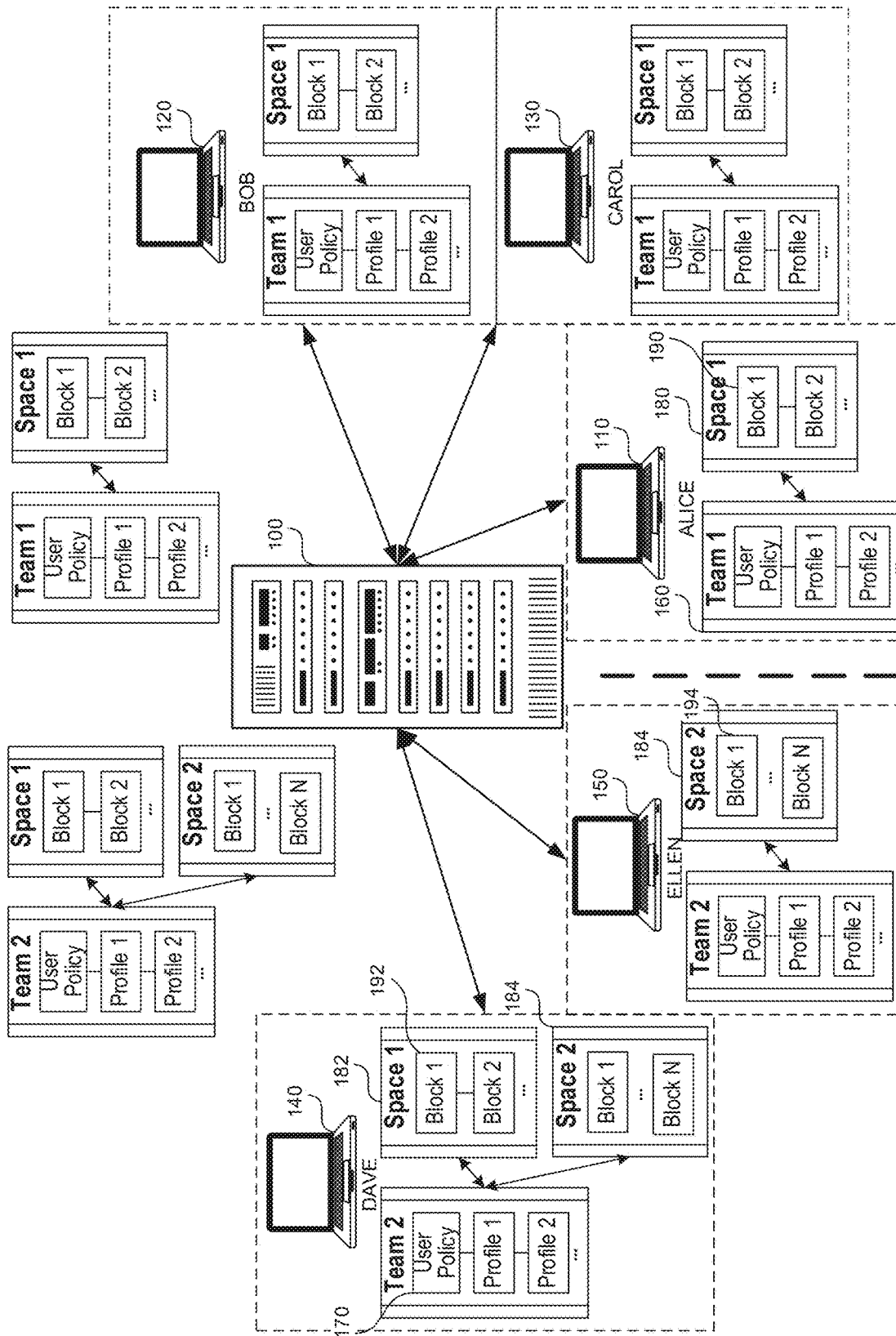
FIG. 1 shows a system to manage group authority and access to cryptographically secure data in a decentralized environment.

Managing Group Authority and Access to Secure Data in a Decentralized Environment FIG. 1 shows a system to manage group authority and access to cryptographically secure data in a decentralized environment. The server 100 is in communication with multiple devices 110, 120, 130, 140, 150, also called endpoints. Each of the devices 110-150 can be associated with an entity or a user such as Alice, Bob, Carol, Dave, Ellen, respectively. Each user Alice-Ellen can have a unique cryptographic user identification ("ID"), as explained later in this application, and each device can have a unique cryptographic device ID. Each cryptographic user ID can have one or more cryptographic device IDs associated with it.

The unique cryptographic user IDs can be separated into teams, such as team 1 and team 2 as shown in FIG. 1. For example, Alice's, Bob's and Carol's cryptographic user IDs can be members of team 1, while Dave's and Ellen's cryptographic user IDs can be members of team 2, as shown in FIG. 1. Team 1 and team 2 can have mutually exclusive membership, as shown in FIG. 1, or can have partially overlapping membership. The team membership can be recorded in a linear sequence, for example, a team linear sequence 160, 170 (only one instance of a team linear sequence labeled for brevity). Each team 1, 2 can have one team linear sequence 160, 170, respectively. The linear sequence, such as the team linear sequence 160, 170 and a space linear sequence 190, 192, 194, is a cryptographic data structure akin to a ledger. Because the linear sequence can be distributed across multiple devices, each of which independently verifies the linear sequence, the linear sequence can represent a distributed ledger.

Each team 1, 2 can have one or more spaces 180, 182, 184 (only one instance of a space labeled for brevity). Each space 180, 182, 184 can be a virtual compartment containing encrypted data and members having access to the encrypted data. A subset of team members can be included in one or more spaces 180, 182, 184 and given authority to access encrypted data associated with the one or more spaces 180, 182, 184. For example, team 1 has space 180, and all the team members Alice, Bob and Carol are invited to space 180. In another example, team 2 has space 182 and 184. Space 182 only has Dave as a member, while space 184 has both Dave and Ellen as members. Each space 180, 182, 184 can have encrypted data that can be made accessible only to the space members. Encrypted data can include content or data, or both. For example, encrypted data can include a file, a file system, a document, and/or messages such as instant messages, emails, chat messages, text messages, etc.

In an example, only users Alice, Bob, Carol have authority to the encrypted data associated with space 180. In another example, only user Dave has the authority to the encrypted data associated with the space 182, while both users Dave and Ellen have the authority to access encrypted data associated with space 184. Authority to the encrypted data can include permission to read, write, and/or modify the encrypted data. Access to encrypted data can be granted upon verifying that the cryptographic user ID requesting the access has the authority encompassing the access.

For example, user Ellen's cryptographic user ID can have the authority to read the encrypted data. However, if user Ellen's cryptographic user ID requests to write to the encrypted data, user Ellen's cryptographic user ID will be denied the access to write to the encrypted data because user Ellen's cryptographic user ID lacks the authority. In other words, in the system disclosed here, the access to the encrypted data cannot exceed the authority associated with the encrypted data.

In another embodiment, the teams 1, 2 do not exist, and the users can be grouped into one or more spaces 180, 182, 184. To generate a space, a general pool of cryptographic user IDs that exist in the system can be searched to define the members of the space. The team linear sequence 160, 170 can be integrated into the corresponding space linear sequence 190, 192, 194 (only one instance of a space linear sequence labeled for brevity). For example, the space linear sequence 190 can include the team linear sequence 160 and the space linear sequence 192, the space linear sequence 192 can include the team linear sequence 170 and the space linear sequence 192, while the space linear sequence 194 can include the team linear sequence 170 and the space or list 194.

A record of the authority associated with the encrypted data can be computed by combining the team linear sequence 160, 170 and a corresponding space linear sequence 190, 192, 194, as described further in this application. In addition to storing authority and membership, the space linear sequence 190, 192, 194 can also store the encrypted data and/or references to the encrypted data.

A copy of the team linear sequence 160, 170 and the space linear sequence 190, 192, 194 can be distributed to all the devices 110-160 whose cryptographic user IDs are members of the corresponding team and space as well as the server 100. For example, devices 110-130 have a copy of the team linear sequence 160 and the space linear sequence 190 because the cryptographic user IDs associated with the devices 110-130 are members of team 2 and space 180. In another example, device 140 has a copy of the team linear sequence 170 and space linear sequences 192 and 194, because user Dave's cryptographic user ID associated with the device 140 is a member of team 2 and space 182, 184. In a third example, device 150 has a copy of the team linear sequence 170 and space linear sequence 194, because user Ellen's cryptographic user ID associated with device 150 is a member of team 2 and space 184.

The metadata contained in the team linear sequence 160, 170 and the space linear sequence 190, 192, 194 can be stored in plain text, while the remainder of the data can be encrypted. The metadata can include authority information, policy information, roles, etc., stored within the team linear sequence 160, 170 and the space linear sequence 190, 192, 194. The remainder of the data can include confidential data such as files, filesystems, messages, and/or other confidential data. For example, filenames can be a part of the confidential data if the encrypted data includes files and/or filesystems. The filesystems, files, and/or messages can only be accessed by knowing the encryption key used in encrypting the data. Even if an attacker were to successfully gain control of the encryption key, a user's private key, and/or authorized endpoint device, the compromise of the system would be limited.

For example, if the attacker gains control of the encryption key associated with space 182, the attacker would only be able to access confidential data within the space 182, not the confidential data within spaces 184 and 180. If an attacker obtains Ellen's private key, the attacker would only be able to access confidential data within the space 184, and not spaces 180 and 182. Thus, by compartmentalizing authority and access to spaces 180, 182, 184, the breach of the system can be confined.

Figure 2:
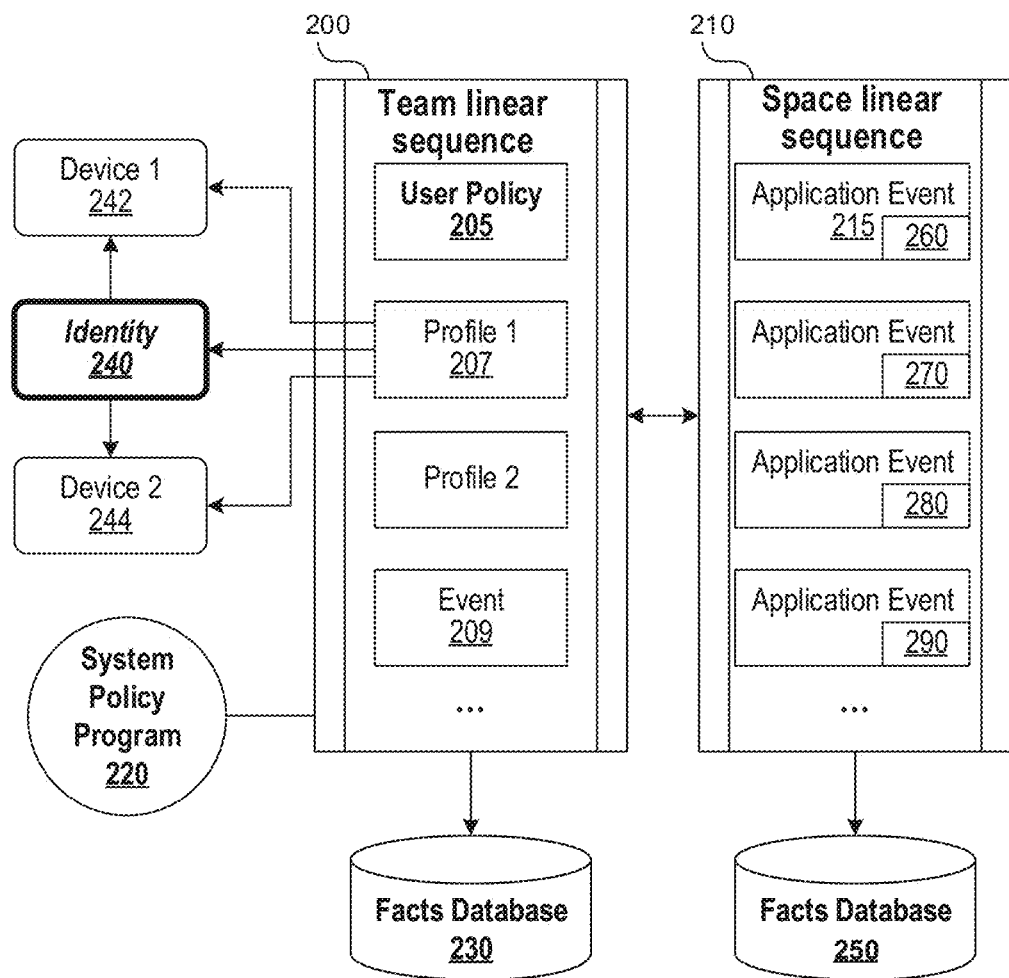
FIG. 2 shows a team linear sequence and a space linear sequence.

FIG. 2 shows a team linear sequence and a space linear sequence. A team linear sequence 200 can be used to track identities of team members and their authority in a team. A space linear sequence 210 can be used to form a secure compartment which can admit a subset of the team members. The secure compartments are used to manage data and negotiate shared keys among the space members. The team linear sequence 200 can be connected to a program 220 containing a system policy, as well as to a database 230 containing facts. The space linear sequence 210 can rely on the team linear sequence 200 to determine policy within the space. The space linear sequence 210 can be connected to a database 250 containing facts.

The team linear sequence 200 and the space linear sequence 210 can each contain multiple blocks 205, 207, 209, 215 (only 4 labeled for brevity). The initial block 205 of the team linear sequence 200 can define a policy for the team. A policy can specify a role and an authority associated with the role. For example, a policy can specify "only administrators can create spaces within a team." A team policy can be obtained from a policy template stored in a policy database and/or be modified when instantiating the first block 205. Alternatively, the first block 205 can define the team policy without reference to the policy template. A policy program 220 can be shared between different teams. The different teams, however, can have different fact databases 230. The team policy can also be modified by later blocks added to the team linear sequences 200, if the team policy defining block 205 permits modification.

The policy program 220 can store policy templates that can be included and/or modified as policy in the initial block 205. The fact database 230 can contain unique key-value pairs that can define user and user authority within the system. For example, a key-value pair that can be added to the fact database 200 can be "Alice-administrator", after a block that specifies that Alice is an administrator has been verified.

Block 207 of the team linear sequence 200 can include a profile of the user that is a member of the team 200. The user profile can include the user's identity 240 which can be represented by a cryptographic user ID, such as a public-key in an asymmetric cryptographic algorithm such as Rivest-Shamir-Adleman (RSA) or Diffie Hellman (DH). Only the user can be in possession of the private-key. The user profile can also include a cryptographic device ID 242, 244 associated with all the devices that the user has approved.

There are multiple ways that a device can be added to the system. For example, the user can approve the device by sending a request to add the device to the system, where the request is signed with a private key of the user. In another example, to approve a device, the user can perform a multi-step process. In the first step, the user can create a new set of device keys using the asymmetric cryptographic algorithm. In the second step, the user can sign the device keys with the user's private key and construct a device certificate containing the device public-key and the user's private key signatures. In the third step, the device can send a request, which includes the certificate from the second step, to be added to the team, where the request is signed using the device private key. The system can authenticate that a team member has made the request by verifying the request using the public-key of the user. The cryptographic device ID can be a cryptographic hash of the public-key of the asymmetric cryptographic algorithm, while the private-key can be known only to the device and can be used to authenticate actions performed by the device.

Block 209 of the team linear sequence 200 can include an event such as addition of a new user, creation of the space linear sequences 210, a change to policy 205, removal of an existing user, and/or a change of role of a user.

Block 215 of the space linear sequence 210 can include an event such as addition of a user to the space, addition of encrypted data to the space, removal of a user from space, etc. Each event 215 in the space linear sequence 210 complies with the policy defined in the team linear sequence 200. In some embodiments, policy cannot be changed in the space linear sequence 210 and must be changed in the team linear sequence 200. A team can have multiple spaces with different policies by defining multiple space types having different policies, and establishing the spaces corresponding to the different space types. For example, a space type can include an "administrator space type" where all users have administrator roles and administrators add and remove other users and can have read and write access to the encrypted data. In another example, the space type can include "stratified space type" where some users have administrator roles, and some users have user roles, and the administrator roles have more authority than the user roles. Events in the team linear sequence 210 that change authority of a user can be stored in the fact database 250.

User policy 205 can be defined to enable users matching certain attributes to only have access to the space linear sequence 210 and space encrypted data for a limited amount of time. The passage of time can be measured by an always increasing clock that can provide a timestamp 260, 270, 280, 290 for each block 215 in the space linear sequence 210. The timestamp 260 can, for example, state "11:46 AM Nov. 21, 2019 (PST)." In the space linear sequence 210, the timestamp 260, 270, 280, 290 is always increasing between subsequent blocks. To enable time-limited access to the space linear sequence 210 and associated encrypted data, the user policy 205 can state that "user associated with profile 1 can have access to the linear sequence until Dec. 2, 2019."

Figure 3:
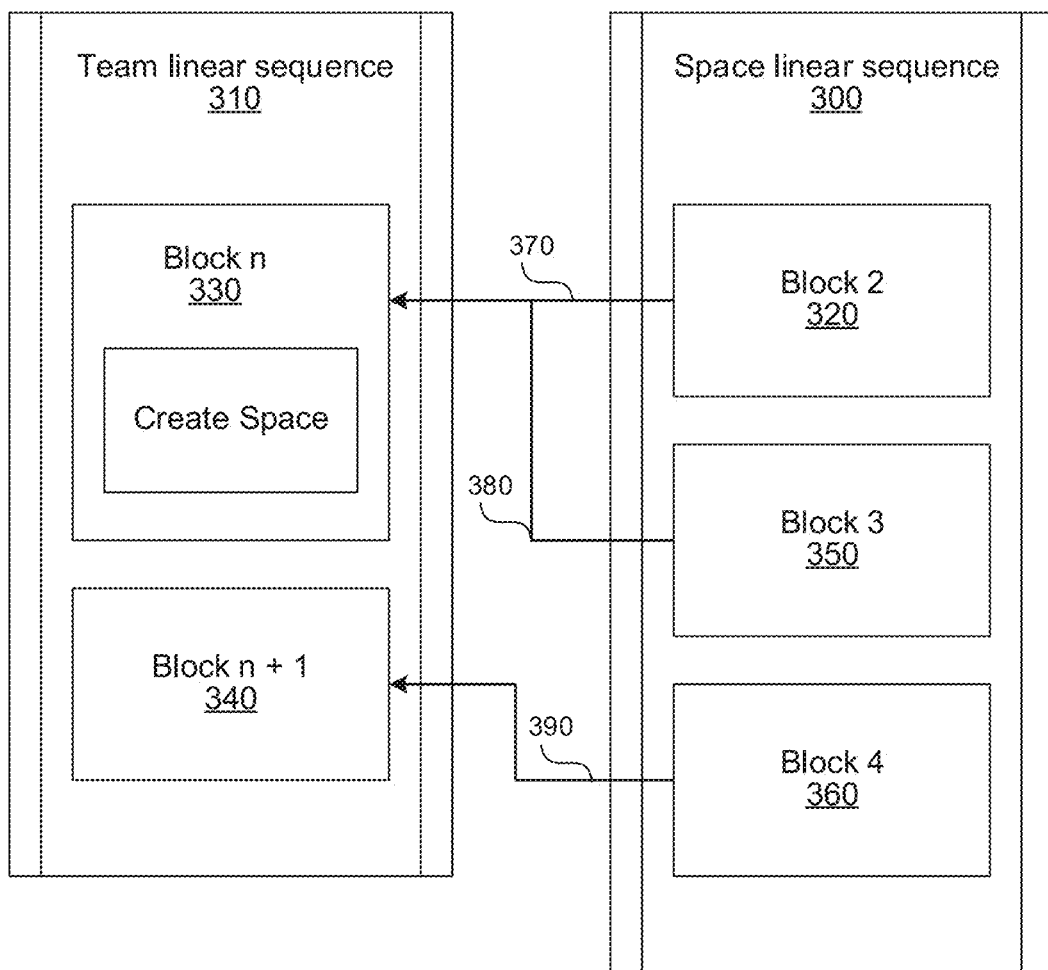
FIG. 3 shows the linear ordering between a team linear sequence and a space linear sequence.

FIG. 3 shows the linear ordering between a team linear sequence and a space linear sequence. Because the policy at least partially defining authority is stored in the team linear sequence 310, to compute an authority in a space linear sequence 300, a reference to the team linear sequence 310 needs to be made.

For example, in block 320 of the space linear sequence 300, the user of the space requests to add another user. In block 330 of the team linear sequence 310, the policy defined authority of the space user to add another space user, however in block 340 of the team linear sequence 310, the policy was modified to prevent space users from adding others space users. To determine whether block 320 is valid and should be added to the space linear sequence 300, the linear sequence of blocks 330, 340 in the team linear sequence 310 and the blocks 320, 350, 360 in the space linear sequence 300 needs to be established.

To establish the linear sequence, a temporal relationship 370, 380, 390 can be established between the blocks 320, 350, 360 in the space linear sequence 300 and the blocks 330, 340 in the team linear sequence 310. The temporal relationship 370, 380, 390 can include a pointer from the space block 320, 350, 360 to the team block which is the immediate predecessor or immediate successor of the space block 320, 350, 360. In FIG. 3, the temporal relationships 370, 380, 390 point from the space block 320, 350, 360 to the immediately preceding team block. For example, temporal relationship 370, 380 indicates that the team block 330 is the immediate predecessor of space blocks 320, 350, meaning that space blocks 320, 350 were created after the team block 330, but before team block 340. Similarly, the temporal relationship 290 indicates that space block 360 was created after team block 340.

Figure 4:
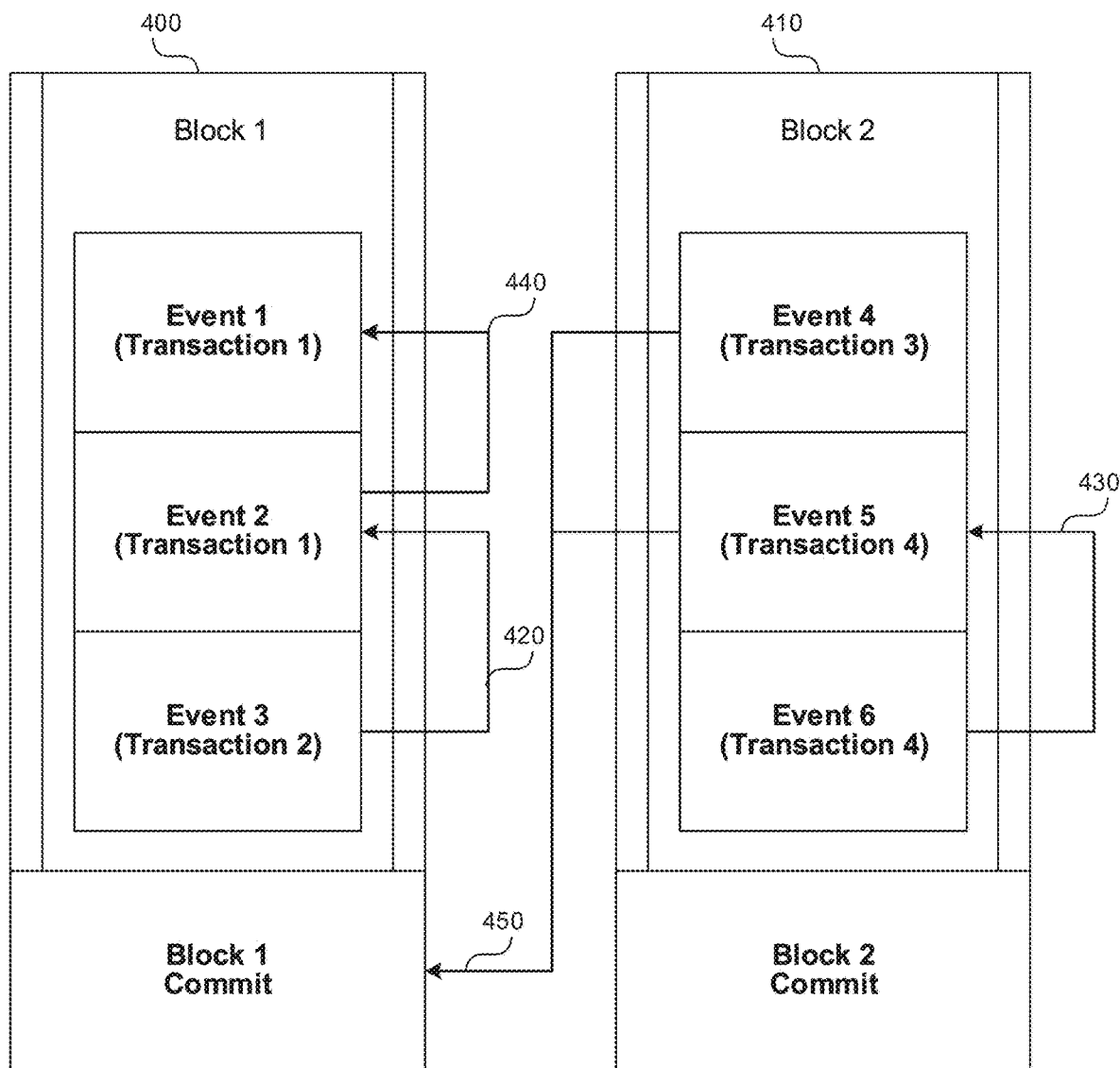
FIG. 4 shows anatomy of a block.

FIG. 4 shows anatomy of a block. The block 400, 410, can contain one or more events 1-6. The events 1-6 in blocks 400, 410 can be atomic. Each event 1-6 is committed in a single block 400, 410.

A transaction can include one or more events where the last event is signed. A transaction can be produced by a single client, such as client 110 in FIG. 1. When a transaction includes multiple events, such as transaction 1 containing events 1 and 2, the events can be ordered by the client prior to being sent to the server. The ordering of the events is indicated using arrows 420, 430, 440, 450. Upon receiving transactions 1-4 from multiple clients, the server can order transactions according to the order indicated by the arrows 420, 430, 440, 450.

Events in a single transaction point to each other, and the last event is signed. For example, events 1 and 2 form a single transaction 1. Similarly, events 5 and 6 form a single transaction 4. The arrow 420 between event 3 and event 2, indicates that a server should commit event 3 to the linear sequence after event 1. Similarly, the arrow 430 between events 5 and 6 indicates that the server should commit the event 6 to the linear sequence after event 5.

In an embodiment, events 1 and 2 come from a single client, while event 3 can come from the same client as events 1 and 2, or from a different client. Similarly, events 5 and 6 come from a single client, while event 4 can come from the same client or a different client. Further to this embodiment, there can be at least one and up to four clients creating transactions 1-4, as shown in FIG. 4. For example, a single client can author transaction 1, including events 1 and 2. A second client can author transaction 2 including event 3. A third client can author transaction 3 including event 4, and a fourth client can author transaction 4 including events 5 and 6.

In the case that more than one event, for example, events 1-3, need to be added in an atomic manner, the events 1-3 can be combined into a single block 400, and the block 400 can be stored in the linear sequence. In the block 400, 410, only the last event, such as event 3, 6, respectively, can be signed and none of the events 1-3, 4-6 in the block 400, 410 are valid unless they all appear in the intended order in the intended block.

The events 1-6 in blocks 400, 410 are cryptographically signed and recorded in an authenticated linear sequence, as explained in this application. The structure of the linear sequences guarantees that devices 110-160 in FIG. 1, which accept a block with some index n, are certain to agree on the contents of all blocks with an index less than n. Blocks 400, 410 have indices 1, 2, respectively, in FIG. 4.

Once the block 400, 410 is finalized, the block 400, 410 gains a block ID. Finalizing a block means committing a block to a durable storage and not changing the block. A block ID is a tuple of the block's index, and the cryptographic hash of its contents. For a given block n, all events intended to be added to the linear sequence in block n+1 can include block ID of block n. This ensures that the intended ordering of events of devices 110-160 is preserved. Additionally, only devices which agree on the block order and contents of blocks 0 through n, can accept an event in block n+1.

Figure 5:
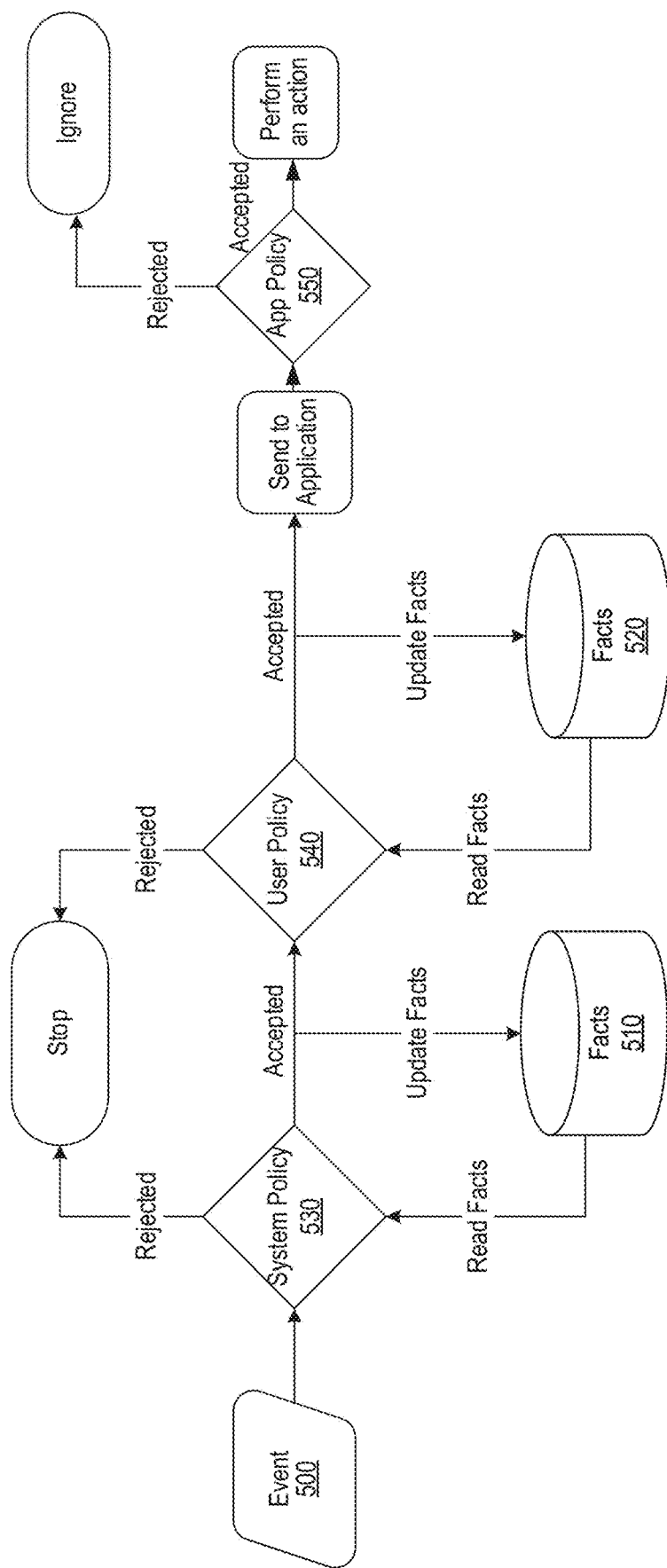
FIG. 5 shows verification of various layers of policies that can exist within the system.

FIG. 5 shows verification of various layers of policies that can exist within the system. An events 500 is processed using a formal policy which may either reject an event 500 or accept an event 500, and optionally update a database of facts 510, 520. A fact database 510, 520 is an index over the linear sequence with respect to the policy. The index is a collection of key value pairs. For example, the fact database 510, 520 can record facts generated by the event 500 and the policy rule which authorized it. The fact database 510, 520 can be read by a processor when deciding if the event 500 is valid and should be accepted in the linear sequence, such as a team linear sequence, or a space linear sequence.

When a server 100 in FIG. 1 receives the event 500, the server can include the event 500 in the next block. When the device 110-160 receives the event 500, the device can process the event 500 based on the business needs.

The system policy 530 is implemented by the device 110-160 and server 100. All cooperating devices 110-160 must use the same system policy 530 when processing the same block. In one embodiment, system policy 530 can be implemented as source code in a programming language such as Rust, Python, Go, or a proprietary policy language. The system policy 530 describes the structure of the blocks themselves. The system policy 530 describes the core protocol of the linear sequences, such as "all events in block n must reference block n−1."

The user policy 540 can be the team policy 205 in FIG. 2. The team policy 205 can be provided by a customer and can be tailored to the customer's organization. To ensure that all parties agree on the user policy 540, the user policy 540 can be stored in the linear sequence, such as the team linear sequence 310 in FIG. 3, and is guaranteed to be the same for all users cooperating on a particular linear sequence. An example of a team policy rule is "only team admins can add new members to a team."

The application policy 550 can be defined per team 160, 170 in FIG. 1. The key difference between the application policy and other policies is that the application policy operates after any cyphertext has been decrypted. Consequently, the application policy cannot be checked by the server. The application policy may not record authority, and can specify low level rules such as "two files cannot have the same name." The application policy 550 can encode rules to resolve low-level conflicts such as "if two files have the same name, the second file is ignored." Policies, including the system policy 530, the user policy 540 and/or the application policy 550, can be fixed in the program or managed using the linear sequences, such as team linear sequence 200 and space linear sequence 210 in FIG. 2.

Figure 6:
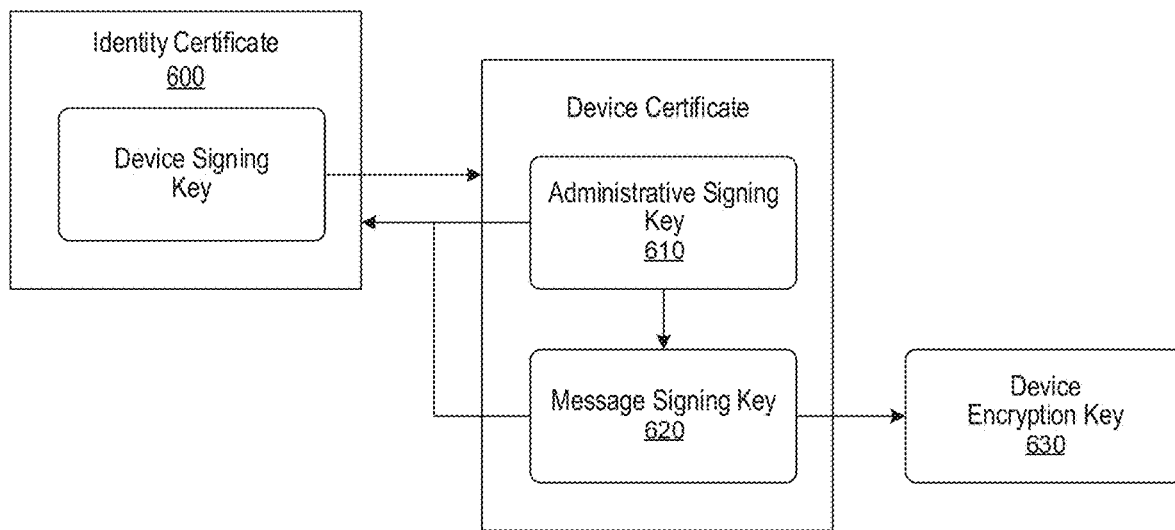
FIG. 6 shows various cryptographic IDs that can exist within the system.

FIG. 6 shows various cryptographic IDs that can exist within the system. Identities form the foundation of the security. Identities are represented by cryptographic identification (ID), such as asymmetric key pairs generated off-line using RSA, DH or other asymmetric algorithms. The public-key from the asymmetric key pair is used as the cryptographic identity of the entity, while the private-key from the asymmetric key pair is known only to the entity. The off-line generation of the root asymmetric key pairs protects the key pair from being compromised by a bad actor. Device keys can be generated online but may be stored in a hardware security module (HSM).

A cryptographic ID, such as a cryptographic device ID or cryptographic user ID, represents a single entity in the system, such as a device or a user, respectively. Consequently, the identity established using the cryptographic ID is globally distinct. In an embodiment, users are unique across teams even if no administrators distinguish them. Even between non-cooperating groups, such as teams that do not share any members, the identity established using the cryptographic ID remains globally distinct.

The cryptographic user IDs can be used to sign/authorize device keys which are used operationally in the system. Devices can use cryptographic device IDs, which can include three keys types: administrative signing keys, message signing keys, and device encryption key. All of these key types are asymmetric key pairs and can be managed outside of the application, in an operating system (OS) keys store or a hardware security module (HSM).

The identity certificate 600 can be deterministically generated from a recovery secret, allowing efficient hand transcription of the recovery secret when provisioning a new device.

The administrative signing key 610 can be used in high-risk operations and can require proof of user presence for any signing request. Examples of the high-risk operations are adding users or changing permissions.

The message signing key 620 can be used to sign most data transmitted by the device 110-160 in FIG. 1 and does not require proof of presence. An example use of the message signing key 620 is to sign messages sent in a chat, or to sign files to be uploaded.

The device encryption key 630 can be used when sending a confidential message to the device is necessary. The device encryption key 630 can be rotated often to provide for forward secrecy for device to device communications.

Figure 7:
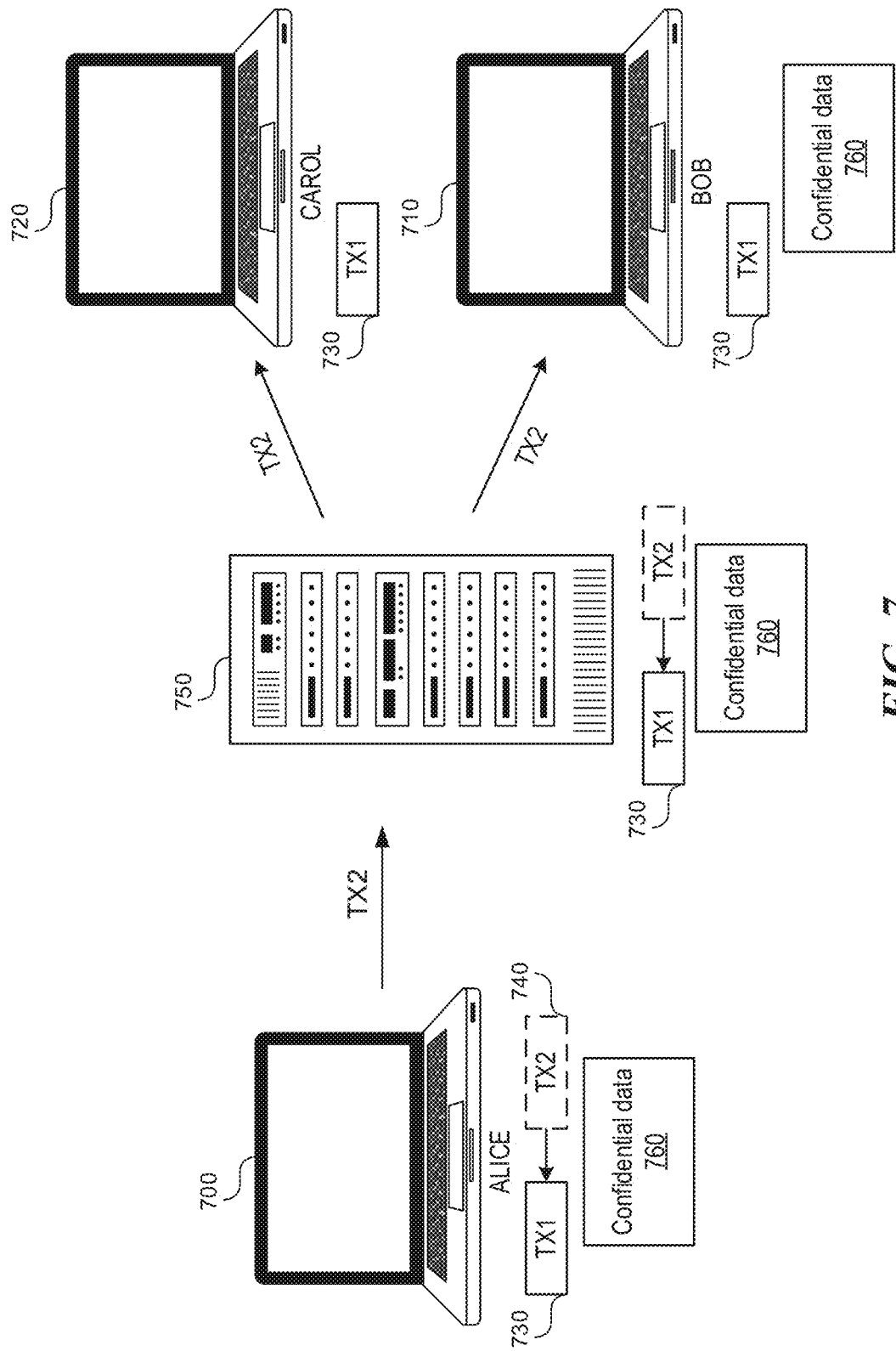
FIG. 7 shows how a block can be distributed to multiple devices.

FIG. 7 shows how a block can be distributed to multiple devices. Devices 700, 710, 720 can belong to the same space and/or team. They all can have a copy of the linear sequence 730. When one of the devices, such as device 700, adds a new block 740 to the linear sequence 700, the device 700 sends the new block 740 to the server 750.

The server 750 also has a copy of the linear sequence 730. The server 750 can compute whether the block 740 is valid by computing whether the user has the authority to perform the operation represented in the block 740. To determine whether the user has the authority, the server 750 can compute the authority from the linear sequence 730. The authority computation is explained below.

Once the server 750 verifies that the block is valid, the server can distribute the block 740 to the devices 710, 720, which in turn can also compute whether the block 740 is valid based on the authority recorded in the linear sequence 730. If the device 710, 720 determines that the block is not valid, the device can shut down because likely a breach of the system has occurred.

The devices 700, 710, 720 can share encrypted data 760, if they are in the same space. The encrypted data 760 is encrypted using at least one cryptographic key, such as a confidential session key, explained below. Different devices 700, 710, 720 can have different authority to the encrypted data 760 such as read-only, write-only, and read and write authority.

The server 750 can also store the encrypted confidential data 760, however the server 750 does not store any of the cryptographic keys, including the confidential session key. The server 750 does not have any authority to the encrypted data 760. The server 750 has a copy of the encrypted data 750 to ensure availability of the data. For example, if the devices 700, 710 are off-line, and the device 720, as a newly added member of the space, requests the encrypted confidential data 760, the server 750 can provide the encrypted confidential data 760 to the device 720, even if the devices 700, 710 are off-line.

Figure 8:
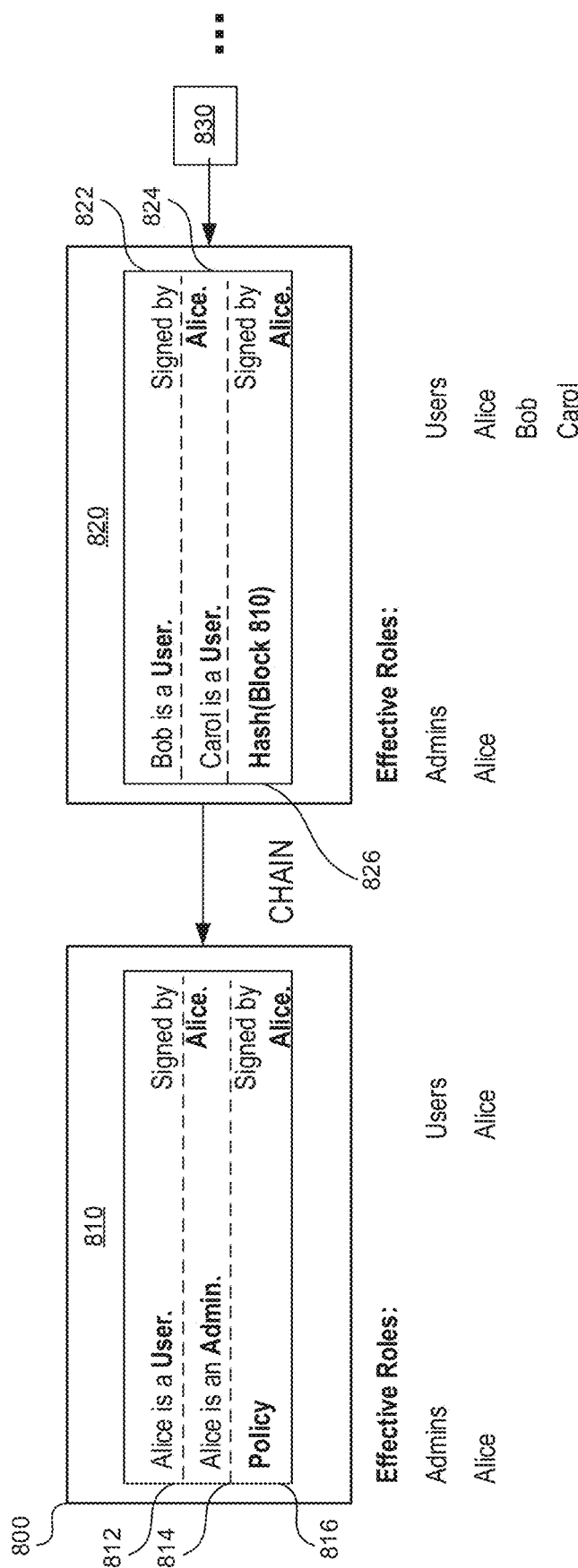
FIG. 8 shows a linear sequence containing blocks.

FIG. 8 shows a linear sequence containing blocks. The linear sequence 800 contains at least blocks 810, 820, 830. Block 810 contains multiple events 812, 814, while block 820 contains events 822, 824. Block 810 is the initial block in the linear sequence 800 and contains the policy 816 defining authority for the linear sequence 800. Each event in the subsequent blocks, such as block 820, can be verified to ensure that the event 822, 824 is consistent with the policy 816.

Each block subsequent to the initial block, such as block 820, includes the cryptographic hash 826 of the previous block, which for block 820 would be the hash of block 810. By including the cryptographic hash of the previous block, the ordering of the blocks in the linear sequence 800 can be guaranteed, and a reordering or editing of existing blocks, and/or an insertion of new blocks within the linear sequence 800 can be detected and automatically rejected.

The linear sequence 800 does not require a proof of work to verify the validity of the block, because the linear sequence 800 is a linear sequence, without any branching. Further, when a block is added to the list, the block's validity has been checked to comply with the policy and authority recorded in the linear sequence 800, and the block cannot be deleted. In other words, the order list 800 cannot be rolled back.

Within the initial block 810, event 812 establishes Alice as the user. The event is signed by Alice, meaning that Alice uses her private-key to encrypt the statement "Alice is a user." To verify that Alice is truly requesting to be established as a user, a processor can verify the signed statement "Alice is a user," using Alice's public-key and if verification succeeded the processor can know that Alice has truly requested to establish the user.

Event 814 establishes Alice as an administrator. Similarly, the event is signed and the processor can verify Alice's identity, as explained above. Because block 810 is the initial block, the policy 816 for the linear sequence is established. For example, policy 816 can state "only administrators can add users." Once block 810 has been committed to the linear sequence 800, the effective roles of the system are that Alice is an administrator and Alice is a user.

Event 822 in block 820 establishes that Bob is a user. To compute whether Alice has the authority to add the user, the processor can check the policy 816 and Alice's role in the system established by events 812, 814. Because the policy specifies that only administrators can add users, the processor checks whether Alice is an administrator. Upon verifying that Alice is an administrator, the processor can verify that Alice has the authority to add Bob as a user. Each event subsequent to the events contained in the initial block 812, 814, can be checked against the policy 816, and the policy authorizing the event can be recorded. For example, for event 822, block 820 can point to the policy stating that "only administrators can add users," and a processor can check that there is a fact stored in a fact database that "Alice is an administrator."

Event 824 adds Carol as a user and must also be signed by Alice, as explained above. Event 822 can also point to the policy that authorized the event, namely the policy stating "only administrators can add users" which is supported by the fact that "Alice is an administrator." The hash 826 creates a linear sequence of blocks 810, 820. After block 820 has been committed to the linear sequence 800, the effective roles in the system are that Alice is an administrator, and Alice, Bob, and Carol are users.

Other roles can be defined within the team such as legal, technical, sales etc. Each role can be granted access to a corresponding space type. For example, if Alice has role of "legal," Alice can be granted access to all spaces that have type "legal." If Alice's "legal" role is revoked, Alice can automatically lose access to the spaces that have type "legal."

Figure 9:
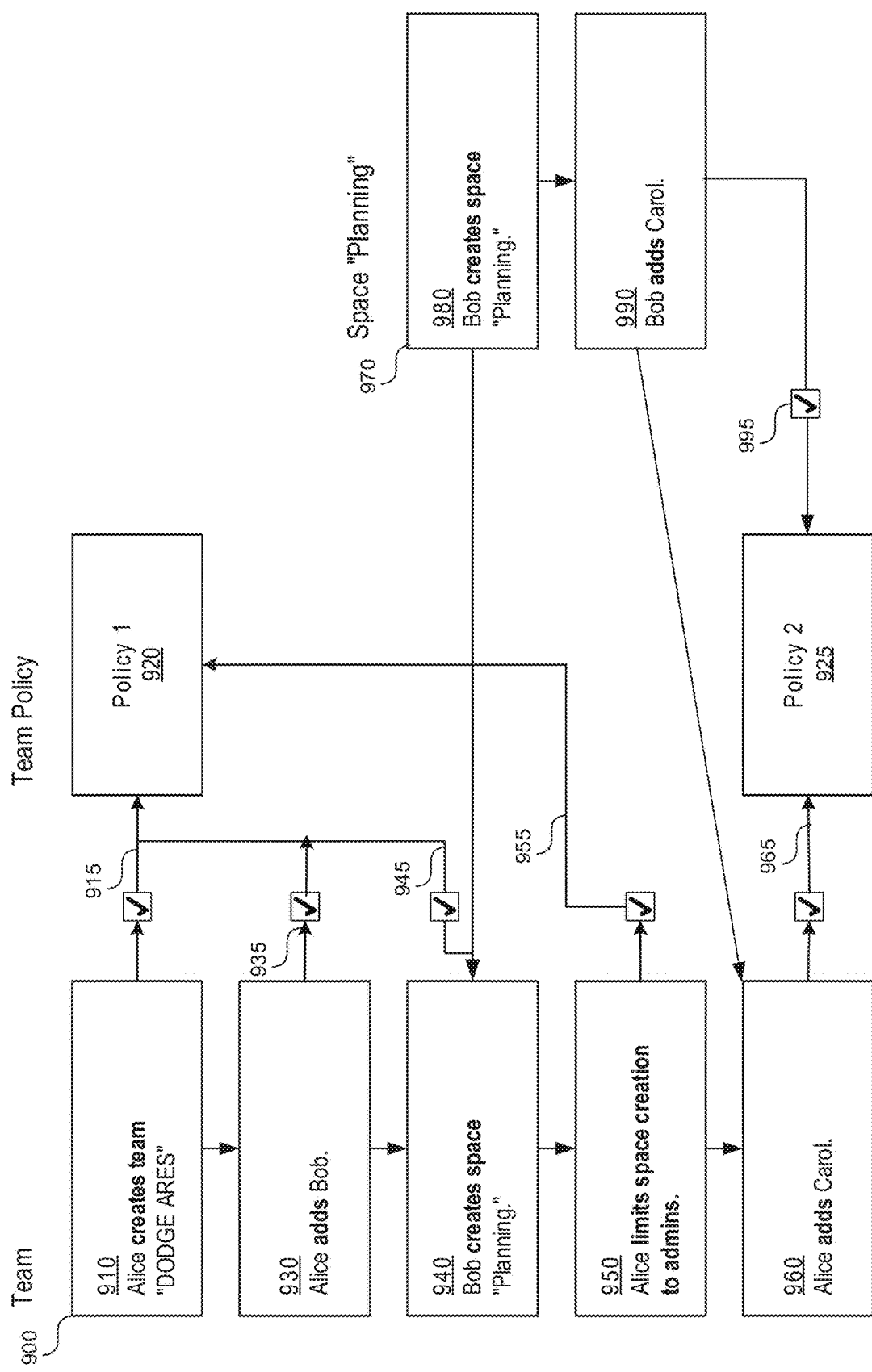
FIG. 9 shows a team linear sequence and a space linear sequence.

FIG. 9 shows a team linear sequence and a space linear sequence. In this example, the team linear sequence 900 and the block linear sequence contain blocks that include only one event. The team linear sequence 900 is initialized with the initial block 910 and using connection 915 linked to the policy 920, which establishes the policy for the team and any spaces. In block 930, Alice adds Bob as a user, and this event can be linked, using connection 935, to the policy 920 that authorizes it.

In block 940, Bob creates space "planning," and the event is linked to the policy 920 to ensure that Bob as the user has the authority to create a space. By default, only the creator of the space is granted administrative authority to the space on the space linear sequence 970. If policy 920 authorizes users to create spaces, the block 930 is validated, the event is linked using connection 945 to the policy 920, and the block 940 is added to the team linear sequence 900. When Bob creates space "planning," space linear sequence 970 is established, with the initial block 980 pointing to block 940 to indicate that the list was created after block 940, but before block 950, explained below.

In block 950, Alice limits space creation to administrators. This action changes the policy 920. To verify whether block 950 is valid, a processor needs to check the policy 920 to see if the policy allows administrators to modify the policy. If the policy 920 allows administrators to modify the policy, the event is linked, using connection 955, to a portion of policy 920 that allows administrators to modify the policy, and the new policy 925 is established. Even though after block 950, Bob cannot create a space, because Bob had the authority in block 942 to create the space, the space that Bob created is valid. In block 960, Alice adds Carol, and the event is checked against the new policy 925. Once the event is approved as authorized by the new policy 925, the connection 965 is established to that portion of the new policy 925 that authorizes the event.

In block 990 of the space linear sequence 970, Bob adds Carol as a user. To verify whether block 990 is valid, the processor needs to check the new policy 925 to see if policy 925 allows space users to add other space users. The policy 925 allows users to add users, and the event is linked, using connection 995, to a portion of the policy 925 that authorizes the event.

As explained earlier, only team members can be added to the space. If Bob attempts to add Carol prior to the block 950, the processor would not authorize the addition of the block 990, because after checking the fact base and/or the team linear sequence 900, the processor can determine that Carol is not a member of the team. However, if Bob attempts to add Carol to the space linear sequence 970 after block 960, the processor will authorize the addition of block 990, because the policy allows space users to add space users, and because Carol is a member of the team.

Figure 10A:
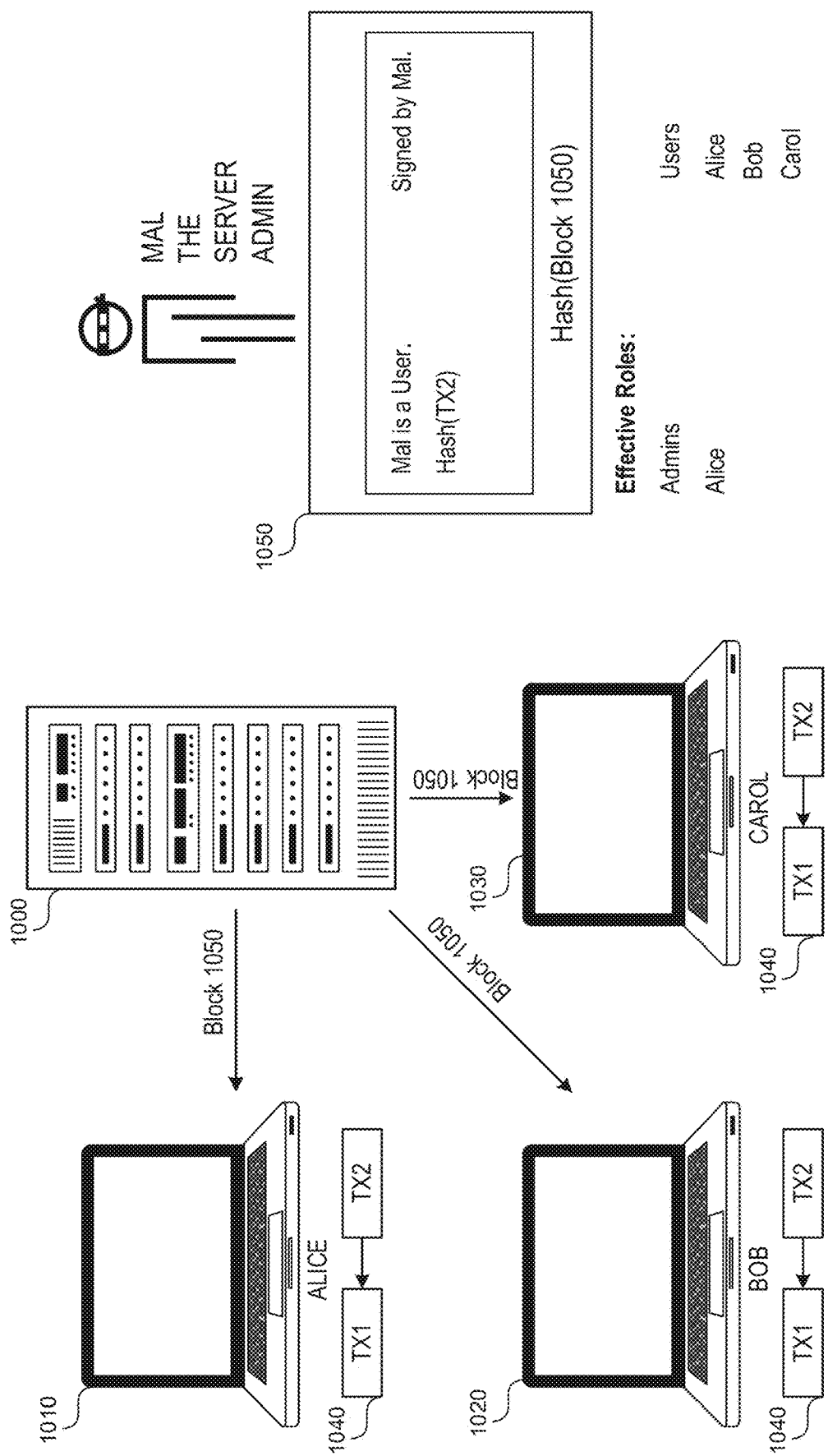
FIGS. 10A-B show authority computation in case a malicious actor tries to infiltrate the system.
Figure 10B:
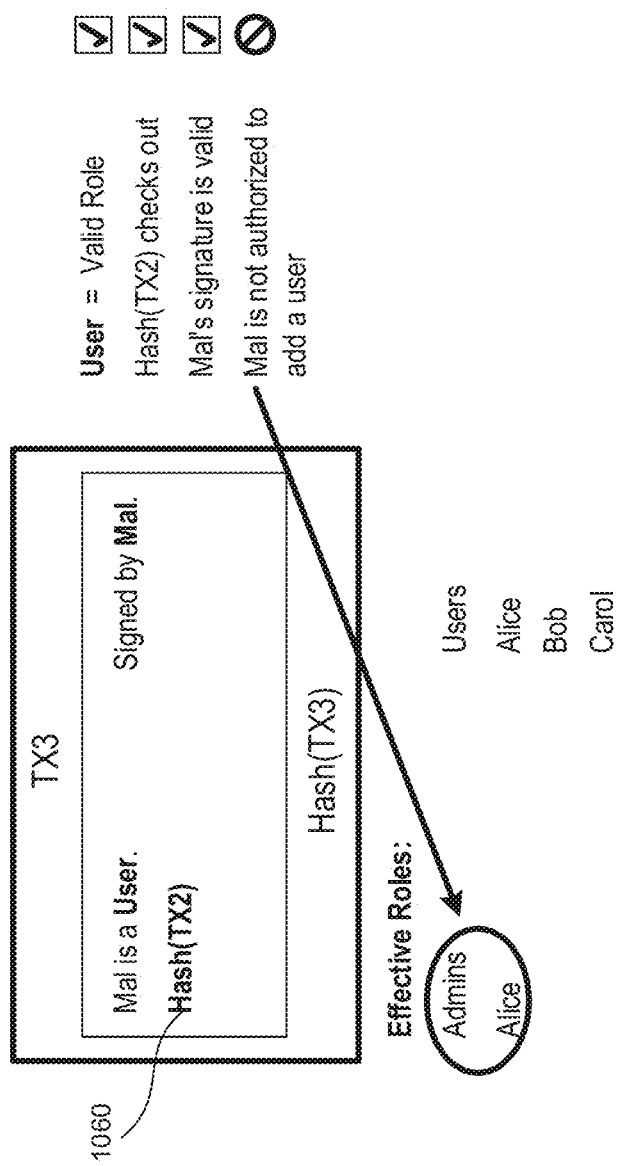

FIGS. 10A-B show authority computation in case a malicious actor tries to infiltrate the system. This example illustrates how a compromise of the server 1000 does not compromise the devices 1010, 1020, 1030 because each device 1010-1030 independently checks and guarantees a validity of the linear sequence 1040 and the authority recorded in the linear sequence 1040.

If the server 1000 is compromised, for example, by a malicious server administrator who coerces the server 1000 into incorrectly verifying and distributing a fraudulent block 1050 to the devices 1010-1030, each device 1010-1030 can independently verify the validity of the block 1050.

In FIG. 10B, each device 1010-1030 can independently verify that the hash 1060 of the last block in the linear sequence 1040 is valid. Each device 1010-1030 can verify that user is a valid role. Each device 1010-1030 can verify that Mal's signature is valid because, prior to submitting block 1050, Mal has requested that the server 1000 generate a public-key and a private-key for him and distribute the public-keys to the devices 1010-1030. However, the device 1010-1030 can determine that block 1050 is not valid because, according to system policy, only existing members, such as administrators or users, can add new users, and Mal is not an administrator or a user. Because the block 1050 does not satisfy policy, all the devices 1010-1030 can reject the block 1050. In addition, the devices 1010-1030 can shut down once an invalid transaction is received from the server 1000, because the devices 1010-1030 can conclude that the server 1000 has been compromised.

Figure 11A:
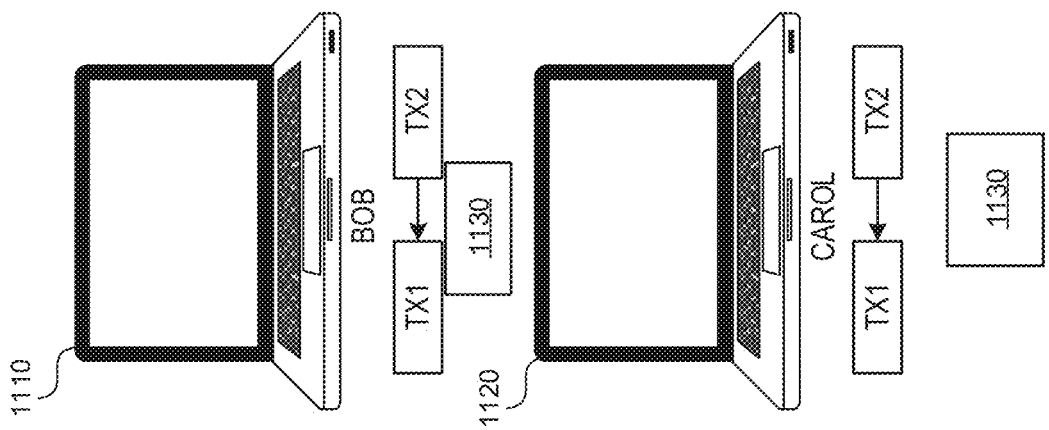
FIGS. 11A-C show how access to encrypted data can be controlled upon authority revocation.
Figure 11A:
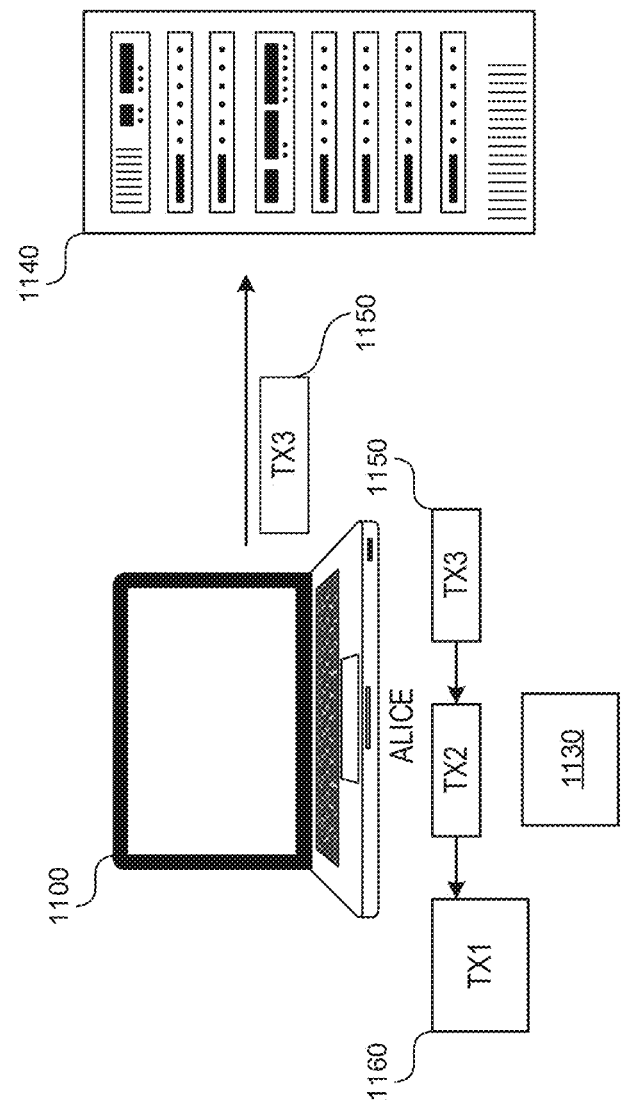
Figure 11B:
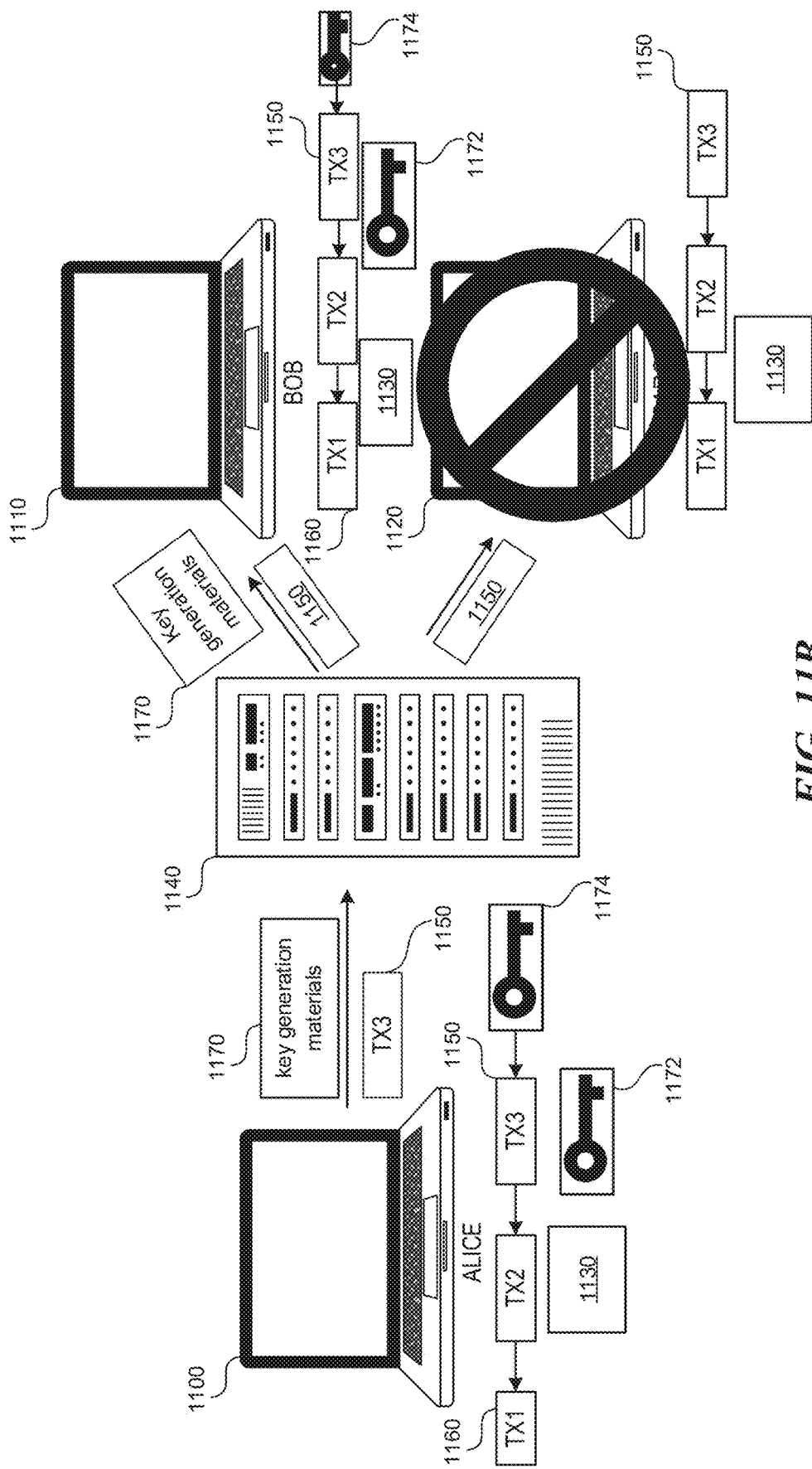
Figure 11C:
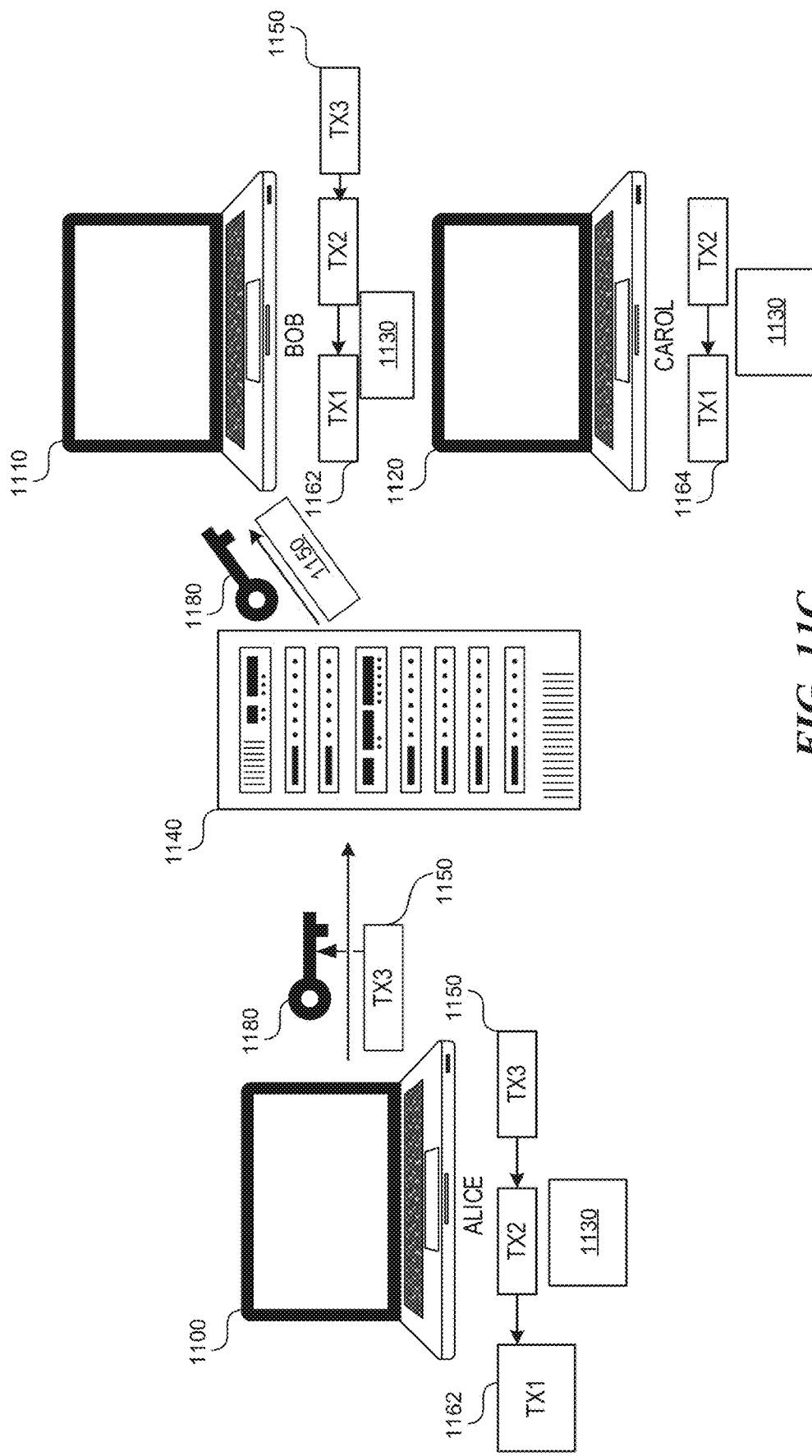

FIG. 11A-C show how access to encrypted data can be controlled upon authority revocation. Devices 1100, 1110, 1120 can share encrypted data 1130, by, for example, being part of the same space. The encrypted data 1130 can be encrypted using an Advanced Encryption Standard (AES), a symmetric-key algorithm using the same key for both encrypting and decrypting the data. The encrypted confidential data 1130 can be stored on the devices 1100-1120 and the server 1140. The AES key can be known only to the devices 1100-1120 that have the authority to access the encrypted data 1130.

Assuming Alice is an administrator and has the authority to remove users, Alice can submit a block 1150 to the server, that states "Carol is not a user," thus revoking Carol's authority to any future encrypted data shared between Alice and Bob. The server 1140 can distribute the block 1150 to all the devices 1110-1120, as seen in FIG. 11B.

Upon validation of the block 1150, by the devices 1110-1120, Carol and her device 1120 lose the authority to access any future encrypted data. To ensure that Carol and her device 1120 cannot access any future encrypted data shared between Alice and Bob, devices 1100, 1110 generate a new channel session key.

The new channel session key can be generated using the cryptographic methods such as elliptic curve cryptography, for example, using a P-384 elliptic curve. The channel session key can be generated using secret key generation materials 1170, such as domain parameters in the case of elliptic curve cryptography. The domain parameters can include the constants A, B defining the elliptic curve $Y^2=X^3+AX+B$.

The new group of devices that share the key is computed based on the linear sequence 1160. The secret key generation material 1170 is encrypted using each of the public-keys of an asymmetric cryptographic algorithm belonging to the devices remaining in the new group of devices. The encrypted secret key generation materials 1170 are distributed to all the devices in the group. The devices 1100, 1110 can use their own private-keys of the asymmetric cryptographic algorithm to decrypt the received encrypted message. As a result, only devices 1100, 1110 having the private key corresponding to the public-key used in encryption can calculate the new channel session key.

Devices 1100, 1110 receiving the secret key generation materials 1170 can compute a private portion 1172 of the channel session key and a public portion 1174 of the channel session key, and can record the public portion 1174 of the channel session key to the linear sequence 1160. As a result of committing the public portion 1174 of the channel session key to the linear sequence 1160, a client having an access to the linear sequence 1160 can access the public portion 1174 and have write-only access to the linear sequence 1160. The client cannot read any of the encrypted data associated with the linear sequence 1160, because the client does not have the secret key generation materials 1170 and/or the private portion 1172 of the channel session key. The private portion 1172 of the channel session key is not recorded in the linear sequence 1160.

Because the linear sequence 1160 does not require proof of work, and duplicating the linear sequence 1160 can be computationally feasible, a compromised server 1140 can present two different linear sequences 1162, 1164 to two groups of users, as seen in FIG. 11C. For example, the compromised server 1140 can refuse to distribute block 1150 to device 1120, thus leading the device 1120 to believe it is still in the group and to attempt to share encrypted data 1190 of device 1120 with devices 1100 and 1110. Consequently, a new channel session key 1180 can be computed based on the hash of the last block 1150 in the linear sequence 1160. For example, the new channel session key 1180 can be obtained by performing HKDF (channel session key in FIG. 11B, hash of block 1150). As a result, since devices 1100 and 1110 do not share the same last block with the device 1120, device 1120 cannot compute the same channel session key 1180.

In addition to the users of the same space Alice and Bob, a guest user can be temporarily granted access to the encrypted data contained in the same space as Alice and Bob. The guest user does not have access to the team linear sequence 1160 and cannot validate authority of a user within the space linear sequence 1160. However, the guest user can still negotiate a channel session key with Alice and Bob and be granted a temporary access to the encrypted data 1130.

Figure 12:
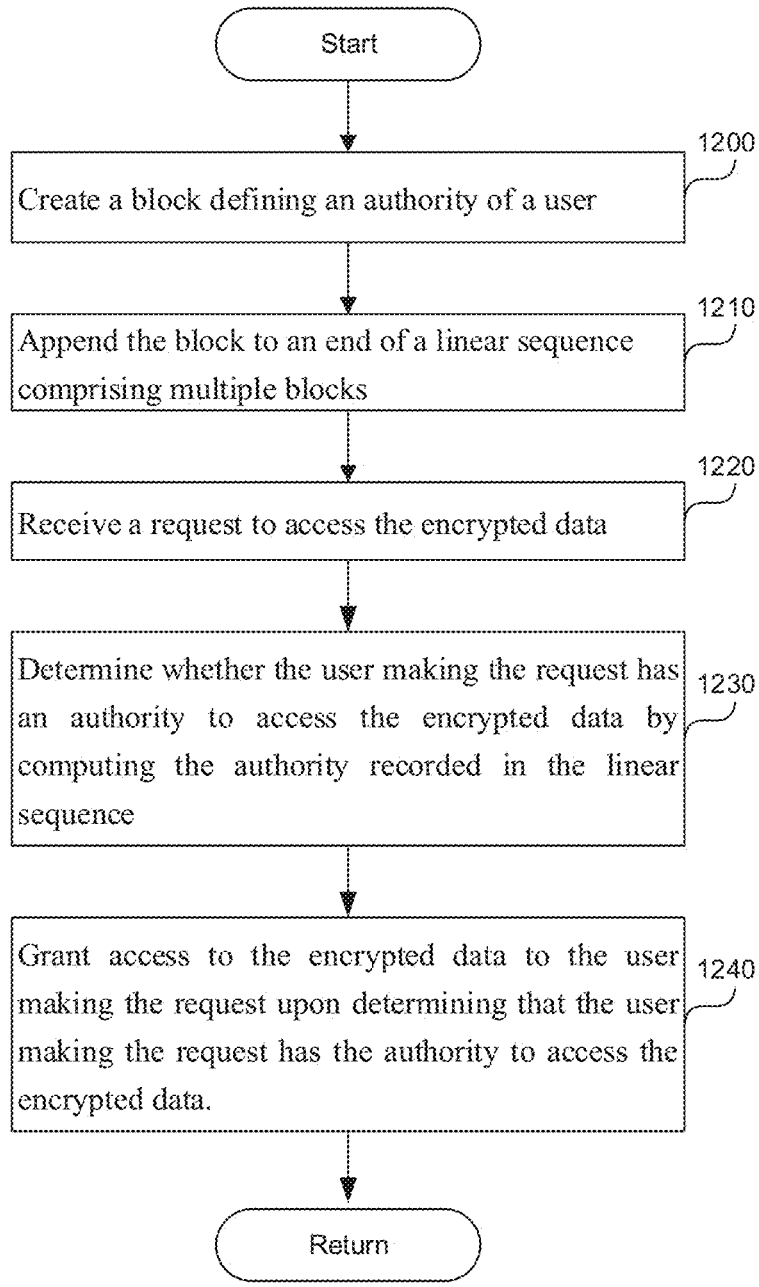
FIG. 12 is a flowchart of a method to manage authority, via a distributed ledger, separately from access to encrypted data by one or more trusted devices, wherein each of the trusted devices corresponds to at least one cryptographic key-based identity.

FIG. 12 is a flowchart of a method to manage, via a distributed ledger, authority separately from access to encrypted data by one or more trusted devices, wherein each of the trusted devices corresponds to at least one cryptographic key-based identity. In step 1200, a processor can create a block defining an authority of a user. The block can include a cryptographic user ID uniquely identifying the user and an authority associated with the cryptographic user ID. The authority can define at least an operation associated with the cryptographic user ID to perform on the encrypted data. The operation can include read-only, write-only, or read and write. Unlike a bitcoin ledger which requires approval to work, the block does not require an entry approving work, thus generation of the block is less processor intensive compared to bitcoin, which, on average, requires 10 minutes of processor time to generate a proof of work for the block.

In step 1210, the processor can append the block to an end of a linear sequence, including multiple blocks defining an authority associated with the encrypted data, and preserves a membership and an ordering of each block in the multiple blocks. To preserve the membership of the block, no block in the linear sequence can be deleted. In other words, deletion is not allowed operation on the linear sequence. To preserve ordering of each block among multiple blocks, rollbacks are not an allowed operation of the linear sequence. In other words, the linear sequence cannot branch, and contents of a block in the linear sequence cannot be modified and/or edited once the block is added to the linear sequence. The prohibition of deletion and modification of blocks ensures integrity of the linear sequence. In other words, once a block is added to the linear sequence, the block is permanently in the linear sequence. Further, before a block is added to the linear sequence, the contents of the block must be verified to ensure they are consistent with the preceding blocks in the linear sequence.

In step 1220, the processor can receive a request to access the encrypted data. The request can include a cryptographic user ID associated with the user making the request. Access to the encrypted data can include read-only, write-only, or both read and write access.

In step 1230, the processor can determine whether the user making the request has an authority to access the encrypted data by computing the authority recorded in the linear sequence as shown in FIGS. 8, 9, and 10A-B. To compute the authority, the processor can check the linear sequence from an initial block to a last block to determine user roles and authority associated with each role, and to compare the request from the user to the user role. In other words, the processor can manage access to the encrypted data by the cryptographic user ID by checking that the access by the cryptographic user ID is permitted by the authority recorded in the linear sequence.

In step 1240, the processor can grant access to the encrypted data to the user making the request upon determining that the user making the request has the authority to access the encrypted data.

The processor can create an initial block in the linear sequence defining a policy specifying a role and an authority associated with the role. For example, the initial block 810 in FIG. 8 defines policy 816 in FIG. 8. Further, the processor can create the block in the linear sequence defining a role associated with the cryptographic user ID. The block can be the initial block 810, as shown in FIG. 8 which, in addition to defining policy, defines that Alice is an administrator in event 814 in FIG. 8, or the block can be a subsequent block, such as block 820 in FIG. 8, which defines Bob and Carol as users.

To preserve the ordering of each block in the multiple blocks, the processor can include a cryptographic hash ("hash") of each previous block in each subsequent block, thus enabling detection of any change in the ordering sequence, as explained in FIG. 8. For example, the processor can compute a second cryptographic hash of data contained in a second block in the multiple blocks. The second block can be the initial block, or any block, in the linear sequence. The processor can store the second cryptographic hash within the second block, and can include the second cryptographic hash in data contained in a block subsequent to the second block.

To preserve the membership of blocks within the linear sequence, the processor can define a set of operations to be performed on the linear sequence, where any operation outside of the defined set cannot be performed in the linear sequence. The defined set can exclude operations such as deletion, branching of the linear sequence, and/or modification of data within the linear sequence.

To reduce the likelihood of a failure, such as corrupting the linear sequence and/or the encrypted data by a compromised central server, the processor can distribute the linear sequence to multiple devices. Each device in the multiple devices can be cryptographically verified by a cryptographic user ID associated with the linear sequence, as explained in FIG. 2. For example, to add a device to the list of authorized devices, an already authorized cryptographic user ID needs to request access for the device, as explained in FIG. 2. Upon receiving the request, the processor can verify that the cryptographic user ID indeed made the request by decrypting the request using the public-key of the cryptographic user ID. Upon verification, the processor can assign a cryptographic device ID to the device.

Each device among the multiple devices having the cryptographic device ID can independently verify the validity of a request based on the authority computed based on the linear sequence, as explained in FIGS. 10A-B. If a device cannot verify that the block is valid based on the computed authority, the device can refuse to add the block. Upon failure to verify, the device can shut down to prevent tampering with the encrypted data on the device.

The processor can define a team of cryptographic user IDs, for efficiency purposes, so that not all the cryptographic IDs have to be searched to find a group of people who can share encrypted data amongst themselves. To create the team, the processor can create a team linear sequence including multiple blocks. The multiple blocks can include one or more policy blocks, one or more profile blocks, and one or more authority blocks. The one or more policy blocks can define a policy establishing a role and an authority associated with the role, the one or more profile blocks can establish a cryptographic user ID and a cryptographic device ID associated with the cryptographic user ID, and the one or more authority blocks can define the role associated with the cryptographic user ID. The team linear sequence is an instance of, and has the same properties as, the linear sequence described in this application.

The policy recorded in the initial block of a linear sequence, such as the team linear sequence, can be modified if the policy recorded in the initial block permits modification. If the policy recorded in the initial block does not permit modification, any block attempting to modify the policy will not be verified by the multiple devices.

To modify the policy, the processor can obtain a request to modify the policy defined in the one or more policy blocks and a cryptographic ID of a user making the request. The processor can check whether the cryptographic user ID is authorized to modify the policy by determining authority associated with the cryptographic ID from the team linear sequence. Usually only administrators are allowed to modify the policy, and the processor can check whether the cryptographic user ID has a role of an administrator or a user. If the cryptographic user ID has the role of a user, the processor can refuse to verify the block. Upon determining that the cryptographic user ID is authorized, the processor can create a policy block specifying the modification and can append the policy block defining the modification to the end of the team linear sequence.

Once the processor defines the team, the processor can define a space within the team, which has a subset of the team members that can privately share encrypted data. The space membership can be the same as the team membership or can be smaller than the team membership. The space is a virtual compartment defining encrypted data and access to the encrypted data. The space can include the encrypted data using a cryptographic key known only to the members of the space.

To define the space the processor can represent the members and the encrypted data by creating a space linear sequence. For efficiency, the space linear sequence can be subdivided into multiple linear sequences. For example, the space linear sequence can be subdivided into an authority linear sequence, and the encrypted data linear sequence. The authority linear sequence can define a role within the space of the cryptographic user ID. The cryptographic user ID is a member of the space and the role is consistent with the policy defined in the one or more policy blocks of the team. The encrypted data linear sequence can record operations performed on the encrypted data such as addition, deletion or modification of at least a portion of the encrypted data.

The encrypted data can include multiple types of encrypted data such as files, emails, messages, etc. The processor can create a linear sequence for each of the encrypted data types. So, instead of creating one encrypted data linear sequence, the processor can create a linear sequence for the files, a linear sequence for the emails and a linear sequence for the messages.

By creating a separate linear sequences for authority and for each type of encrypted data, the processor can speed up the computation of authority because to compute the authority, the processor need only examine the linear sequence of blocks containing data pertaining to authority, as opposed to examining linear sequence containing authority blocks as well as encrypted data blocks. Assuming that there are as many authority blocks as encrypted data blocks, by splitting up the space linear list into the authority linear list and encrypted data linear list, the processor can speed up the computation of authority by a factor of two. Similarly, the processor can speed up retrieval of encrypted data by approximately a factor of 2, because to retrieve the encrypted data, the processor need only examine the encrypted data linear sequence, as opposed to linear sequence containing both encrypted data blocks and the authority blocks.

The processor can revoke membership of a cryptographic user ID associated with the space. When membership is revoked, the cryptographic user ID must be prevented from accessing and encrypted data shared within the space after the revocation of cryptographic user IDs membership. To prevent the cryptographic user ID from accessing encrypted data added to the space after the revocation, the processor can generate a cryptographic session key unknown to the cryptographic user ID whose membership has been revoked, and can encrypt the encrypted data added to the space after the revocation using the cryptographic session key. The data contained in space prior to the revocation can also be encrypted using the new cryptographic session key.

The new cryptographic session key can be an AES key computed using the following 4 steps. In step 1, the AES key can be computed using elliptic curve algorithm such as P-384. In step 2, the remaining group of devices is computed from the space linear sequence, for example, the authority linear sequence within the space. In step 3, the AES key is encrypted using a public device key of each device still in the space, and the encrypted AES key is distributed to each device within the space. Each device can decrypt encrypted AES key because each device knows its own private device key. Since no other devices know the private-key of the device, no eavesdroppers can decrypt the encrypted AES key. In step 4, a message encrypted using the AES key can be distributed to the devices within the space to ensure that everybody can decrypt the message.

In some instances, such as described in FIG. 11 C, the computation of the session key can include an additional step performed before step 3, in which the computation of the session key also includes a cryptographic hash of the last block in the space linear sequence, such as the authority linear sequence of the space. Specifically, once the AES key is computed in step 1, to generate the final key an additional step of combining the AES key and the cryptographic hash of the last block can be performed. The combination can be computed using the HKDF cryptographic function which takes his arguments the AES key and the cryptographic hash of the last block to produce the final key. The final key is then encrypted and distributed to all the devices.

In addition to computing the new session key once a member is removed from the list, the new session key can be computed when a new member is added, and the intent is to prevent the member from accessing the encrypted data shared within the space prior to the member joining.

The processor can enable a linear ordering of the team linear sequence in the space linear sequence by establishing a temporal relationship between multiple team blocks belonging to the team linear sequence and multiple space blocks belonging to the space linear sequence, as explained in FIG. 3. There can be various types of temporal relationships, such as a space block can be bound to a team block immediately preceding the space block, or the space block can be bound to a team block immediately succeeding the space block, etc. Establishing the linear order is important in authority computation as well as auditing.

For example, to determine the authority, reference needs to be made to the current policy defined in the team space at a time prior to the addition of the block. In another example, when performing auditing of the linear sequences, to determine whether a block was correctly added to a space linear sequence, the current authority needs to be computed which can be partially defined on the team linear sequence. To determine the current policy, a linear order of the blocks within the space linear sequence and the team linear sequence needs to be determined, so that the authority recorded in the team list prior to addition of a block can be computed.

Consequently, every time a block is added to the space linear sequence, the block is bound to the team linear sequence to determine the linear order between the team linear sequence and the space linear sequence. The linear order between two space linear sequences does not need to be established because the authority within the one space linear sequence does not affect the authority within the other space linear sequence.

Figure 13:
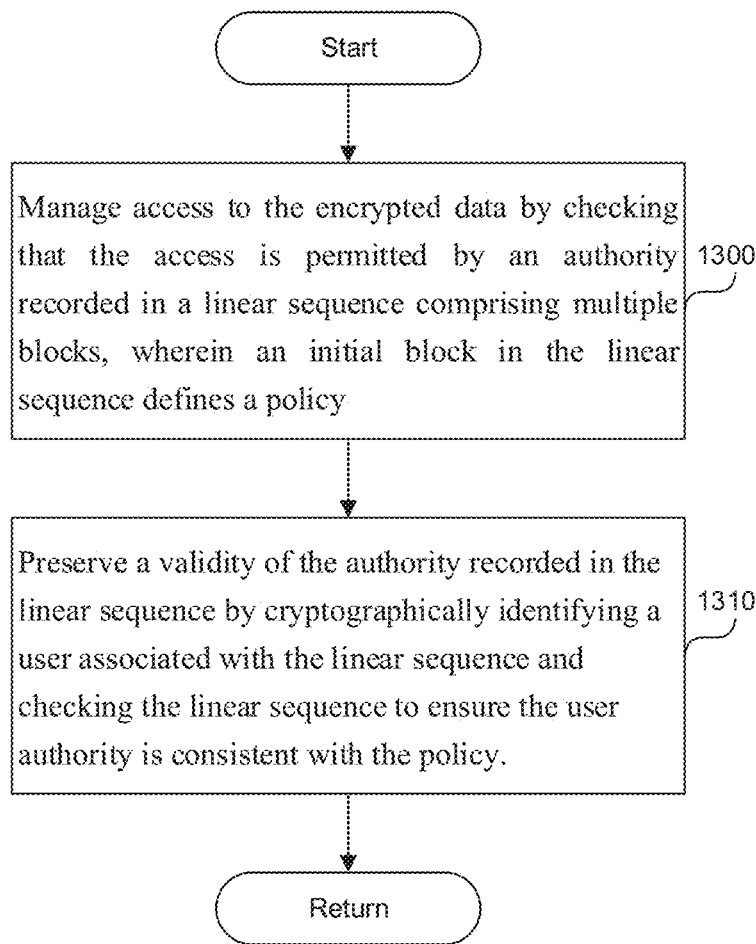
FIG. 13 is a flowchart of a method to manage access to encrypted data using a distributed ledger.

FIG. 13 is a flowchart of a method to manage access to encrypted data using a distributed ledger. In step 1300, a processor can manage access to the encrypted data by checking that the access is permitted by an authority recorded in a linear sequence including multiple blocks arranged, where an initial block in the linear sequence defines a policy specifying a role and an authority associated with the role.

In step 1310, the processor can preserve a validity of the authority recorded in the linear sequence by cryptographically identifying a user associated with the linear sequence, thus preventing an authorized user from accessing the linear sequence. Prior to adding a block associated with a user authority to the multiple blocks, the processor can check the linear sequence to ensure the user authority is consistent with the policy. Upon ensuring that the user authority is consistent with the policy, the processor can add the block associated with the user authority to the multiple blocks.

The processor can determine a user role associated with the user, an authority associated with the user role and can ensure the user authority associated with the block is within the limits of the authority associated with the user role.

For example, a block to be added to the sequence can request a modification of the policy. Prior to adding the block to the sequence, the processor can check whether the policy permits verification, and what role can modify the policy. For example, the policy can state that the policy can be modified but that only an administrator can modify the policy. If that is the case, the processor can check whether the user requesting modification is an administrator or not.

To prevent unauthorized access to the data by a compromised central server, the processor can distribute a linear sequence to multiple devices associated with multiple users, wherein each device in the multiple devices is cryptographically authenticated by a user in the multiple users. The determination whether to add a block to the linear sequence can be made independently by each of the devices, instead of being made by the central server, which creates a single point of failure.

The processor can authenticate each user using a cryptographic user ID, which can be a public-key generated using an asymmetric cryptographic algorithm. The cryptographic user ID can be a string of 2,048 bits. The asymmetric cryptographic algorithm can be RSA or DH, and can generate two keys, a public-key and a private-key. The processor can provide a first key (i.e., the private-key) in the asymmetric cryptographic key pair only to the user, and the cryptographic user ID (i.e., the public-key) in the asymmetric cryptographic key pair to multiple users into the whole system. The processor can use the public-key is a way to identify the user throughout the system. As a result, the user can assume different names in different teams or spaces, and the various names can be tied to one cryptographic user ID.

For example, to verify the user's identity, the processor can receive a text message and the text message can be signed using a private-key of the user. To verify the user's identity, the processor can use the user's public-key (i.e., the cryptographic user ID) to reverse the signing process. The processor can then compare the text message and the message obtained by reversing the signing process. If the text message and the message obtained by reversing the signing process are an exact match, the processor can verify the user's identity. Otherwise, the processor cannot verify the user's identity.

For efficiency purposes, the processor can create a team. To create a team the processor can obtain multiple cryptographic user IDs identifying multiple users. The processor can create the linear sequence including the multiple blocks arranged in the linear sequence, where the initial block in the linear sequence defines the policy specifying the role and the authority associated with the role, and where a block in the multiple blocks defines a role associated with a cryptographic user ID in the multiple cryptographic user IDs identifying a user in the multiple users.

To create a space within the team, the processor does not have to search all the cryptographic IDs in the system and can only search the cryptographic IDs contained in the team, thus preserving CPU cycles. For example, if a team contains 10 users, the whole system contains tens of thousands of users, the number of processor cycles used to create the space is reduced by approximately 1,000. The space can contain a subset of the cryptographic user IDs of the team. The space can include the data encrypted using a cryptographic key known only to the members of the space. The space can include a space linear sequence representing the members and the encrypted data.

As explained in this application, the space linear sequence can contain two or more sub-sequences for efficiency reasons. The space linear sequence can include an authority linear sequence containing blocks modifying the authority within the system, such as adding or removing users and/or administrators. Encrypted data linear sequence can include the linear sequence adding, deleting, and modifying encrypted data within the system. Encrypted data linear sequence can be further subdivided into multiple linear sequences depending on the type of the encrypted data, such as files and/or messages.

The team linear sequence, the space linear sequences, and the encrypted data can be stored in a memory configured to be continuously available to one or more computers over a network, such as the central server. So, in case most of the devices within the space are off-line, a device in the space can request encrypted data and/or can add a block to the space ordered sequence from the central server.

Figure 14:
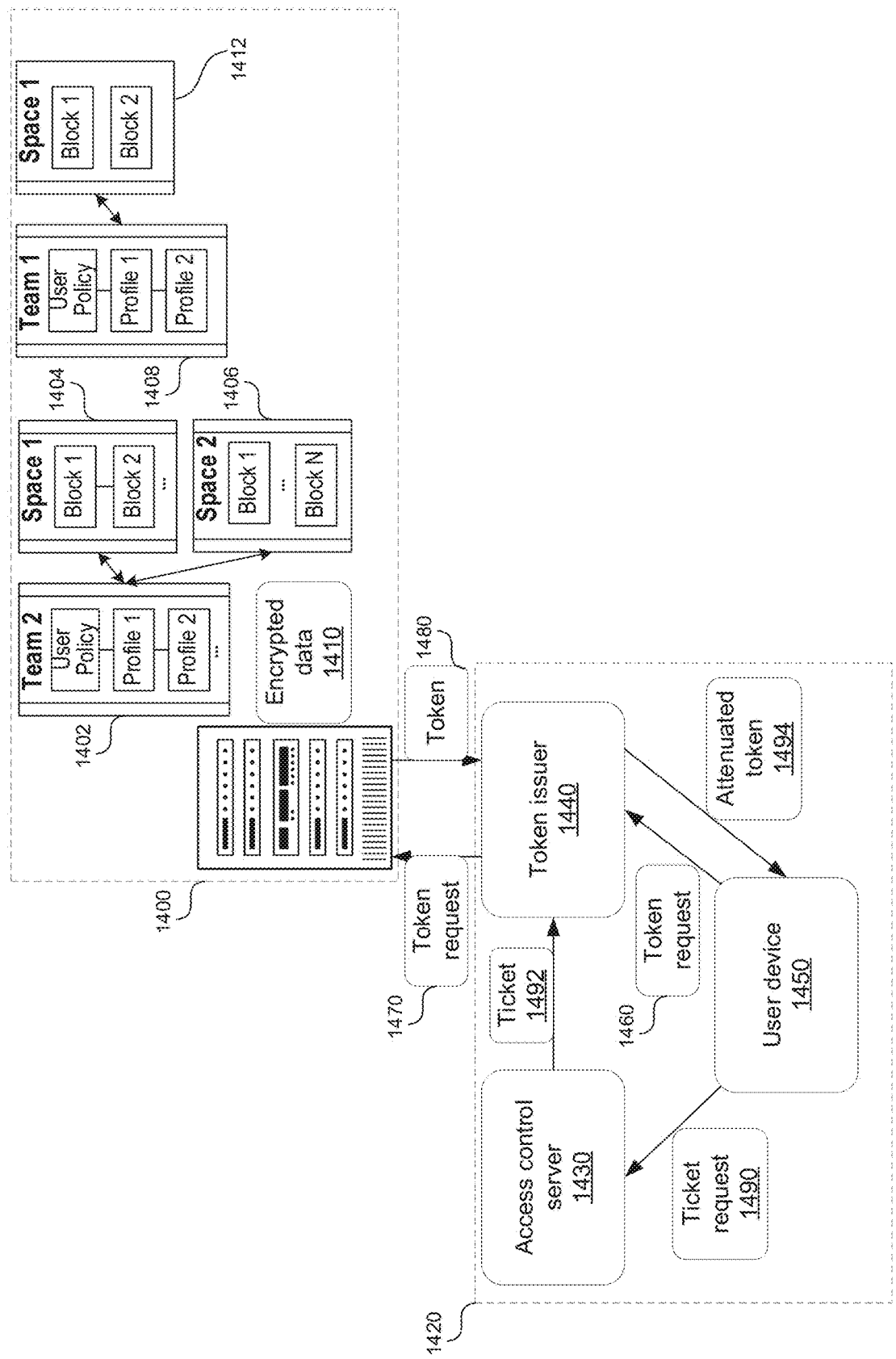
FIG. 14 shows how the secure file system can be integrated into an enterprise information technology (IT) infrastructure, according to one embodiment.

Integration of a Block Chain Managing Group Authority and Access in an Enterprise Environment FIG. 14 shows how the secure file system can be integrated into an enterprise information technology (IT) infrastructure, according to one embodiment. The server 1400 can store encrypted data 1410, which can include confidential data such as the file system, emails, instant messages, etc. The server 1400 can also store the block chains 1402, 1404, 1406, 1408, 1412 which can represent a team linear sequence or a space linear sequence, as described in this application. A block chain is a growing list of records, called blocks, that are linked using cryptography. Each block contains a cryptographic hash of the previous block, for example, 826 in FIG. 8, and data, for example, 812, 814, 816, 822, 824 in FIG. 8. A block can also include a timestamp, for example, 260, 270, 280, 290 in FIG. 2.

The block chains 1402, 1404, 1406, 1408, 1412 can record authority associated with a cryptographic user ID, as explained in this application. The block chains 1402, 1404, 1406, 1408, 1412 can be stored in plain text, and the server 1400 can control access to the block chains 1402, 1404, 1406, 1408, 1412 by allowing access to the plain text only to authorized requesters. To authorize a requester, the server 1400 can issue and manage tokens, as explained below.

The system 1420 can be implemented on customer premises, as part of an enterprise IT infrastructure. The system 1420 can include an access control server 1430, a token issuer 1440 and a user device 1450.

The access control server 1430 can control the user device's 1450 access to web applications, services and/or files running on the enterprise infrastructure by granting or denying permission to the user device 1450 based on a set of enterprise policies. The access control server 1430 can run various software such as, Microsoft Active Directory, or Apple Open Directory.

The token issuer 1440 can act as middleware between the access control server 1430, the user device 1450 and the server 1400. The token issuer 1440 can receive a token request 1460 from the user device 1450 requesting access to a portion of the block chain 1402, 1404, 1406, 1408, 1412. The token request 1460 can include a cryptographic user ID associated with the user making the request, and a specification of the portion of the block chain 1402, 1404, 1406, 1408, 1412 being requested. For example, the token request 1460 can include the cryptographic user ID in the form of an alphanumeric string, such as "9EDaleMN9CUy1V7VSYyAUTkfEGC7MUDMkugmXV VsM7Z5r01Wpg," and an identification of a team block chain 1402, 1408 or a space block chain 1404, 1406, 1412.

The token issuer 1440 can send a request 1470 for a token from the server 1400 granting permission to the user device 1450 to access the specified portion of the block chain. The token request 1470 can include the cryptographic user ID and the identification of the team block chain 1402, 1408 or the space block chain 1404, 1406, 1412 contained in the token request 1460.

Upon receiving the token request 1470, the server 1400 can compute whether the cryptographic user ID has the authority to access the requested portion of the block chain 1402, 1404, 1406, 1408, 1412 based on the membership information stored in the block chain 1402, 1404, 1406, 1408, 1412. For example, if the cryptographic user ID requests access to space block chain 1404, the server 1400 can check whether the cryptographic user ID is a member of the space block chain 1404. If the cryptographic user ID is a member of the space, the server 1400 can determine that the cryptographic user ID has the necessary authority and can issue a token 1480. Otherwise, the server 1400 can determine the cryptographic user ID is not authorized to access the space block chain 1404 and can refuse to issue the token 1480.

The token 1480 can grant unlimited read access to the requested portion of the block chain, such as the space block chain 1404. In other words, whenever the server 1400 and/or the token issuer 1440 receive the token 1480 from any source, the server 1400 does not perform the authority computation described above, and immediately grants access to the portion of the block chain specified in the token 1480, such as the space block chain 1404. Effectively, the token 1480 creates an efficiency gain by allowing the server 1400 to not perform the expensive computation of calculating authority every time the cryptographic user ID requests access to the space block chain 1404. Instead, the token 1480 allows the server 1400 to perform a less expensive calculation of simply verifying the token 1480, as described below.

Before passing the token 1480 to the user device 1450, the token issuer 1440 can check with the enterprise access control server 1430 for what kind of permissions the user device 1450 has regarding the space block chain 1404. To perform the check, the user device 1450 can send a ticket request 1490 to the access control server 1430. The ticket request 1490 can contain the access control server user identification, such as the user's login ID and the user's password. The user's login ID and the user's password used to identify the user to the access control server 1430 are different from the cryptographic user ID used to identify the user to the server 1400.

Upon verifying the user's identification, such as the login ID and the password, the access control server 1430 can check a permission that the user has according to the company policy and send the ticket 1492, including the permission, to the token issuer 1440. For example, the company policy can specify that while the user is on vacation, the user does not have access to email. Consequently, the permission can specify various restrictions such as "the user is allowed access only when the user is at a particular location, such as inside the company building," "the user is allowed access only during a particular time," and/or "the user is only allowed access when the user device 1450 is connected to a particular network," such as the company network.

The token issuer 1440 can incorporate the permissions specified in the ticket 1492 into the token 1480 to obtain an attenuated token. The permissions specified in the ticket 1492 may not increase the permissions granted by the token 1480 but can either leave the permissions unchanged or attenuate, that is, reduce, the permissions granted by the token 1480.

In addition, the token issuer 1440 can add additional restrictions to an attenuated token, such as when the attenuated token expires (e.g., within 3 or 5 minutes), location restrictions, Internet address restrictions, etc. The additional restrictions can be added to the attenuated token to produce the attenuated token 1494, which is sent to the user device 1450.

The user device 1450 can request to be added to a team block chain 1402, 1408. To be added to the team, the user device 1450 can authenticate itself with the access control server 1430, which can send the ticket 1492 authenticating the user, to the token issuer 1440. In addition, the token issuer 1440 can authenticate the user with the server 1400 by asking the server to compute the authority stored in the team block chain 1402, 1408 for the cryptographic user ID associated with the user. If both the access control server 1430 and the server 1400 authorize the user, the user can be added to the team block chain 1402, 1408.

Even if the access control server 1430 is controlled by an adversary, because the access control server 1430 cannot increase the permissions granted by the token 1480, the adversary would still only have the authority that is in the block chain 1402, 1404, 1406, 1408, 1412 and granted by the token 1480. If the adversary controls the token issuer 1440, the adversary can only control tokens 1480 for the teams that the token issuer 1440 has received from the server. In both cases, the adversary would only be able to read the plain text data, and not the encrypted data 1410. Further, the adversary would not be able to modify the plain text data.

The token issuer 1440 can receive an indication of how much the access control server 1430 is trusted. If the access control server 1430 is not trusted, the token 1494 can be issued or a user can be added to a team 1, 2 without involving the access control server 1430.

Figure 15:
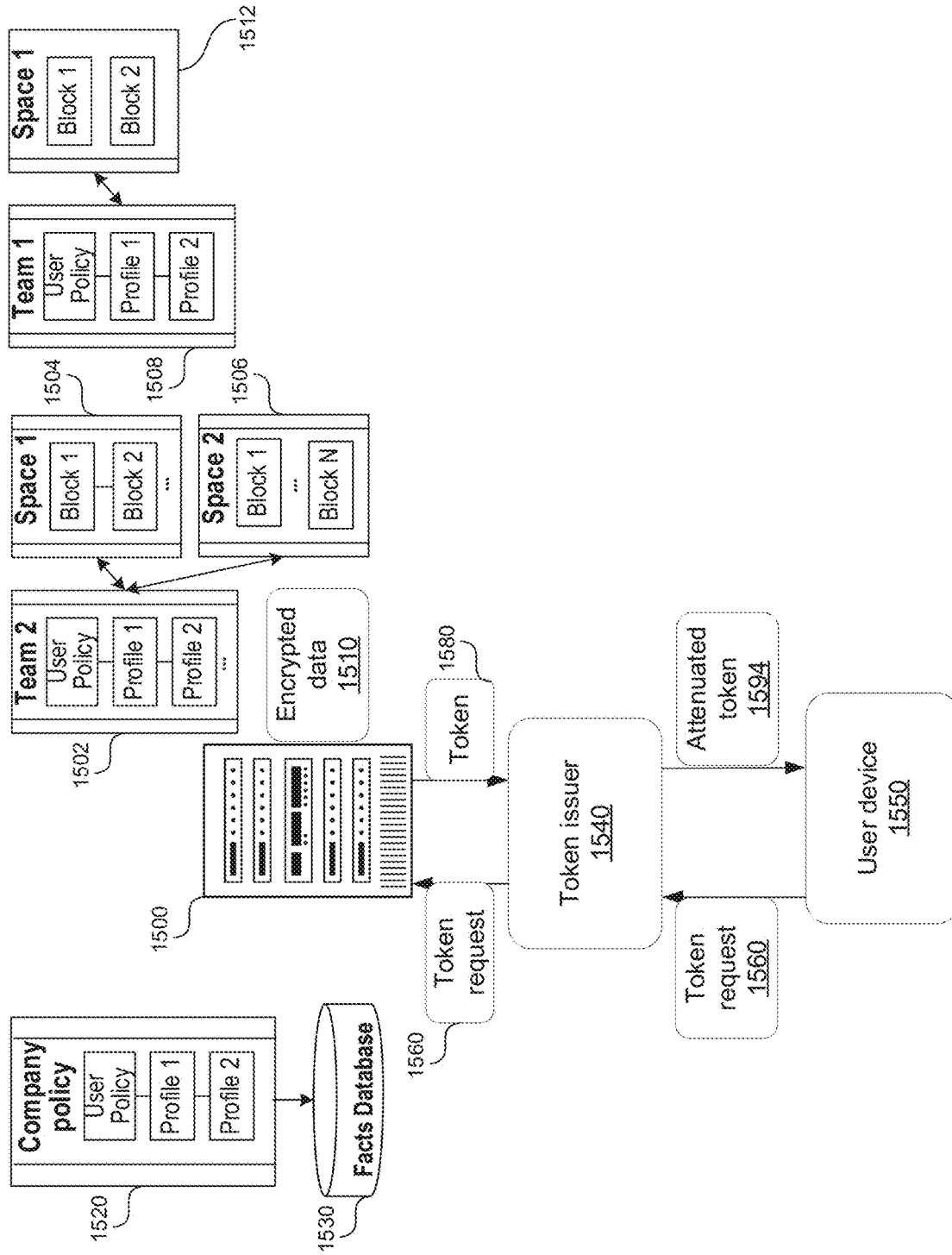
FIG. 15 shows how the secure file system can be integrated into an enterprise IT infrastructure, according to another embodiment.

FIG. 15 shows how the secure file system can be integrated into an enterprise IT infrastructure, according to another embodiment. The access to the block chain 1502, 1504, 1506, 1512 can be managed without the access control server 1430 in FIG. 14. The company policy implemented by the access control server 1430 can be recorded on a block chain 1520, or can be part of a fact database 1530. The block chain 1520 and the fact database 1530 can exist independently of a team 1, 2 or a space 1, 2. The server 1500 and the token issuer 1540 can be part of the enterprise IT infrastructure, and/or can be provided as a cloud service. Removing the access control server 1430 reduces a number of potential security issues and allows the system to function even if the access control server 1430 is not trusted.

When a user device 1550 requests a token using the token request 1560, the token issuer can forward the token request 1560 to the server 1500. The token request 1560 can contain the cryptographic user ID and an identification of a portion of the block chain 1502, 1504, 1506, 1508, 1512 to which the access is being requested. For example, the identification of the portion of the block chain can identify the team block chain 1508.

The server 1500 can compute the authority of the cryptographic user ID recorded in the team block chain 1508, to determine whether the cryptographic user ID is a member of the team. If the cryptographic user ID is not a member of the team, the server 1500 can refuse to send a token to the token issuer 1540. If the cryptographic user ID is a member of the team, the server 1500 can check the facts database 1530 and/or the company policy block chain 1520 to determine whether the company policy puts any restrictions on the access of the cryptographic user ID. In this case, a single cryptographic user ID can be used to check both the permissions associated with the server 1500 and permissions associated with the company policy, as opposed to requiring separate authentication, as explained in FIG. 14.

The server 1500 can send a message 1580 to the token issuer 1540. The message 1580 can include a token granting unrestricted read access to the team block chain 1508, and permissions associated with the company policy. The token issuer 1540 can create the attenuated token 1594 by combining the token and the permissions associated with the company policy and forward the attenuated token 1594 to the user device 1550.

The user device 1550 may want to further attenuate the attenuated token 1594 to grant a permission to a third party to access the team block chain 1508. To do so, the user device 1550 can send a request to the token issuer 1540 containing the attenuated token 1594 and the additional permission imposed on the attenuated token, for example a temporal permission. The token issuer 1540 can incorporate the additional permission into the attenuated token 1594, and issue a new token to send to the user device 1550, which the user device 1550 can forward to the third party.

Clock

Figure 16A:
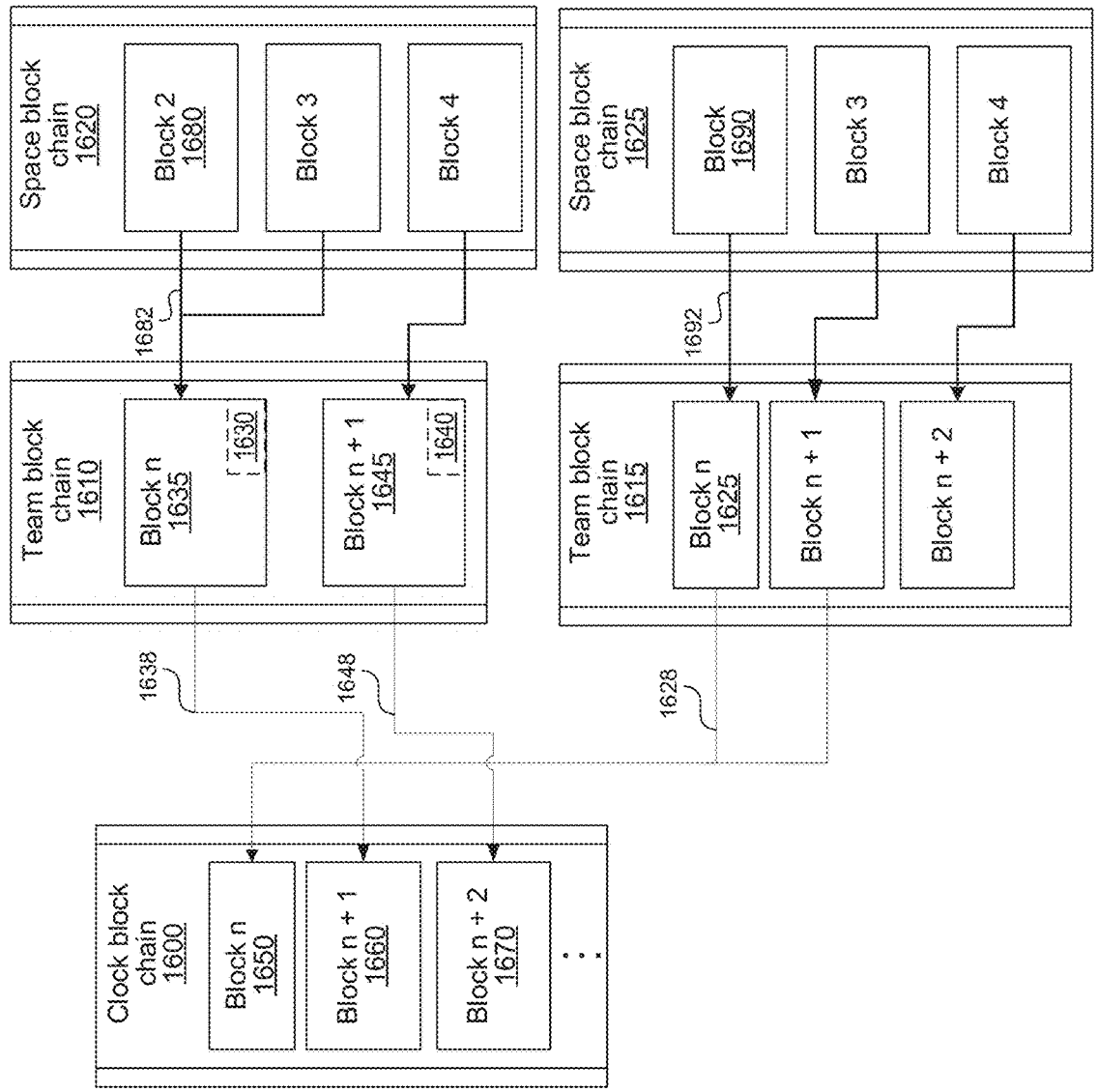
FIG. 16A shows how a clock can be implemented using a block chain.

FIG. 16A shows how a clock can be implemented using a block chain. To incorporate the temporal permission, discussed in FIG. 15, a processor can create an always increasing clock, as explained for example in FIG. 2, where each block 1635, 1645 (only two labeled for brevity) in the block chain 1610, 1615, 1620, 1625 is time stamped, such that optional timestamps 1630, 1640 within the blocks 1635, 1645 are always increasing.

The temporal permission in a token can be expressed in terms of the timestamps, such as, the token is valid 5 minutes after the timestamp 1630. So, if the timestamp 1640 is more than 5 minutes after the timestamp 1630, a token holder is not allowed read access to the block 1645. The blocks 1635, 1645 can be ordered within the team and the sequence but may not be able to be ordered between two different teams or two different sequences. The timestamps 1630, 1640 can be placed within the header of the block 1635, 1645, respectively.

Instead, or in addition, the clock can be implemented using the block chain 1600. The clock block chain 1600 can include blocks 1650, 1660, 1670, etc., each representing a tick of the clock, such as 1 second, 1 minute, 5 minutes, half an hour, an hour. The frequency of the blocks 1650, 1660, 1670 can be related to the computational resources of the enterprise. The higher the computational resources, the more frequent the block 1650, 1660, 1670, and the lower the computational resources the less frequent the blocks 1650, 1660, 1670.

Each block 1625, 1635, 1645 (only three labeled for brevity) in team block chain 1610, 1615 can have a binding 1628, 1638, 1648, respectively, to a corresponding block 1650, 1660, 1670 in the clock block chain 1600. For example, the team block 1625 has a binding 1628 to the block 1650, meaning that the team block 1625 was created after the creation of the block 1650, and before the creation of the block 1660.

The blocks 1680, 1690 (only two labeled for brevity) in the space block chains 1620, 1625 can have a binding 1682, 1692, respectively, to a corresponding block 1635, 1625 to the team block chains 1610, 1615. For example, the binding 1682 indicates that the block 1680 is created after the block 1635, but before the block 1645.

Consequently, each block 1680, 1690 in the space block chains 1620, 1625 is bound to the corresponding block in the team block chains 1610, 1615, and indirectly to the block 1650, 1660, 1670 in the clock block chain 1600. For example, based on the bindings shown in FIG. 16A, block 1690 is created after block 1650, but before block 1660.

The temporal permission in a token can be expressed in terms of the clock block chain 1600, block 1650, 1660, 1670, or in terms of a wall clock. The clock block chain 1600 can correspond to the wall clock, with the constraint that the blocks 1650, 1660, 1670 in the clock block chain 1600 are always increasing.

For example, when the temporal permission is formulated in terms of the wall clock, the temporal permission can state that the token is valid until Dec. 1, 2020. The first block 1650, 1660, 1670 that has a timestamp after the specified date designates the time at which, and after which, the token is no longer valid. All the blocks bound to the first block designating such time are not accessible to the token holder.

In another example, when the temporal permission is formulated in terms of the block 1650, 1660, 1670, the temporal permission can state that the token is valid for 1½ hours after block 1650. The first block 1660, 1670 that has a timestamp after the specified time designates the time at which, and after which, the token is no longer valid. All the blocks bound to the first block designating such time are not accessible to the token holder.

Figure 16B:
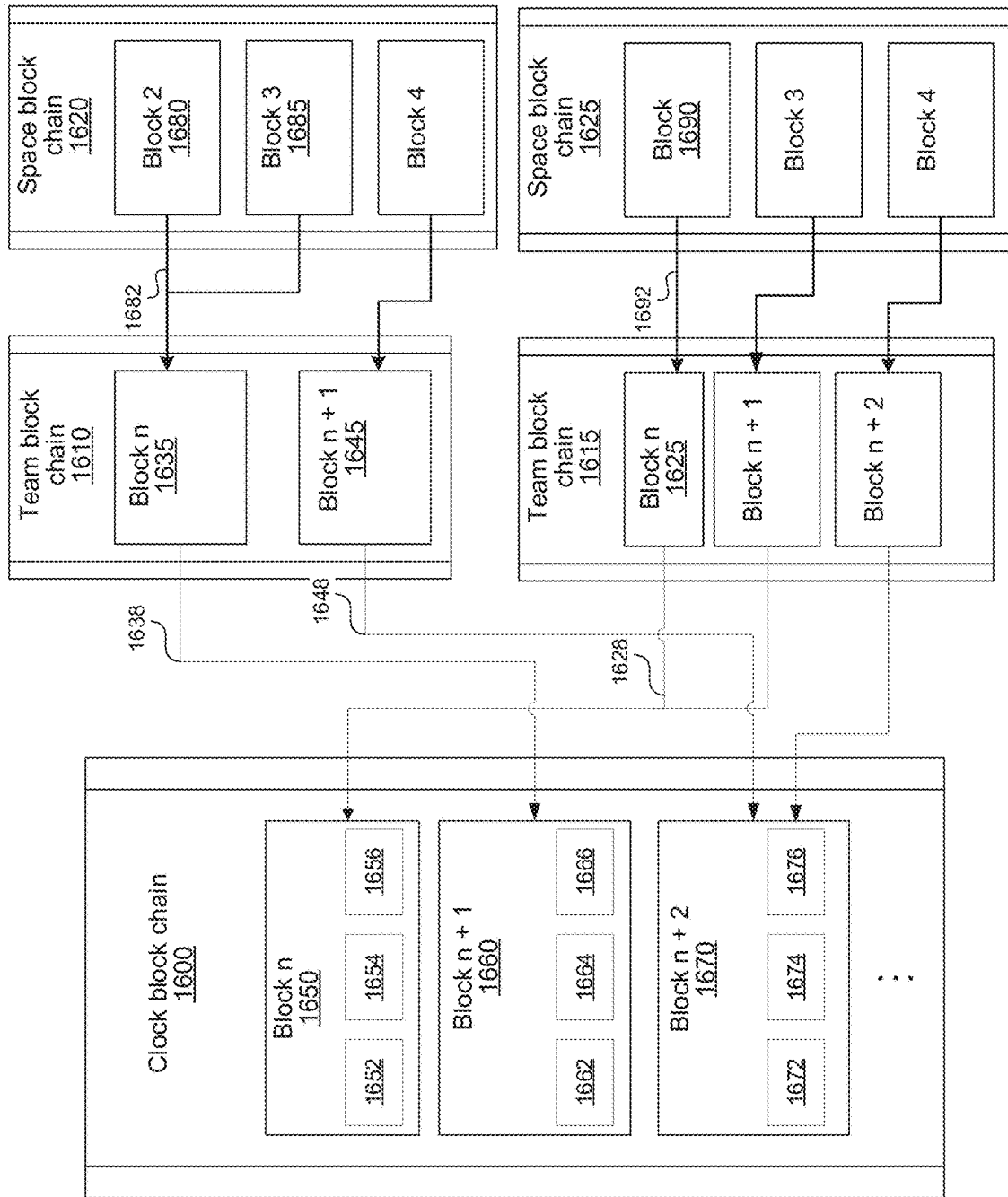
FIG. 16B shows contents of a clock block chain.

FIG. 16B shows contents of a clock block chain. The block 1650, 1660, 1670 of the clock block chain 1600 can contain several fields including a wall clock field 1652, 1662, 1672, sequence clock field 1654, 1664, 1674 and a root of cryptographic hash tree field 1656, 1666, 1676.

The wall clock field 1652, 1662, 1672 can be a record of the time indicated by a clock of a server storing the clock block chain 1600. The wall clock fields 1652, 1662, 1672 do not have to be always increasing, so the fields 1652, 1662 can have the same value, or the field 1672 can indicate a time before the time indicated by field 1652.

The sequence clock 1654, 1664, 1674 is always increasing. The sequence clock can be indicated by multiple servers that are measuring and agreeing on the current time. The multiple servers provide redundancy, so that if one server fails, the clock block chain 1600 can continue measuring time. The current time agreed upon has the property of being greater than the previous current time. The current time can be the latest time measured by the multiple servers, or it can be a time that the most servers agree on, as long as the current time is greater than the previously agreed-upon current time.

The root of cryptographic hash tree field 1656, 1666, 1676 can be a Merkle root, and can include the cryptographic hash of all the most recent blocks in the block chains bound to the block 1650, 1660, 1670. For example, the cryptographic hash tree field 1662 can contain the cryptographic hash of block 1635 and block 1685. The reason to provide a root of the cryptographic hash tree, instead of a list of all the most recent blocks, can be to preserve bandwidth and storage resources because communicating and storing the root is less expensive than communicating and storing the list of all the blocks. Another reason can be to keep the list of all the blocks secret, by only providing the root from which, with some additional information, the list of all the blocks can be calculated.

Figure 17:
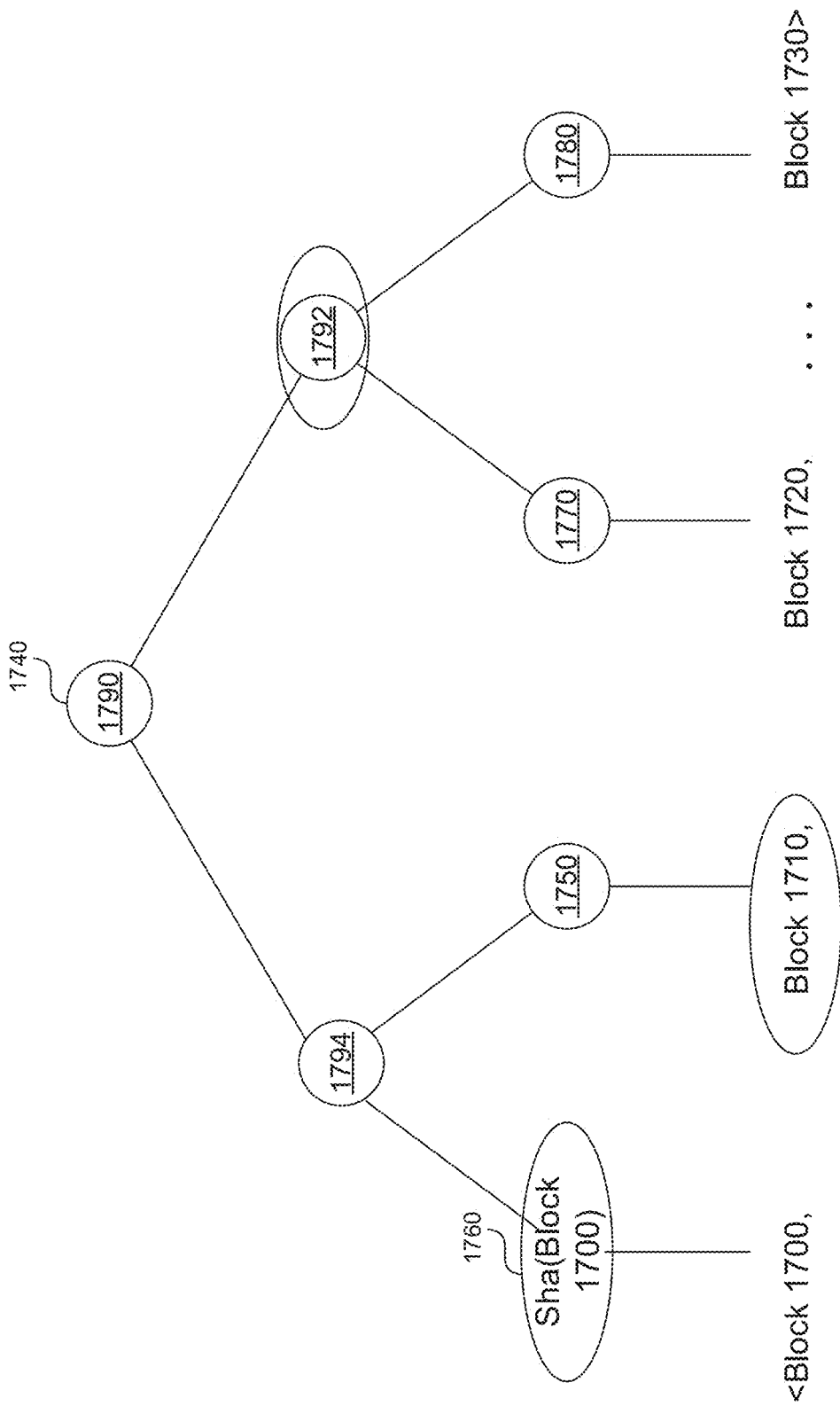
FIG. 17 shows a cryptographic tree.

FIG. 17 shows a cryptographic tree. The endpoints represent block 1700, 1710, 1720, 1730 that are all of the most recent blocks in the block chains bound to a block in the clock block chain 1600 in FIG. 16. The cryptographic tree 1740 is constructed by, at each node, computing a cryptographic hash such as SHA of the child nodes. For example, node 1750 is computed by computing the cryptographic hash of block 1710, while the node 1792 is computed by computing the cryptographic hash of nodes 1770, 1780. Finally, the root 1790 is computed by computing the cryptographic hash of the nodes 1792, 1794.

The root 1790 can be stored in the clock block chain 1600. The value of the root 1790 is unique to the sequence of blocks 1700, 1710, 1720, 1730 that generated the cryptographic tree 1740. Storing a single value, such as root 1790, in the clock block chain 1600 preserves bandwidth and storage space compared to storing the value of all the blocks 1700, 1710, 1720, 1730. Further, storing the root 1790 does not disclose all the blocks 1700, 1710, 1720, 1730 used in constructing the cryptographic tree 1740.

To check whether a block is part of the cryptographic tree 1740, only a subset of all the elements in the cryptographic tree 1740 needs to be supplied. For example, if there are N endpoints, that is, N blocks used in constructing the cryptographic tree 1740, only log (N) elements need to be supplied to check whether the root 1790 contains a particular element.

In a more specific example, to check whether block 1710 is a member of root 1790, only the block 1710 and nodes 1760, 1792 need to be supplied. Once supplied, the value of the node 1750 can be computed from the value of block 1710. The value of the node 1794 can be computed from the value of the nodes 1750 and 1760, but, for example, by computing SHA (node 1760, node 1750). The root node can be computed from the values of nodes 1794 and 1792. If the so computed root node matches the root 1790 stored in the clock block chain 1600, the membership of the block 1710 in the cryptographic tree 1740 can be confirmed.

Token

Figure 18:
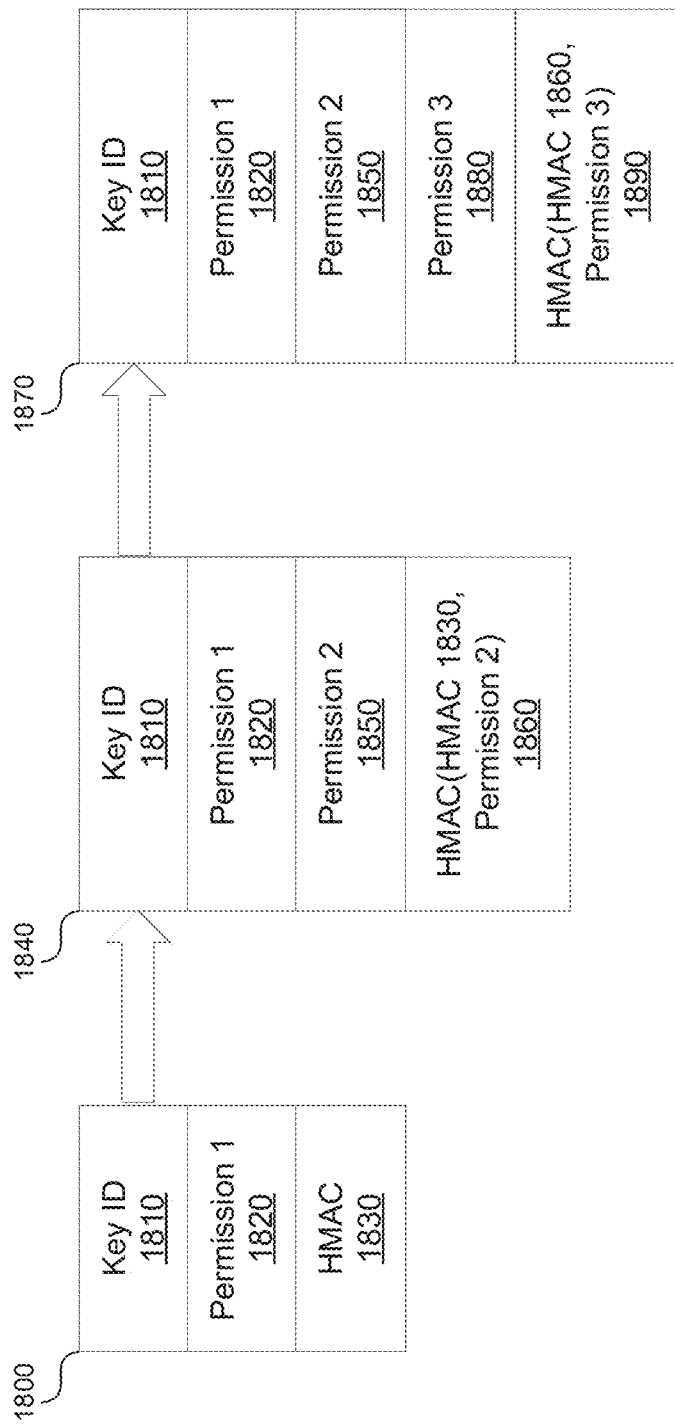
FIG. 18 shows anatomy of a token.

FIG. 18 shows the anatomy of a token. The token 1800 can be the token 1480 in FIG. 14, 1580 in FIG. 15, granted by a first authority source, such as the server 1400 in FIG. 14, 1500 in FIG. 15 storing the authority-defining block chains 1402, 1404, 1406, 1408, 1412 in FIG. 14, 1502, 1504, 1506, 1508, 1512 in FIG. 15.

The token 1800 can include a key identifier (ID) 1810 identifying a secret root key, a permission 1820 and a cryptographic hash 1830 of the permission 1820 and the secret root key. The secret root key can be known to the server 1400, 1500 and/or to the token issuer 1440 in FIG. 14, 1540 in FIG. 15. Using the key identifier 1810, the server 1400, 1500 and/or the token issuer 1440, 1540 can retrieve the secret root key. The cryptographic hash 1830 can be HMAC, sometimes expanded as either a keyed-hash message authentication code or a hash-based message authentication code. HMAC can be used to simultaneously verify both the data integrity and the authenticity of a message, as with any MAC. Any cryptographic hash function, such as SHA-256 or SHA-3, may be used in the calculation of an HMAC. As with all cryptographic hashes, the cryptographic hash 1830 is not reversible, meaning given the output of the cryptographic hash 1830, determining the inputs into the cryptographic hash is not computationally feasible.

The token 1800, with an addition of a second permission 1850, can change to become an attenuated token 1840. The attenuated token 1840 can be the token 1494 in FIG. 14, 1594 in FIG. 15. The second permission 1850 can be granted by a second authority source such as the access control server 1430 in FIG. 14 or the company policy recorded in the block chain 1520 in FIG. 15. The token 1800 can contain any number of permissions, which are also called constraints or caveats.

To obtain an attenuated token 1840, the server 1400, 1500 can add the second permission 1850 to the token 1840, compute a second cryptographic hash 1860 of the first cryptographic hash 1830 and the second permission 1850 and remove the first cryptographic hash 1830 from the token, thereby obtaining the attenuated token 1840.

The second permission 1850 is interpreted to only decrease the first permission 1820. By removing the cryptographic hash 1830 from the first token, token 1840 is created where the first permission 1820 is limited by the second permission 1850. Because the cryptographic hash 1860 is not reversible, an attacker cannot guess the cryptographic hash 1830, and the token 1840 is secure. Consequently, the largest authority is granted by the original token 1800, having only one permission 1820.

For example, the first permission 1820 can specify the cryptographic user ID is being granted access to read metadata associated with block chains 1402, 1404, 1408, 1412, 1502, 1504, 1508, 1512. The second permission 1850 can specify a team block chain, such as team block chain 1402, 1408, 1502, 1508, to which the cryptographic user ID has access. Additional permissions can be added to the attenuated token 1840 to make an even more attenuated token 1870.

In one embodiment, the attenuated token 1870 can be generated upon request by a user device. For example, a third permission 1880 can specify a space block chain 1404, 1406, 1412, 1504, 1506, 1512 within the team block chain 1402, 1408, 1502, 1508 to which the cryptographic user ID can have access. A third cryptographic hash 1890 can be included in the attenuated token 1870, or the cryptographic hash 1890 can be a cryptographic hash of the cryptographic hash 1860 and the third permission 1880. The cryptographic hash 1860 can be removed from the token 1870.

In another embodiment, the user device can grant the attenuated token 1870 to a third party. For example, the third party can have a proprietary video processing algorithm, and the attenuated token 1870 can grant access to a video that the user device has access to. The reason for granting the access to the third party can be that a third party has access to a faster network connection than the user device. The attenuated token 1870 can contain a third permission 1880 specifying the video to which the attenuated token 1870 grants access.

To request the video, the third party can send the attenuated token 1870 to the server 1400, 1500 and/or to the token issuer 1440, 1540. The server can verify the token, as explained below, using the secret root key, and can grant access to the video to the third party.

Figure 19:
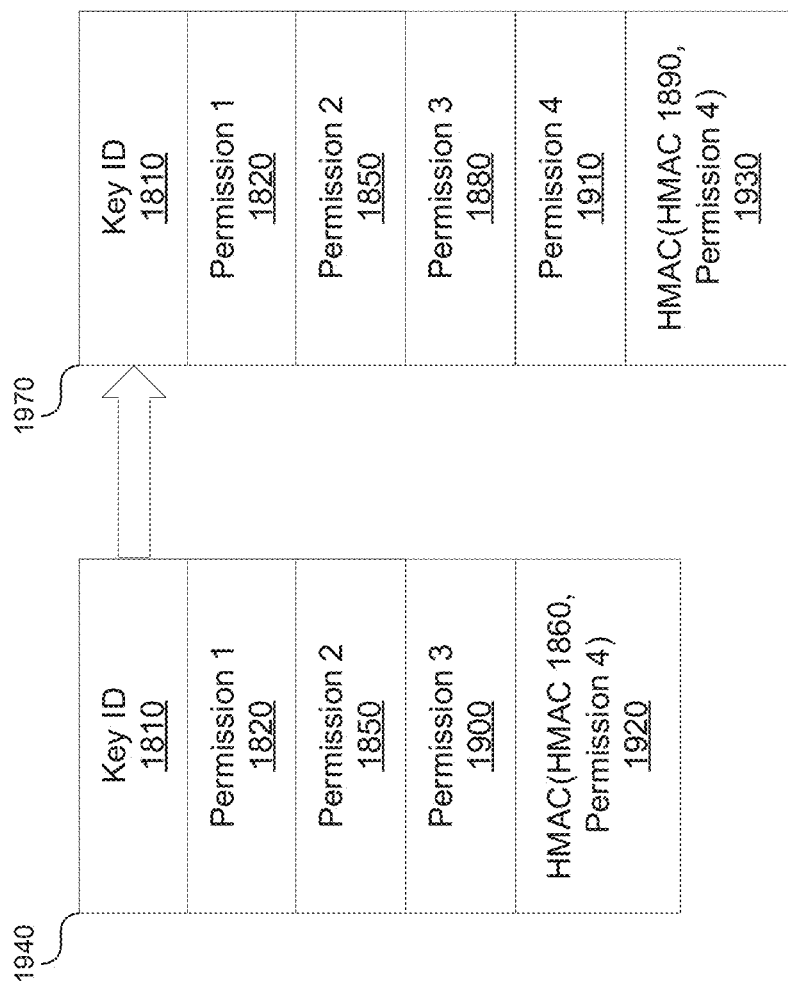
FIG. 19 shows a token preventing a replay attack.

FIG. 19 shows a token preventing a replay attack. To prevent an attacker from performing a replay attack by obtaining the token, and providing a copy of the token to the token issuer 1440 in FIG. 14, 1540 in FIG. 15, and/or the server 1400 in FIG. 14, 1500 in FIG. 15, the attenuated tokens 1840, 1870 in FIG. 18 can include a single use permission 1900, 1910 to obtain attenuated tokens 1940, 1970. The cryptographic hash 1920 can be a cryptographic hash of the cryptographic hash 1860 in FIG. 18 and the third permission 1900, while the cryptographic hash 1930 can be a cryptographic hash of the cryptographic hash 1890 in FIG. 18 and the fourth permission 1910. If the tokens 1940, 1970 are intercepted on request, replaying the token 1940, 1970 does not grant any access to the attacker because the tokens 1940, 1970 are not valid after the one request is satisfied.

Recovery Key

Figure 20:
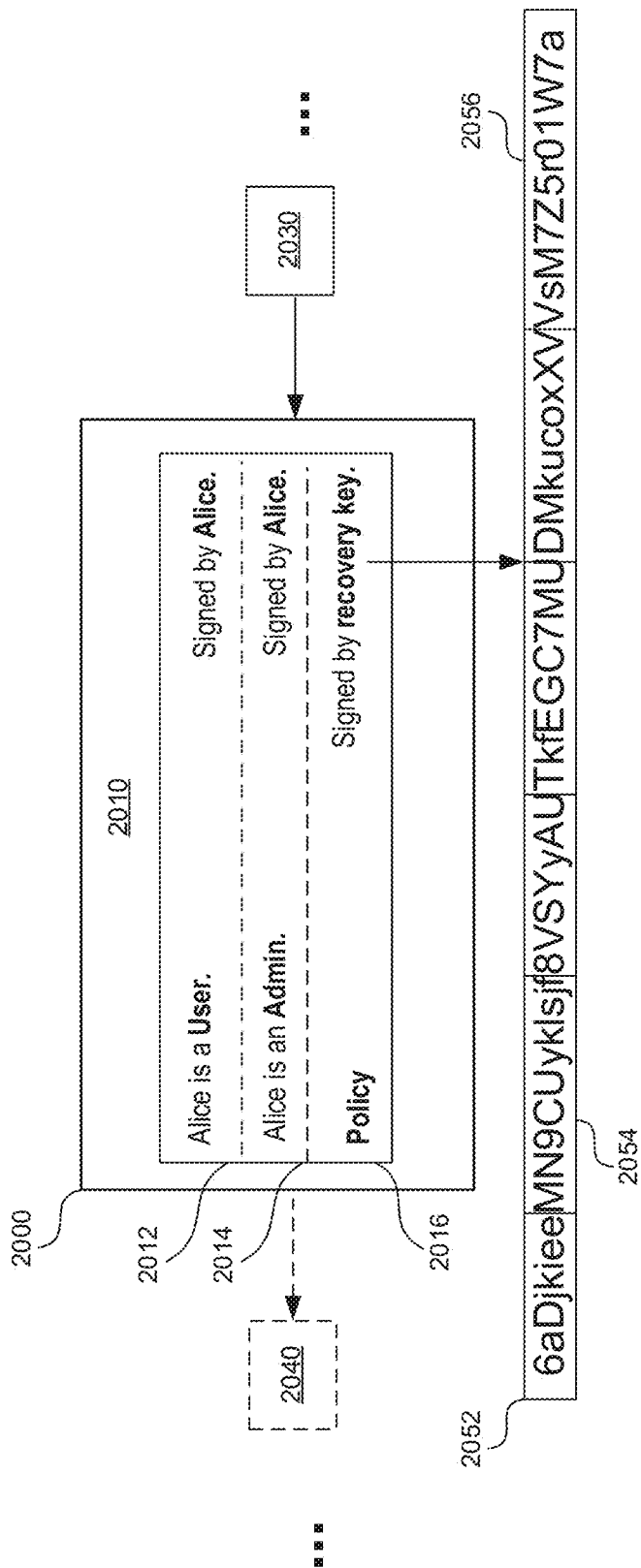
FIG. 20 shows how a recovery key can be used.

FIG. 20 shows how a recovery key can be used. Block chain 2000 can contain block 2010. Block 2010 can be the initial block of the block chain 2000, or it can be any other block in the block chain 2000. Block 2010 can contain multiple events 2012, 2014, 2016. Most of the events in the block chain 2000, like events 2012 and 2014, are signed by a public key of a user entering the event, such as Alice. However, an event, such as the event 2016, can be signed by a recovery key 2050.

The recovery key 2050 is a special key that circumvents entire authority and policy computation. Before a processor even determines whether the policy authorizes the event 2016, the processor can determine whether the event is signed by the recovery key 2050. If the event is signed with the recovery key 2050, the processor determines that the event is allowed regardless of authority and policy. Thus, the recovery key 2050 overrides the entire authority and policy.

The recovery key 2050 needs to be protected extremely well. Consequently, the recovery key 2050 can be split into multiple parts 2052, 2054, 2056 (only three labeled for brevity), such as 30 parts. The different parts 2052, 2054, 2056 can be put in different safe places, such as different HSMs, each having different operating procedures. The different parts 2052, 2054, 2056 can be encrypted, and one person can have a password to store the key parts 2052, 2054, 2056 in a file, and a different person can have a password to retrieve the key parts 2052, 2054, 2056 from the file. The assembly of the recovery key 2050 can require the participation of all, or at least a majority of, devices and users having parts of the 2052, 2054, 2056 of the recovery key 2050, thereby safeguarding accidental use of the recovery key 2050.

The existence and the use of the recovery key 2050 can be optional. The recovery key can be set to a predetermined value, such as all zeros, which indicates to the processor that the recovery key 2050 has not been generated and does not exist. The processor can ignore any event signed by the recovery key 2050 set to the predetermined value.

Split Key

Figure 21:
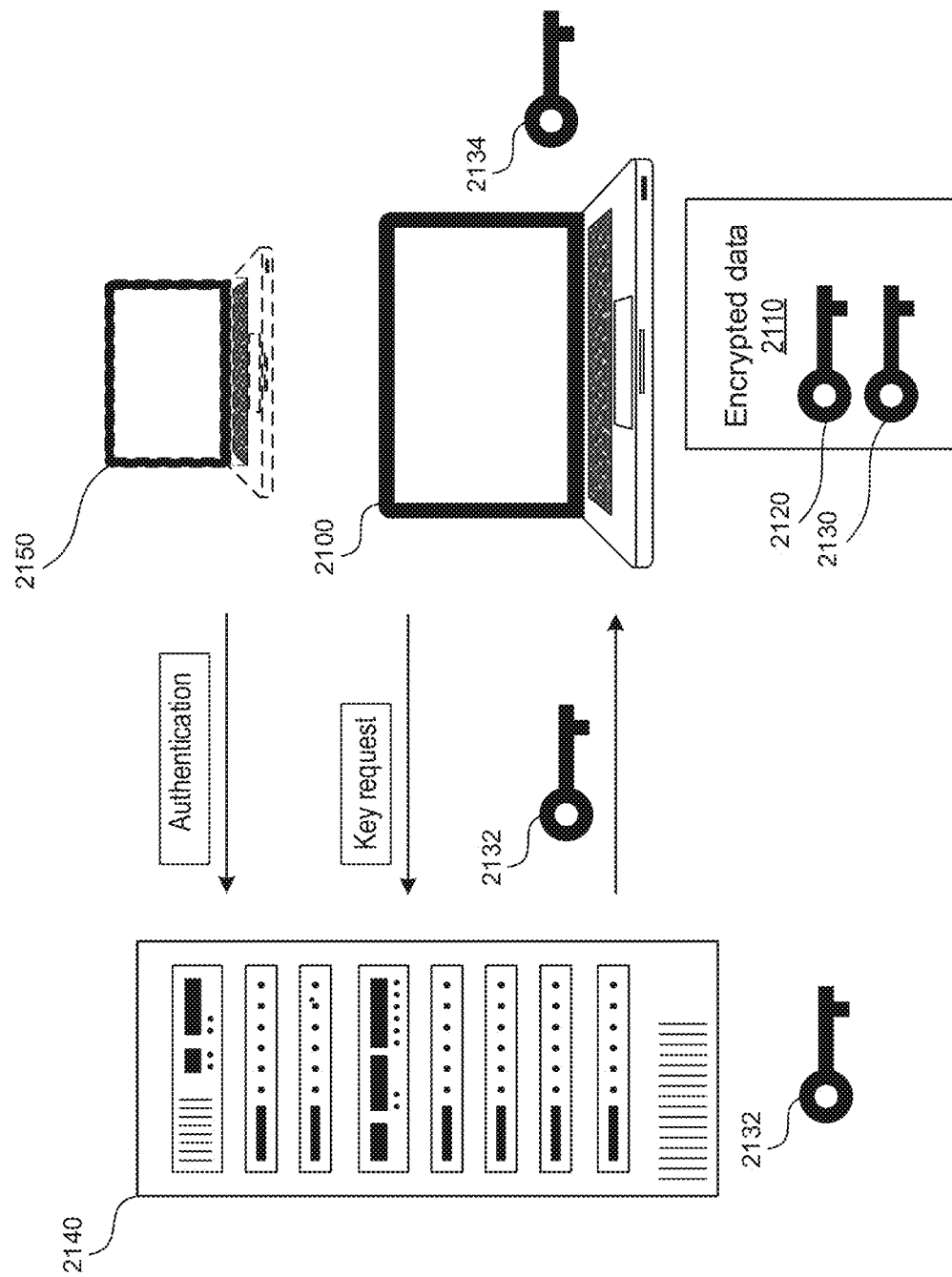
FIG. 21 shows a split key system limiting an attack to the encrypted data when a user device is compromised.

FIG. 21 shows a split key system limiting an attack to the encrypted data when a user device is compromised. The user device 2100 can store data 2110 encrypted using multiple keys, such as a channel session key 2120, as described in this application, as well as a split key 2130. The split key 2130 can be separated into at least two parts 2132, 2134. The first key part 2132 can be stored on the server 2140, while the second key part 2134 can be stored on the user device 2100.

To encrypt data, the user device 2100 can request the first key part 2132 from the server 2140. Upon receiving the first key part 2132, the user device 2100 can calculate a key derivation function (KDF) that is a combination of the first key part 2132 and the second key part 2134 to obtain the split key 2130 with which to encrypt the data. Similarly, to decrypt the encrypted data 2110, the user device 2100 can request the first key part 2132 from the server 2140 and calculate the split key 2130 using the KDF, which is a combination of the first key part 2132 and the second key part 2134.

Once the user device 2100 calculates the split key 2130, the user device 2100 can forget the first key part 2132 based on a predetermined rule. The predetermined rule can state that for every time the user device 2100 is suspended and/or rebooted, the first key part 2132 is forgotten; for every three files that are opened using the split key 2130, the first key part 2132 is forgotten; for every time the application associated with the key derivation function is closed, the first key part 2132 is forgotten; for every time a geolocation and/or an IP address of the user device 2100 is outside of a predefined space, the first key part 2132 is forgotten; etc.

Because the user device 2100 forgets the first key part 2132 based on the predetermined rule, the server 2140 can revoke access to the user device 2100. For example, if the server 2140 is notified that the user device 2100 has been compromised, such as by being stolen and/or hacked by an attacker, the server 2140 can record that the request for the first key part 2132 from the user device 2100 should be refused. The next time the user device 2100 requests the first key part 2132, the server 2140 can refuse to provide the first key part 2132. Consequently, the encrypted data 2110 remains encrypted on the user device 2100 and is not available to the attacker.

To increase security of the first key part 2132, the server 2140 can require a multifactor authentication before providing the first key part 2132. For example, the server 2140 can require a second device 2150 to provide an authentication to the server 2140. Once the server 2140 receives the authentication from the second device 2150, the server 2140 can provide the first key part 2132 to the user device 2100.

System Updates

Figure 22:
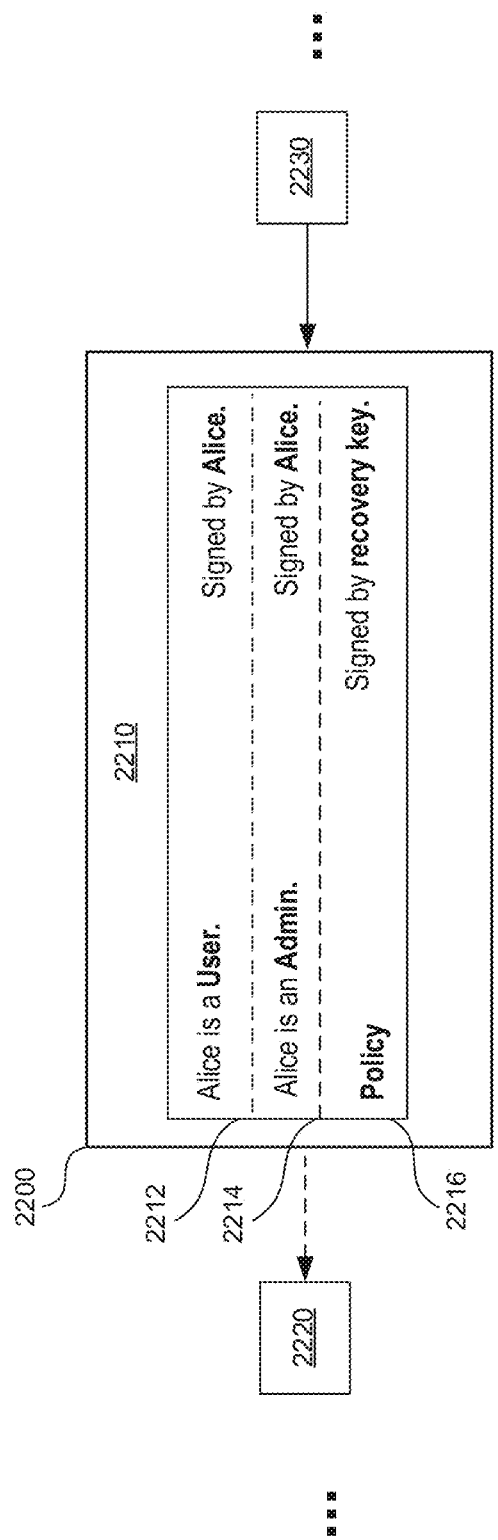
FIG. 22 shows an update to the interpretation of the semantics of a block chain.

FIG. 22 shows an update to the interpretation of the semantics of a block chain. The block chain 2200 can contain blocks 2210, 2220, 2230, etc. Rules for interpreting the semantics of the block chain 2200 can be coded in the blocks 2210, 2220, 2230, and can be represented as a source code in a programming language such as Rust, Python, Go, or a proprietary language. Updating interpretation of the semantics of the block chain 2200 (including authority, policy, etc.) can happen in the block chain 2200.

For example, the block 2210 can contain source code updating how to interpret the blocks 2230, subsequent to the block 2210. By putting the semantics in the block chain 2200, every instance of the system, spread across multiple clients and containing different block chains, can update the local rules for interpreting the semantics of the block chain when they receive the block 2210. So, blocks 2220 preceding the block 2210 are interpreted according to a first set of rules, while the blocks 2230 subsequent to the block 2210 are interpreted according to the second set of rules established by the block 2210.

For example, the rules for interpreting the semantics of the block chain 2200 can govern how race conditions are resolved. Such rules can be specified in system policy 530 in FIG. 5, user policy 540 in FIG. 5 or application policy 550 in FIG. 5. Consequently, the block 2210 can update system 530, user 540, and/or application 550 policy.

To prevent introducing a bug into the rules for interpreting the semantics of the block chain 2200, the policy engine 530, 540, 550 can be formally verified. Formal verification is the act of proving the correctness of the policy 530, 540, 550 with respect to a certain formal specification or property, using formal methods of mathematics. The formal verification can provide assurance that there are no bugs in the policy 530, 540, 550.

Flow Diagrams

Figure 23:
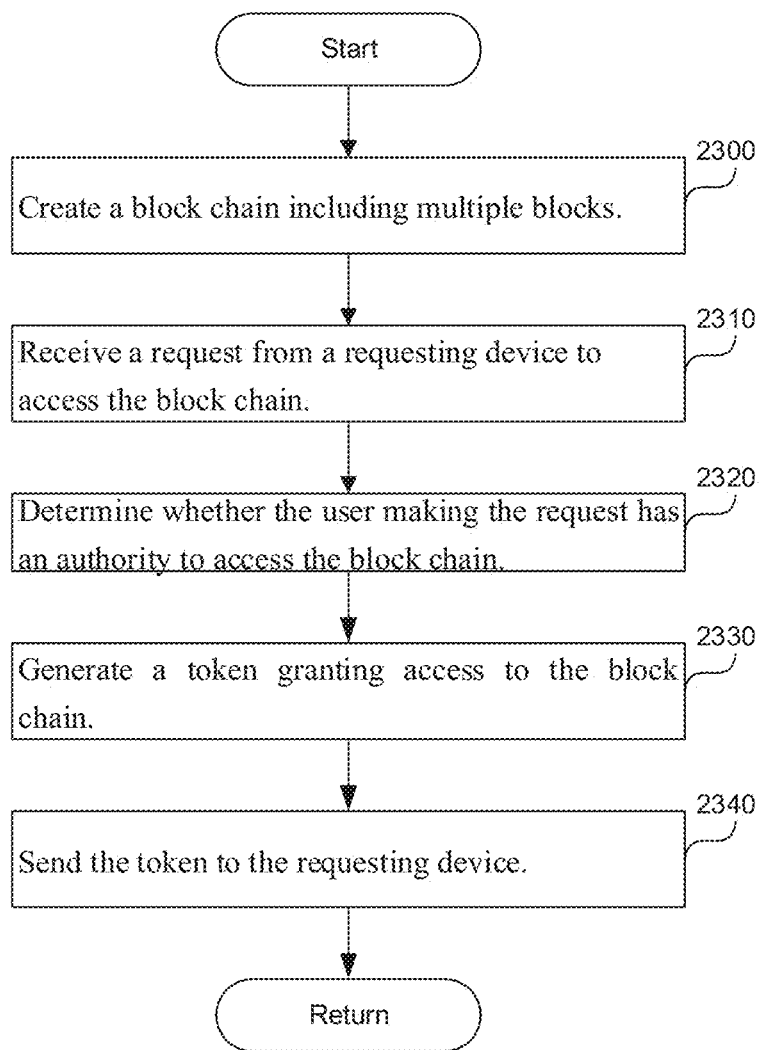
FIG. 23 is a flowchart of a method to generate a token providing authorization credentials.

FIG. 23 is a flowchart of a method to generate a token providing authorization credentials. In step 2300, a processor can create a block chain including multiple blocks by creating a block defining an authority of the user in appending the block to the end of the block chain. The block can include a cryptographic user ID identifying the user and an authority associated with the cryptographic user ID. The authority can define at least an operation associated with the cryptographic user ID to perform on the block chain. For example, the operation can include read access, write access, and/or read/write access to the block chain and/or to an encrypted data associated with the block chain. The block chain may not be encrypted.

In step 2310, the processor can receive a request from a requesting device to access the block chain. The request can include a cryptographic user ID associated with the user making the request, where the cryptographic user ID can be authorized by the block chain to perform certain operations. The requesting device can be a user device.

In step 2320, the processor can determine whether the user making the request has an authority to access the block chain by computing the authority recorded in the block chain including checking the block chain from an initial block to a last block. Performing the authority computation can be expensive, especially when the block chain is long.

In step 2330, the processor can generate a token granting access to the block chain to the user making the request upon determining that the user making the request has the authority to access the block chain. The token can be a certificate that proves the processor has done the expensive operation of, for example, computing the authority on the block chain, or checking the user's password. So, the next time the processor receives the token, the processor does not have to perform the expensive operation, and instead can check the token, which can be a cheaper operation than, for example, computing the authority in the block chain. In step 2340, the processor can send the token to the requesting device.

The token can include a message and an HMAC taking two arguments, namely, the message and a secret root key, as explained in this application. For example, the message can be a permission identifying the user authorized to access the block chain.

In one embodiment, when the user wants to read the block chain, the user can send a signed message providing the cryptographic user ID and identifying a portion of the block chain, such as a team and/or a space, that the user wants to read. A processor having access to the block chain can check the public key associated with the cryptographic user ID, the signature and the fact database to confirm that the cryptographic user ID has the permission to access the requested team and/or space. If the processor does not make the confirmation, the processor can deny access to the user. If the processor confirms that the user has authority to access the team and/or the space, the processor can create a token including the cryptographic user and an indication of the requested team and/or space. The token can grant a read permission to the cryptographic user ID.

To generate the token, the processor can create a key identifier identifying a secret root key. The key identifier can be implemented as an index into a database associated with the server. The secret root key can be further protected using public-key or secret-key encryption. The processor can create a permission to the block chain granted by the token, such as the user ID or the team and/or the space ID. Further, the processor can create a cryptographic hash of the secret root key and the permission. The cryptographic hash can be an HMAC. The processor can add the key identifier, the permission and the cryptographic hash to the token. The token can give read permission to the team and/or the space.

To determine whether the user making the request has the authority to act as the block chain, the processor can determine whether the request is signed with a recovery key without computing the authority recorded in the block chain. As explained in this application, the recovery key can override the authority recorded in the block chain. The processor can generate a second token granting unlimited access to the block chain to the user making the request upon determining that the request is signed with the recovery key.

To prevent attackers from gaining access to the recovery key, the recovery key can be separated into multiple parts, where each part is encrypted using a different secret encryption key, and each encrypted part is distributed among multiple devices such as HSMs.

To prevent attackers from gaining access to the system by compromising an endpoint, for example, a user device, the encrypted data can be additionally encrypted with a split key. The split key can be separated into two parts, the first part that is stored on a server, and the second part that is stored on the user device. To decrypt encrypted data, the user device has to request the first part of the split key, that is, the first cryptographic key, from the server. Upon receiving the request for the first cryptographic key, the server can determine whether the user device is permitted to receive the first cryptographic key.

For example, the user device can be reported as stolen and consequently not permitted to receive the first cryptographic key. The server can refuse to send the first cryptographic key upon determining that the user device is not permitted to receive the first cryptographic key. If the user device receives the cryptographic key, the user device can compute a key derivation function which is a combination of the first and the second cryptographic keys, such as HMAC, to obtain a key which can be used in decrypting the encrypted data.

The software updates to the computation of authority and/or policy stored in the block chain can be stored, themselves, in the block chain. The server can receive an update regarding an interpretation of semantics of the block chain. The server can ensure consistency of the interpretation of the semantics of the block chain across multiple user devices by storing the update within the block chain.

Figure 24:
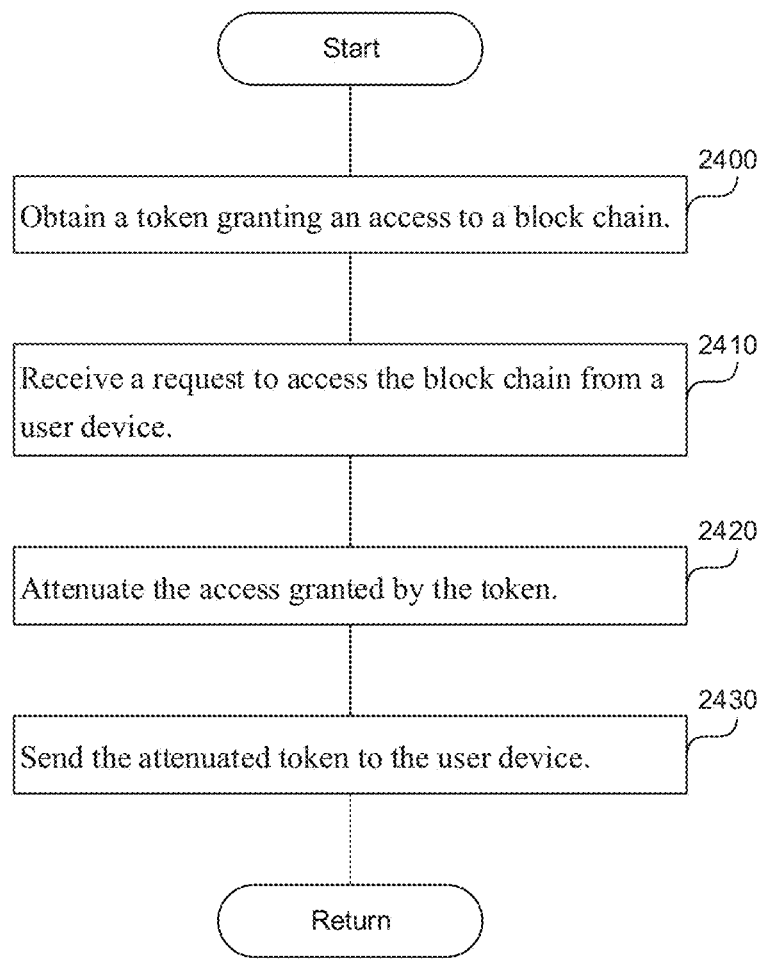
FIG. 24 is a flowchart of a method to create an attenuated token.

FIG. 24 is a flowchart of a method to create an attenuated token. In step 2400, a processor can obtain a token granting an access to a block chain. The access to the block chain can be permitted by a first authority source defined by the block chain. In other words, the first authority source can be the block chain recording authority and policy, itself. The token can include a key identifier identifying a secret root key, a first permission to access the block chain authorized by the first authority source and a first cryptographic hash of the secret root key and the permission. Access to the block chain can be granted based on whether the requester has read access to the encrypted data, or membership in the requested team and/or space.

The first permission can include a cryptographic user ID to whom the first permission is granted, and an identification of at least a portion of the block chain to which the cryptographic user ID has access, such as the team or space. The first permission can include an operation permitted to be performed by the cryptographic user ID, or the permitted operation may not be included and can be assumed that operation is read-only.

In step 2410, the processor can receive a request to access the block chain from a requesting device, with a second permission from a second authority source limiting access associated with the requesting device. The second authority source can be an access control server such as an active directory. The access control server can be part of an enterprise IT system.

The second permission can include a time limitation or a geolocation limitation. For example, the second permission can specify a time window within which the axis is permitted, or a geolocation within which access is permitted. In a more specific example, if the user leaves the building, access to the block chain can be revoked. The second permission can also include an Internet address limitation, for example, permitting access to the requesting device as long as the Internet protocol (IP) address of the requesting device is within a specified IP address range.

In step 2420, the processor can attenuate the access granted by the token by adding the second permission from the enterprise to the token, computing a second cryptographic hash of the first cryptographic hash and the second permission, and removing the first cryptographic hash from the token, thereby obtaining an attenuated token. The first permission and the second permission obtained from the first authority source and the second authority source, respectively, can be translated into multiple permissions and entries in the token and the attenuated token. In step 2430, the processor can send the attenuated token to the requesting device such as the user device.

To obtain the token, the processor can compute the authority stored in the block chain. The block chain can include multiple blocks wherein a block in the block chain defines an authority of a cryptographic user ID. The authority can define at least an operation associated with the cryptographic user ID to perform on the block chain. To determine whether the user making the request has an authority to access the block chain, the processor can compute the authority recorded in the block chain including checking the block chain from an initial block to a last block. The processor can generate the token granting access to the block chain to the user making the request upon determining that the user making the request has the authority to access the block chain.

The processor can grant access to the block chain upon receiving a valid token. The processor can receive a request to access a portion of the block chain and the attenuated token. The processor can obtain the secret root key using the key ID stored within the attenuated token. The processor can calculate the cryptographic hash of the secret root key and the first permission to obtain a third cryptographic hash. The processor can calculate the cryptographic hash of the third cryptographic hash and the second permission to obtain a fourth cryptographic hash. The processor can determine whether the second cryptographic hash included in the attenuated token matches the fourth cryptographic hash by comparing the second cryptographic hash included in the attenuated token and the fourth cryptographic hash. Upon determining that the second cryptographic hash included in the attenuated token and the fourth cryptographic hash match, the processor can grant the request to access the portion of the block chain. If the second cryptographic hash and the fourth cryptographic hash do not match, the processor can refuse to grant the request because the attenuated token is not valid.

The attenuated token can be attenuated further by adding additional permissions, that is, constraints or caveats, to the attenuated token. For example, the attenuated token holder may want to delegate a portion of his access to the block chain to a third party. Consequently, the attenuated token holder can request a creation of an additional attenuated token granting a portion of the access to the third party. For example, the token holder can specify specific blocks within the team to which the third party can have access.

To create an even further attenuated token, the processor can receive the attenuated token and a request for a third permission. In one embodiment, the processor can determine whether the third permission is authorized by the first permission and the second permission. For example, the first permission and the second permission may grant access to team 1 user Alice, while the third permission can request access to team 2. The processor can determine user Alice does not have access to team 2 and can refuse to create the attenuated token. In another example, upon determining that the third permission is authorized by the first permission and the second permission, the processor can create a second attenuated token by computing the cryptographic hash of the second cryptographic hash and the third permission, deleting the second cryptographic hash from the attenuated token, adding the third permission to the attenuated token, and adding the third cryptographic hash to the attenuated token, thereby creating the second attenuated token.

In another embodiment, the processor does not determine the validity of the permissions, and instead only creates the attenuated token. The validity of the permissions can be determined at the time when the validity of the token is determined. If the third permission requests data not granted by the first and second permissions, a null response can be provided to the requester.

The processor can grant the token based on a recovery key. The processor can determine whether the user making the request for the token has an authority to access the block chain by determining whether the request is signed with the recovery key without computing the authority recorded in the block chain. The processor can generate a second token granting unlimited access to the block chain to the user making the request upon determining that the request is signed with the recovery key. As described in this application, the processor can break up the recovery key into multiple parts, such as 30 parts, encrypt each part, distribute the encrypted key parts to multiple devices, and require participation of at least the majority of the devices to assemble the recovery key from the multiple parts.

To guard against an attacker infiltrating the system by compromising the user device, the processor can implement a split key, where the first cryptographic key is stored on the server, and the second cryptographic key is stored in the user device. When the processor receives the request for the first cryptographic key from the user device, the processor can determine whether the user device is permitted to receive the first cryptographic key upon receiving the request. For example, if the user device is reported as stolen, the processor does not permit the user device to receive the first cryptographic key stored on the server. If the user device receives the cryptographic key, the user device can perform a KDF which is a combination of the first and the second cryptographic key, such as HMAC, to obtain a key which can be used in decrypting encrypted data.

The processor can receive an update regarding an interpretation of semantics of the block chain. The processor can ensure consistency of the interpretation of the semantics of the block chain across multiple user devices by storing the update within the block chain.

To enforce time sensitive permissions, such as time sensitive permissions stored in the token, the processor can create a clock block chain including multiple blocks. Each block among the multiple blocks can include a timestamp greater than a timestamp of a preceding block. The processor can create a temporal relation between a block in the block chain and a clock block in the clock block chain. For example, a link between the block and the clock block can indicate that the block has been created before the clock block, after the clock block, at the same time as the clock block, within specified time after and/or before the clock block, etc.

The processor can receive the token including a time-limited permission, and a request to access a portion of the block chain. The processor can determine whether the time-limited permission is authorized by the clock block chain associated with the requested portion of the block chain. The processor can refuse the request to access the portion of the block chain upon determining that the time-limited permission is not authorized by the clock block chain. For example, the latest block in the clock block chain can be past the time-limited permission, or the requested portion of block chain has been created outside of the time-limited permission window, etc.

SNARKs

Figure 25:
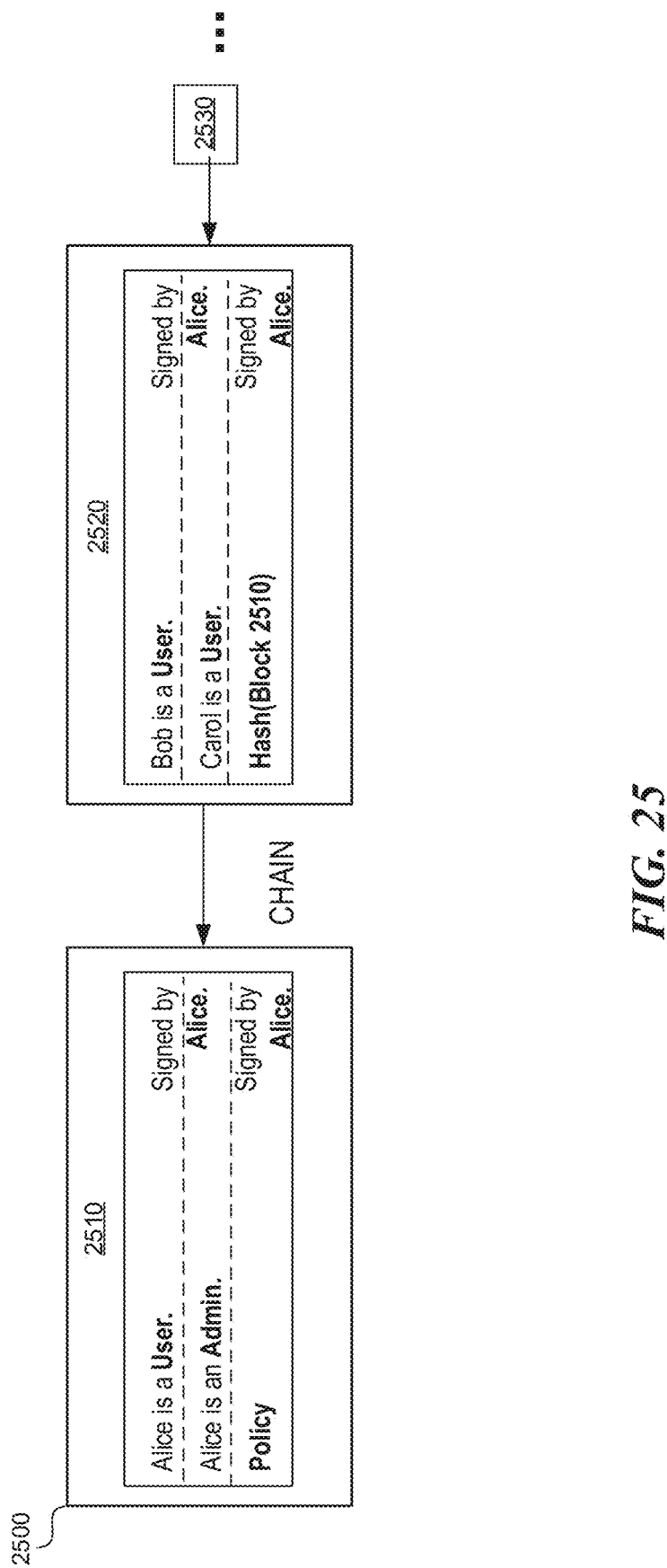
FIG. 25 shows the use of a computational checkpoint within a block chain.

FIG. 25 shows the use of a computational checkpoint within a block chain. The block chain 2500 can include blocks 2510, 2520, 2530. The block 2510, 2520 can contain information about policy and authority recorded in the block chain 2500. The block 2530 can include a computational checkpoint such as a succinct non-interactive argument of knowledge (SNARK) or a zero knowledge-SNARK (zk-SNARK).

A SNARK is a function that takes as input another function, such as function X, and an input to the function X, such as input X, and produces an output and a proof that the output is the proper output of function X (input X). Written differently, $$\text{SNARK (function X, input X)} \rightarrow \text{output, proof.} \quad (1)$$

The operation of applying function X to the input X to produce the output can be an expensive operation. For example, function X can be a proof of work function. However, using the proof, the output and input X, checking that the output is a valid output of function X (input X) is a fast computation. The proof is also succinct, meaning that the proof is small and takes little memory to store, regardless of how expensive function X is. The block 2530 can contain the proof, the output and input X.

In a zk-SNARK, knowledge of input X is not needed. Checking that the output is a valid output of function X (input X) can be done using the proof, the output and function X. A zero-knowledge proof is a method by which one party (the prover) can prove to another party (the verifier) that they know the input X, without conveying any information apart from the fact that they know the input X. For example, the prover can prove to the verifier that the prover knows a password to a file, without revealing the password. The prover can access the file, and show the file to the verifier, without showing the password. In another example, the prover can prove to the verifier that the prover possesses a private part of a cryptographic key pair, by having the verifier encrypt a message known only to the verifier using the public part of the cryptographic key pair. The prover can decrypt the message using the private part of the cryptographic key pair and show the decrypted message to the verifier, without disclosing the private part of the cryptographic key pair. When a zk-SNARK is used, the block 2530 can contain the proof, the output and function X. In a zk-SNARK, using the proof, the output and function X, the processor can check that the output is a valid output of function X (input X) without knowing input X.

zk-SNARKs allow one party (the prover) to prove to another (the verifier) that a statement is true, without revealing any information beyond the validity of the statement itself. For example, given the hash of a random number, the prover could convince the verifier that there indeed exists a number with this hash value, without revealing what the number is.

In a zk-SNARK, the prover can convince the verifier not only that the number exists, but that they in fact know the value of such a number—again, without revealing any information about the number.

zk-SNARK proofs can be verified within a few milliseconds, with a proof length of only a few hundred bytes even for statements about programs, function X, for example, that are very large and/or expensive to compute.

A SNARK or zk-SNARK can be recursive. A SNARK or a zk-SNARK can take an additional argument to the (zk-)SNARK function, such as a previous proof of the same type and a previous output of a SNARK or a zk-SNARK function. Written differently, $$\text{recursive (zk-)SNARK (function X, proof 1, output 1)} \rightarrow \text{output 2, proof 2,} \quad (2)$$

where proof 1 is the previous proof of the same type and output 1 is the previous output of a SNARK or a zk-SNARK function. The recursive SNARK function can be applied to the output 2 and proof 2 generated above to produce output 3 and proof 3. Proof 2 shows that output 1 is a valid output from function X, and that proof 1 is a valid proof. Proof 2, 3, . . . , N is also succinct and can prove that the prior proofs are valid.

SNARKs or zk-SNARKs can be used to check signatures in the block chain 2500, such as signatures in blocks 2510, 2520. The processor can check about 300 signatures per second. By using SNARKs or zk-SNARKs, the processor can perform the expensive computation of checking signatures once and can store the computational checkpoint 2530 in the block chain 2500. The computational checkpoint stored in block 2530 can be checked at a rate of about one million times per second.

To create the computational checkpoint, the SNARK or the zk-SNARK can take as inputs one or more blocks 2510, 2520 in the block chain 2500 and a signature checking function. In equation 1, the signature checking function is function X, and the one or more blocks 2510, 2520 are the input. The output can be whether the signatures are all valid, and the proof is that the output is correctly executed. Block 2530 can be periodically inserted into the block chain 2500 to create a checkpoint indicating that all the signatures up until block 2530 are valid.

SNARKs or zk-SNARKs can be used to check signatures, policy computation, authority, clock feeds to prove that the latest clock is correctly constructed and monotonically increasing, etc. For example, function X can validate that every block 2510, 2520 in the block chain 2500 is constructed based on the policy and the initial fact database. The origin block 2510 can define a policy and a fact database. A computational checkpoint in the block 2530 using a SNARK or a zk-SNARK can prove that some later block, after the origin block 2510, was correctly constructed from the origin block 2510 and the fact database. In this matter, a processor does not have to compute the correctness of a block chain that can be tens of thousands of blocks long.

The computational checkpoint in the block 2530 can also reduce network bandwidth usage because the server, such as server 100 in FIG. 1, can send to a requester the latest block, the current state of the fact database, and a proof that those two things are correct. That way, the requester does not have to download all the blocks in the block chain and does not have to perform the computation to check the correctness of the block chain.

Additionally, the server can reduce network bandwidth usage by avoiding transmission of the whole fact database to the requester. For example, the server can record the fact database as a Merkle tree. The server can transmit just the Merkle root of the whole fact database and the proof that the Merkle root is correctly constructed over the fact database that was constructed correctly over the policy. Consequently, the server can reduce network bandwidth usage on the order of gigabytes.

A requester can ask the server various questions about the block chain 2500, such as a list of users on a team. The server can provide the list of users on a team along with a proof that the list of users is correct. Similarly, the requester can ask whether a particular user is on a particular team and receive an answer and a proof that the answer is correct. Effectively, the server can act as a remote database, and the requester can check the server's answers with, approximately, less than 100 kilobytes worth of data to download, even if the block chain 2500 itself is arbitrarily large, such as a chain that has been built up over 20 years and whose size is measured in terabytes, petabytes, exabytes, zettabytes or yottabytes.

Figure 27:
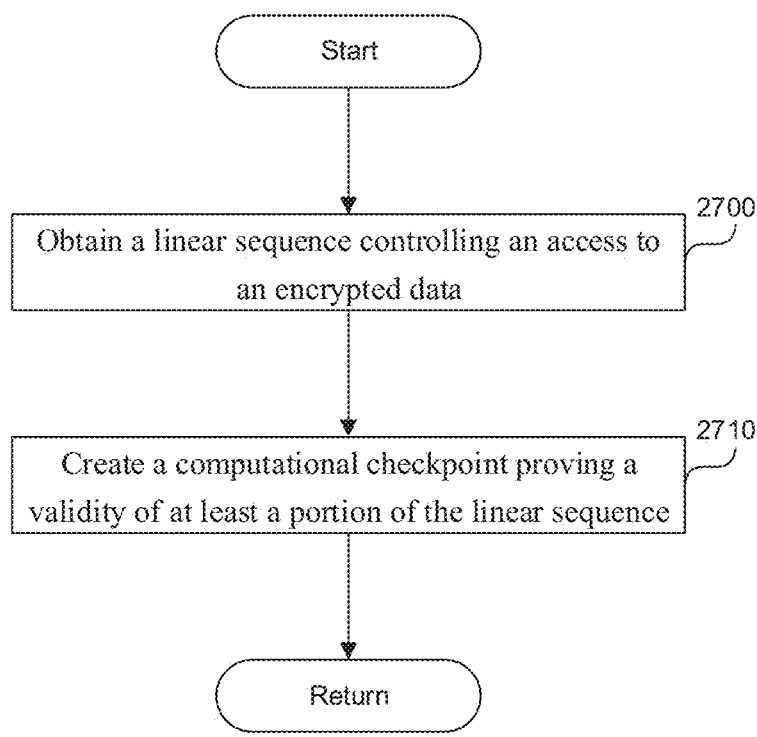
FIG. 27 is a flowchart of a method to efficiently compute validity of a block chain controlling access to an encrypted data.

FIG. 27 is a flowchart of a method to efficiently compute validity of a block chain controlling access to an encrypted data. In step 2700, a hardware or software processor, executing instructions described in this application, can obtain or create a linear sequence controlling an access to an encrypted data. The linear sequence can be a block chain and can include multiple blocks, as described in this application. A block among the multiple blocks can include a policy, a user profile, or an event including a change to the encrypted data, or a change to a plurality of users of the linear sequence.

The encrypted data can be stored in an encrypted file system. The linear sequence can define user permissions to the encrypted data. The user permissions can be defined through a policy and/or an authority. The policy can define a role and an authority associated with the role, and the authority can define a permission of a user to access at least a portion of the encrypted data.

For example, a policy can specify "only administrators have read/write permissions to files and can grant read/write (RW) permissions to files." If an administrator, for example, user A, grants a read permission to the user B, the resulting authority is RW permissions for user A and R permissions for user B. If the user who is not an administrator but has RW permissions to the files, for example, user C, grants a read permission to user B, the resulting authority is RW permissions for user C, and no permissions for user B.

In step 2710, the processor can create a computational checkpoint proving a validity of at least a portion of the linear sequence based on the policy and the authority defined in the linear sequence. The processor can perform an expensive computation from an initial block in the linear sequence to a selected block in the linear sequence, where the expensive computation validates each block between the initial block and the selected block, sequentially, based on the policy and the authority valid at the time that the block is added to the linear sequence. The selected block can be the last block in the linear sequence. The expensive computation can take minutes or hours to complete, depending on the number of blocks between the initial block and the selected block.

The processor can create a proof of the validity of at least the portion of the linear sequence based on the expensive computation and can store the proof after the selected block in the linear sequence. The computation to verify the proof is at least ten times faster than the expensive computation and can be performed approximately one million times a second. The memory footprint of the proof can be a few hundred bytes. The proof can be a SNARK or a zk-SNARK proof.

The processor can create multiple computational checkpoints along the linear sequence, for example, after the 500th block, after the 10,000th block, after the 100,000th block, etc. To compute the computational checkpoint after the 100,000th block, the processor can use the computational checkpoint that was inserted into the linear sequence after the 10,000th block, quickly verify the computational checkpoint, that is, the proof, and perform the expensive computation to verify the validity of the blocks between 10,000th block and the 100,000th block. Finally, the processor can insert a new computational checkpoint after the 100,000th block. In another example, the processor can periodically perform and insert computational checkpoints, such as after every thousand blocks in the linear sequence. The processor can recursively create and/or verify the multiple computational checkpoints.

The processor can prove validity of the portion of the linear sequence, for example, between the initial block and the selected block, by providing the proof, without performing the expensive computation. Thus, when the server storing the linear sequence receives a query for validity of the linear sequence, the server can transmit the computational checkpoint, without transmitting the blocks from which the computational checkpoint was created. Consequently, bandwidth usage and memory usage are reduced because the proof can be thousands of times smaller than the computational checkpoint. For example, the memory footprint of the linear sequence can exceed 1 GB, and a memory footprint of the proof is less than a kilobyte.

To create the proof, the processor can obtain a first function configured to take as input a second function and an input to the second function. The first function can be configured to produce an output and the proof that the output is the proper output of the second function given the input. The processor can execute the first function to obtain the output and the proof. The second function can be the expensive computation, verifying validity of the linear sequence. For example, the second function can validate that every block in the portion of the linear sequence is constructed according to the policy and fact database associated with the linear sequence. The input to the second function can be the linear sequence between the initial block and the selected block.

In one embodiment, the processor can check that the output is a valid output of the second function and the input using the proof, the output and the input, without performing the expensive computation. As a consequence, the processor can validate the proof at least a thousand times faster than performing the expensive computation because the proof validation is at least a thousand times faster than performing the expensive computation. The processor can be a processor of a requesting device that does not have access to the full linear sequence, or the processor can be associated with a server having access to the full linear sequence.

In another embodiment, the processor can check that the output is a valid output of the second function and the input using the proof, the output and the second function, without performing the expensive computation, for example, the second function, over the linear sequence. Consequently, the processor can validate the proof at least a thousand times faster than performing the expensive computation, and further, the processor can use at least a thousand times less memory because the memory required for the proof is at least a thousand times smaller than the memory required for the linear sequence.

To perform the expensive computation, the processor can iterate over the portion of the linear sequence from the initial block to the selected block and check validity of signatures, policy, authority, or a clock feed contained in the portion of the linear sequence.

To reduce network bandwidth usage via the computational checkpoint, the processor can receive from a requester a request for a second block in the linear sequence. The processor can send to the requester the second block, and a fact set containing the policy and the authority associated with a creation of the second block, and a second proof that the second block and the fact set are correct. Consequently, the processor can reduce the network bandwidth usage by not sending the linear sequence preceding the second block to the requester.

For example, the second block can include an event where user B modifies file F1. The policy contained in the fact set can state that the user with write (W) permission can modify a file, and the authority in the fact set can state that user B has RW permission to file F1. The second proof can prove that the fact set is correct, and thus prove that the operation recorded in the second block is correct. As can be seen in this example, the requester does not have to download the whole fact set and perform the computation to check that the fact that is correct is based on the initial block in the initial fact set. Instead, the requester can rely on the second proof to speed up the verification.

The processor can create the fact database indicating the user and a role of the user associated with the linear sequence. The processor can configure the fact database to be read when deciding if an event is valid and acceptable to the linear sequence.

For example, the fact database can indicate that user A is an administrator, while the initial block in the linear sequence can indicate the initial policy, namely, that administrators can add new users to the linear sequence. If a block, containing an event where user A adds user B to the linear sequence, needs to be added to the linear sequence, the processor can check the fact database and the current policy to confirm that user A is authorized to add user B. If, at a later time, a block containing an event where user B adds user C is requested to be added to the linear sequence, the processor can check the fact database and determine that user B is not an administrator. Consequently, the processor can reject adding the block containing user B adding user C.

The processor can prove that the fact database is valid in a network bandwidth and memory efficient manner, without transmitting the whole fact database to be checked. Specifically, the processor can create a hash tree of the fact database, where a value of a root of the hash tree is unique to the multiple facts contained in the fact database, and where each fact among the multiple facts is used in generating the hash tree, as explained in FIG. 17. The processor can compute a proof that the root of the hash tree is correctly constructed from the plurality of facts, and that the plurality of facts conform to the policy. The processor can reduce network bandwidth usage by transmitting the root of the hash tree and the proof to show that the fact database is valid, thereby avoiding transmission of the whole fact database. Consequently, the server can reduce network bandwidth usage at least on the order of gigabytes.

The processor can receive from a requester a request regarding the linear sequence. The processor can provide an answer to the request and a proof that the answer is correct, without providing the linear sequence to the requester, thereby reducing network bandwidth usage.

The request can include: a request for a list of users in the linear sequence, a question whether a user is associated with the linear sequence, a role of the user in the linear sequence, authority of the user in the linear sequence, which users have read/write permissions to which files, etc.

File System on a Block Chain

FIG. 26A shows a file system implemented using a block chain. The block chain 2600 can contain a file creation event 2610 which includes a file index 2620. The file index 2620 is connected to a chunk index 2630 and stored in an object store 2635, which can be a memory storing the file system. The chunk index 2630 has the memory location of all the chunks 2640, 2650 (only two shown for brevity) storing portions, or chunks, of the file. One file can be represented by one or more chunks 2640, 2650. The chunks 2640, 2650 can be encrypted with at least two keys, the channel session key 2642, 2652, respectively and an AES file encryption key 2644, 2654, respectively. A chunk 2640, 2650 can belong to multiple chunk indices, if two files share the same data.

When a file is modified, the chunk, such as chunk 2640, where the modification occurred is copied and modified to obtain chunk 2640A. The chunk index 2630 is updated to point to the chunk 2640A, while the old chunk 2640 can remain within the system. Depending on the system policy, the old chunk 2640 can be used for revision control or can be garbage collected, as explained below.

The ability to modify only chunks of files leads to the file system scalability. Sometimes a file can occupy gigabytes of memory, and every time the file is edited, the system does not create a new copy of the file. Instead, only the portion of the file that has been edited can be copied.

Each block 2610, file index 2620 and chunk index 2630 are either not encrypted or are encrypted with the key known to the processor performing the garbage collection. To perform the garbage collection, a processor can examine each block 2610 in the block chain 2600 and determine all the chunks 2640, 2650 that are referenced by a block in the block chain 2600. The chunks that are not referenced by a block in the block chain can be garbage collected, which will free up that memory.

When the processor is asked to delete a file or a chunk, the processor does not have to delete the file or the chunk immediately. The processor can update the chunk index 2630 to not point to the deleted chunk, by, for example, deleting the link 2646 and creating the link 2648. The deleted chunk 2640 can later be collected by garbage collection. Consequently, the processor does not have to slow down the transaction performing the deletion.

To implement a version control system, the old chunk 2640 can be marked with a version number such as 1, 2, 3, etc., where the higher version number indicates the more recent chunk 2640. The garbage collection policy can be set to various preferences such as never delete the chunks marked with a version number, or delete chunks that are older than five versions. In addition, or alternatively, to determine the version number of an old chunk, the new chunk 2640A can point to the old chunk 2640, which in turn can point to a previous chunk, thus creating an ordered chain, indicating the age of a chunk.

Figure 26B:
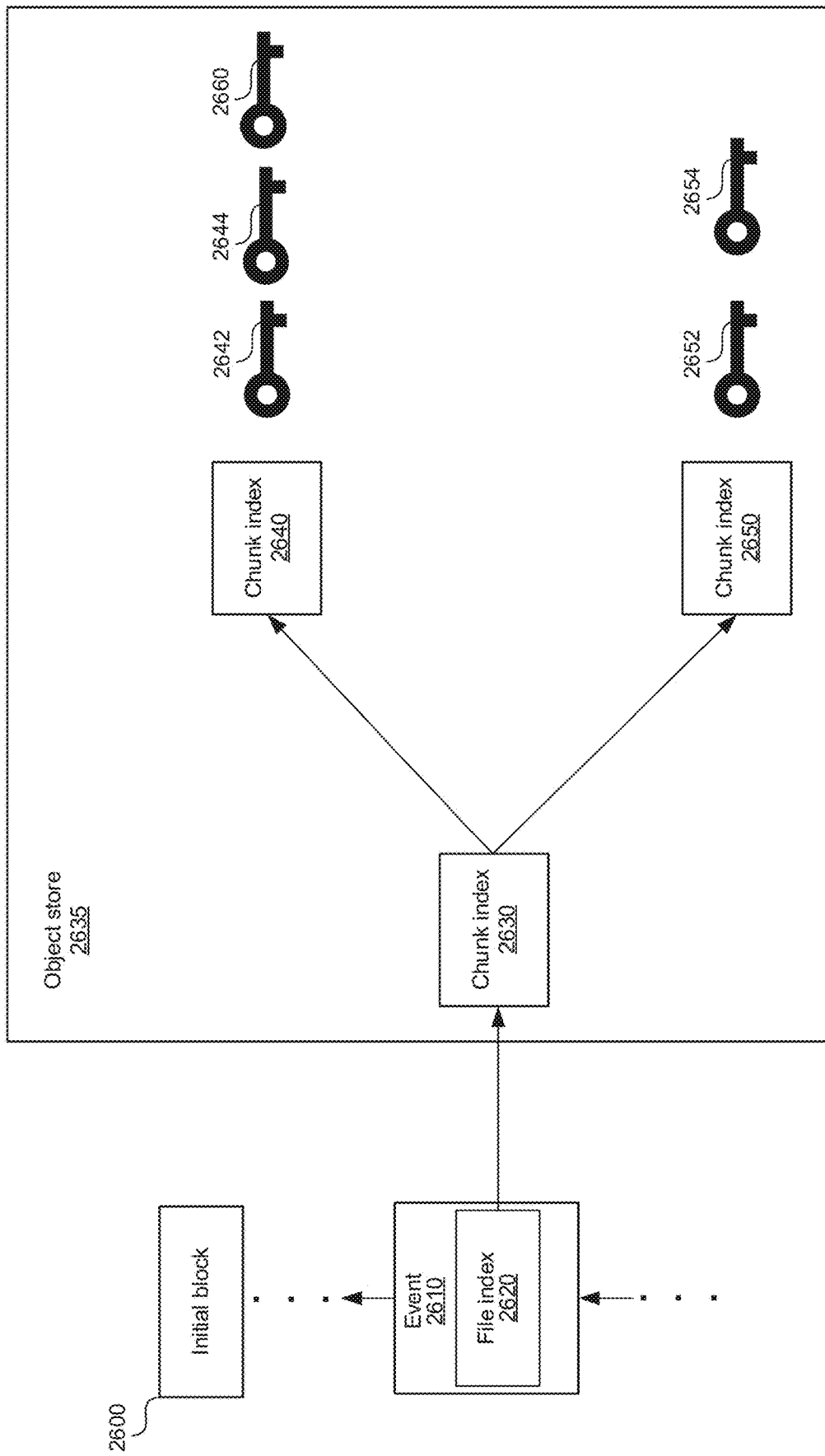
FIG. 26B shows a deletion of a file or a portion of a file in a file system implemented using a block chain.

FIG. 26B shows a deletion of a file or a portion of a file in a file system implemented using a block chain. To delete a file or a portion of the file, such as chunk 2640, the system can remove the link from the chunk index 2630 to the chunk 2640 and encrypt the chunk 2640 with a third key 2660 that is subsequently forgotten. Consequently, the chunk 2640 cannot be accessed.

In one embodiment, an HSM can manage a tree of encryptions that eventually leads to a key 2660 managed by HSM. For example, the tree of encryptions can be the key 2660, encrypted by the AES key 2644, in turn encrypted by the channel session key 2642. To decrypt the chunk 2640, all three keys 2642, 2644 and 2660 are needed. If the HSM forgets the key 2660, the chunk 2640 cannot be decrypted, and the chunk 2640 is deleted, for all practical purposes.

Figure 28:
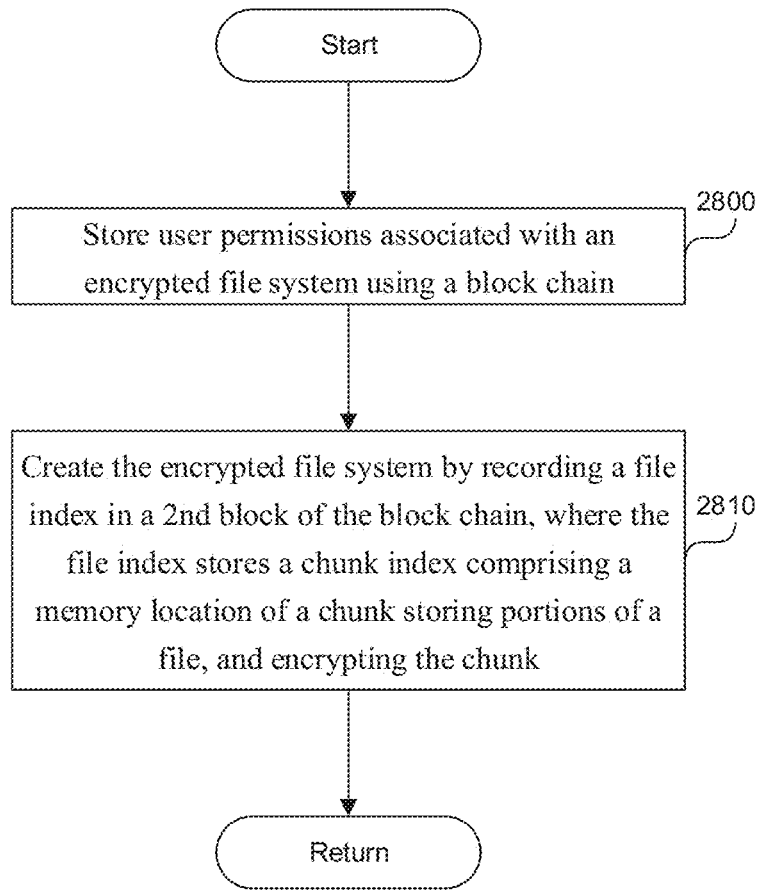
FIG. 28 is a flowchart of a method to create an encrypted file system using a block chain.

FIG. 28 is a flowchart of a method to create an encrypted file system using a block chain. In step 2800, a processor can store user permissions associated with an encrypted file system using a linear sequence, such as a block chain. The linear sequence can include multiple blocks. The processor can create a block chain controlling an access to the encrypted file system.

A first block, such as an initial block, in the linear sequence can define a user permission to access at least a portion of the encrypted file system. The user permission can be expressed via a policy and/or an authority. The policy can define a role and an authority associated with the role, and the authority can define a permission of a user to access at least a portion of the encrypted file system.

In step 2810, the processor can create the encrypted file system by recording a unique file identifier (ID), such as a file index, in a second block of the linear sequence. The unique file ID can include a chunk index, for example, a memory map, containing a memory location of a chunk storing a portion of a file associated with the encrypted file system. A chunk is an area of computer memory that stores information contained in the file. The chunk can include a header which indicates some parameters (e.g., the type of chunk, comments, size, etc.). Following the header can be a variable area containing data, which is decoded by the processor from the parameters in the header. A single chunk can belong to multiple files in the encrypted file system.

The processor can encrypt the chunk using a channel session key, which is a cryptographic key computed based on information known to users granted at least a temporary access to the chunk. The chunk can also be encrypted using additional encryption keys such as a file encryption key common to the whole encrypted file system.

The processor can create the encrypted file system that is scalable. The operations of the file system can be fast because the processor can use the unique file ID, and the chunk index, to quickly locate the relevant file and/or and the relevant portion of the file. Further, the memory footprint of the file system can be optimized because a portion of the file, for example, a chunk, can be shared between multiple files.

To create the scalable file system, the processor can receive a modification to the chunk of the file. The modification can include the unique file ID and an ID of one or more chunks to modify. In some embodiments, the processor can receive the modified, encrypted chunk. The processor can identify the chunk index of the file using the unique file ID stored in the linear sequence. Based on the chunk index, the processor can find the one or more chunks containing the modification.

The processor can modify the file, without creating a copy of the file, by creating a second chunk, modifying the second chunk to include the modification to the chunk, updating the chunk index to include a memory location of the second chunk, and finally, removing from the chunk index the memory location of the chunk. Since the chunk is not part of the chunk index, the chunk can be garbage collected at a later time.

The processor can delete the chunk in several ways. In one embodiment, the processor, upon removing the chunk memory address from a chunk index, can determine a chunk index of another file points to the chunk. If no other chunk index points to the chunk, the processor can delete the chunk.

In another embodiment, the processor can leave the chunk for later deletion by, for example, performing garbage collection. The processor can examine each block in the linear sequence to determine whether the chunk considered for garbage removal is part of the file associated with encrypted file system. The processor can trace the operations recorded in the linear sequence associated with the chunk and can determine whether the chunk is part of a file in the encrypted file system. Upon completing the examination and determining that the chunk is not part of the file associated with encrypted file system, the processor can delete the chunk.

For example, the linear sequence can record that the chunk is added to a first file in the encrypted file system, added to a second file an encrypted file system, and deleted from the first file in the encrypted file system. Consequently, the processor can determine that the chunk should not be deleted from the linear sequence because the chunk is still a part of the second file. In another example, the linear sequence can record the chunk is initially added to the first file, and later deleted from the first file. Consequently, the processor can determine that the chunk should be deleted from the linear sequence, and can delete the chunk.

In either of the above embodiments, the processor can delete the chunk in several ways. For example, the processor can encrypt the chunk with a second cryptographic key, and can delete the second cryptographic key, thereby leaving an unreadable section of memory with no chunk index pointing to it. In another example, the processor can configure a hardware security module to store a second cryptographic key specific to the chunk, for example, when the chunk is created. Upon deletion, the processor can instruct the hardware security module to delete the second cryptographic key.

Instead of deleting the previous chunk, the processor can implement a version control system. The processor can create a link between the second chunk and the chunk. The number of links between the second chunk and the chunk can indicate an age of the chunk. The processor can receive a request for an earlier version of the second chunk and an indication of an age of the earlier version. The processor can identify the earlier version of the second chunk using the link, the number of links, and the indication of the age of the earlier version. The processor can provide the earlier version of the second chunk.

The processor can revoke a permission of a first user to access the chunk while maintaining a permission of a second user to access the chunk. For example, an administrator A, who according to policy has the authority to determine read and write permissions for a chunk, can revoke the read permission to a file F1 including the chunk for user B, but preserve the read permission for user C. To revoke the permission for user B, the processor can compute a second cryptographic key based on information accessible to the second user, user C, and not accessible to the first user, user B. The processor can encode the chunk using the second cryptographic key. The information accessible to user C, but not accessible to user B can be a portion of the linear sequence to which user C has access, but user B does not. For example, the information can be the last block in the linear sequence representing the space to which user C belongs, but user B does not.

Computer

Figure 29:
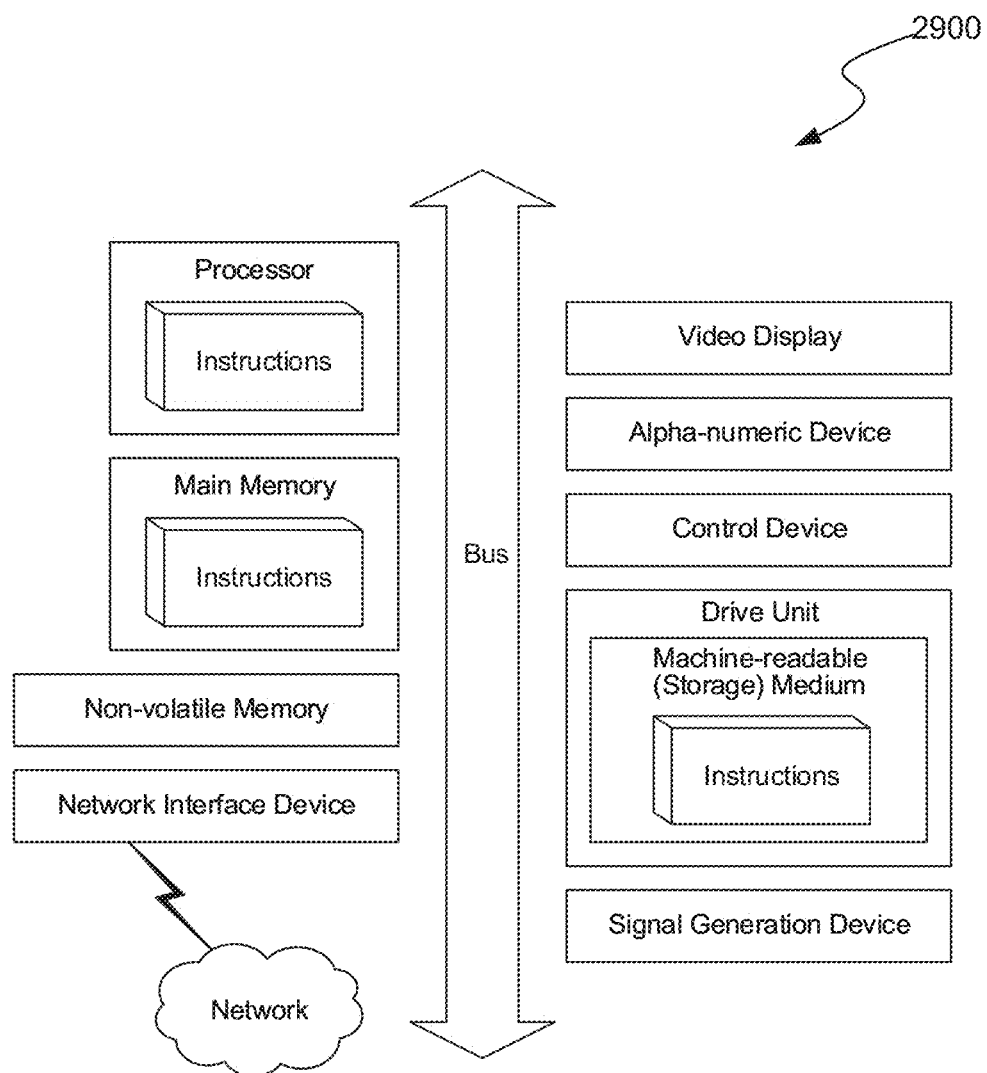
FIG. 29 is a diagrammatic representation of a machine in the example form of a computer system within which a set of instructions, for causing the machine to perform any one or more of the methodologies or modules discussed herein, may be executed.

FIG. 29 is a diagrammatic representation of a machine in the example form of a computer system 2900 within which a set of instructions, for causing the machine to perform any one or more of the methodologies or modules discussed herein, may be executed.

In the example of FIG. 29, the computer system 2900 includes a processor, memory, non-volatile memory, and an interface device. Various common components (e.g., cache memory) are omitted for illustrative simplicity. The computer system 2900 is intended to illustrate a hardware device on which any of the components described in the example of FIGS. 1-28 (and any other components described in this specification) can be implemented. The computer system 2900 can be of any applicable known or convenient type. The components of the computer system 2900 can be coupled together via a bus or through some other known or convenient device.

The computer system 2900 can represent the server such as 100 in FIG. 1, 750 in FIG. 7, 1000 and FIG. 10 A, 1140 in FIGS. 11 A-C, 1400 in FIG. 14, 1500 in FIG. 15. The computer system 2900 can represent the devices, such as 110-116 FIG. 1, 700-720 in FIG. 7, 1010-1030 in FIG. 10 A, 1100-1120 in FIGS. 11 A-11 C, 1440 in FIG. 14, 1540 in FIG. 15, 1450 FIG. 15, 1550 in FIG. 15. The processor of the system 2900 can perform the various methods and instructions described in this application. The main memory, non-volatile memory, and/or the drive unit of the system 2900 can store the instructions to be performed by the processor, and/or can store the object store 2635 in FIGS. 26A-B. The devices 1110-1160, 700-720, 1010-1030, 1100-1120, and the server 100, 750, 1000, 1140, 1400, 1500, 1440, 1540 can communicate with each other using the network interface device of the system 2900. For example, the token 1480, 1494 in FIG. 14, 1580, 1594 in FIG. 15 can be communicated via the network interface of the system 2900.

This disclosure contemplates the computer system 2900 taking any suitable physical form. As example and not by way of limitation, computer system 2900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 2900 may include one or more computer systems 2900; be unitary or distributed; span multiple locations; span multiple machines; or reside in a cloud, which may include one or more cloud components in one or more networks. Where appropriate, one or more computer systems 2900 may perform without substantial spatial or temporal limitation one or more steps of one or more methods described or illustrated herein. As an example and not by way of limitation, one or more computer systems 2900 may perform in real time or in batch mode one or more steps of one or more methods described or illustrated herein. One or more computer systems 2900 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 2900. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 2900. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 29 reside in the interface.

In operation, the computer system 2900 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The language used in the specification has been principally selected for readability and instructional purposes, and it may not have been selected to delineate or circumscribe the inventive subject matter. It is, therefore, intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method comprising:
creating a block chain controlling an access to an encrypted file system, the block chain comprising a plurality of blocks,
wherein the block chain defines a policy or an authority,
wherein the policy defines a role and the authority associated with the role,
and wherein the authority defines a permission of a user to access at least a portion of the encrypted file system;
creating a computational checkpoint proving a validity of the block chain based on the policy and the authority defined in the block chain, by:
performing an expensive computation from an initial block in the block chain to a last block in the block chain,
wherein the expensive computation validates each block between the initial block and the last block based on the policy and the authority stored in the block chain;
creating a proof of the validity of the block chain based on the expensive computation;
storing the proof after the last block in the block chain; and
verifying validity of the block chain by examining the proof, without performing the expensive computation.

2. The method of claim 1, wherein said verifying the validity is at least ten times faster than performing the expensive computation.

3. The method of claim 1, wherein a memory footprint of the block chain exceeds a memory footprint of the proof by more than 1,000 times.

4. A method comprising:
obtaining a linear sequence controlling an access to an encrypted data, the linear sequence comprising a plurality of blocks,
wherein the linear sequence defines a policy or an authority,
wherein the policy defines a role and the authority associated with the role,
and wherein the authority defines a permission of a user to access at least a portion of the encrypted data;
creating a computational checkpoint proving a validity of at least a portion of the linear sequence based on the policy and the authority defined in the linear sequence, by:

performing an expensive computation from an initial block in the linear sequence to a selected block in the linear sequence,
wherein the expensive computation validates each block within the initial block and the selected block based on the policy and the authority;
creating a proof of the validity of at least the portion of the linear sequence based on the expensive computation; and
storing the proof after the selected block in the linear sequence,
wherein the proof is configured to be verified by a computation faster than the expensive computation.

5. The method of claim 4, wherein the proof is configured to be verified by a computation at least ten times faster than the expensive computation.

6. The method of claim 4, comprising:
proving validity of at least the portion of the linear sequence by providing the proof, without performing the expensive computation.

7. The method of claim 4, said creating the proof comprising:
obtaining a first function configured to take as input a second function and an input to the second function, and to produce an output and the proof that the output is a proper output of second function given the input; and
executing the first function to obtain the output and the proof.

8. The method of claim 7, comprising:
checking that the output is a valid output of the second function and the input using the proof, the output and the input.

9. The method of claim 7, comprising:
checking that the output is a valid output of the second function and the input using the proof, the output and the second function.

10. The method of claim 7, wherein the second function is configured to validate that each block in the portion of the linear sequence is constructed according to the policy.

11. The method of claim 4, wherein a memory footprint of the linear sequence exceeds a 1 GB, and wherein a memory footprint of the proof is less than a kilobyte.

12. The method of claim 4, performing the expensive computation comprising:
iterating over the portion of the linear sequence from the initial block to the selected block and checking a validity of signatures, the policy, the authority, or a clock feed contained in the portion of the linear sequence.

13. The method of claim 4, the block in the plurality of blocks comprising the policy, a user profile, or an event including a change to the encrypted data, or a change to a plurality of users of the linear sequence.

14. The method of claim 4, reducing network bandwidth usage via the computational checkpoint by:
receiving from a requester a request for a second block in the linear sequence;
sending to the requester the second block, and a fact set containing the policy and the authority associated with a creation of the second block, and a second proof that the second block and the fact set are correct, thereby reducing the network bandwidth usage by not sending the linear sequence preceding the second block to the requester.

15. The method of claim 4, comprising:
creating a fact database indicating the user and the role of the user associated with the linear sequence, wherein the fact database is configured to be read when deciding if an event is valid and acceptable to the linear sequence.

16. The method of claim 15, comprising:
proving that the fact database is valid by:
creating a hash tree of the fact database, wherein a value of a root of the hash tree is unique to a plurality of facts in the fact database, wherein the plurality of facts is used in generating the hash tree;
computing a proof that the root of the hash tree is correctly constructed from the plurality of facts, and that the plurality of facts conform to the policy; and
reducing network bandwidth usage by transmitting the root of the hash tree and the proof to show that the fact database is valid, thereby avoiding transmission of the whole fact database.

17. The method of claim 4, comprising:
receiving from a requester a request regarding the linear sequence; and
providing an answer to the request and a proof that the answer is correct, without providing the linear sequence to the requester, thereby reducing network bandwidth usage.

18. The method of claim 17, the request comprising a request for a list of users in the linear sequence, or a question whether the user is associated with the linear sequence.

19. A system comprising:
at least one processor; and
memory coupled to the at least one processor, the memory comprising computer executable instructions that, when executed by the at least one processor, perform a method comprising:
obtaining a linear sequence controlling an access to an encrypted data, the linear sequence comprising a plurality of blocks,
wherein a block in the plurality of blocks defines a user permission to access at least a portion of the encrypted data;
creating a computational checkpoint proving a validity of at least a portion of the linear sequence based on the user permission defined in the linear sequence, by:
performing an expensive computation from an initial block in the linear sequence to a selected block in the linear sequence,
wherein the expensive computation validates each block within the initial block and the selected block based on the user permission;
creating a proof of the validity of at least the portion of the linear sequence based on the expensive computation; and
storing the proof after the selected block in the linear sequence,
wherein the proof is configured to be verified by a computation faster than the expensive computation.

20. The method of claim 19, wherein the proof is configured to be verified by a computation at least ten times faster than the expensive computation.

21. The system of claim 19, the processor performing the method comprising:
verifying the validity of at least the portion of the linear sequence by examining the proof, without performing the expensive computation.

22. The system of claim 19, the processor creating the proof comprising the processor performing the method comprising:
- obtaining a first function configured to take as input a second function and an input to the second function, and to produce an output and the proof that the output is a proper output of second function given the input; and
- executing the first function to obtain the output and the proof.

23. The system of claim 22, the processor performing the method comprising:
- checking that the output is a valid output of the second function and the input using the proof, the output and the input.

24. The system of claim 22, the processor performing the method comprising:
- checking that the output is a valid output of the second function and the input using the proof, the output and the second function.

25. The system of claim 22, the second function configured to validate that each block in the portion of the linear sequence is constructed according to a policy.

26. The system of claim 19, wherein a memory footprint of the linear sequence exceeds a memory footprint of the proof by more than 1,000 times.

27. The system of claim 19, the processor performing the expensive computation comprising the processor performing the method comprising:
- iterating over the portion of the linear sequence from the initial block to the selected block and checking a validity of signatures, a policy, the authority, or a clock feed contained in the portion of the linear sequence.

28. The system of claim 19, the block in the plurality of blocks comprising a policy, a user profile, or an event including a change to the encrypted data, or a change to a plurality of users of the linear sequence.

29. The system of claim 19, the processor reducing network bandwidth usage via the computational checkpoint comprising the processor performing the method comprising:
- receiving from a requester a request for a second block in the linear sequence; and
- sending to the requester the second block, and a fact set containing a user permission associated with a creation of the second block, and a second proof that the second block and the fact set are correct, thereby reducing the network bandwidth usage by not sending the linear sequence preceding the second block to the requester.

30. The system of claim 19, the processor performing the method comprising:
- creating a fact database indicating a user and a role of the user associated with the linear sequence, wherein the fact database is configured to be read when deciding if an event is valid and acceptable to the linear sequence.

31. The system of claim 30, the processor performing the method comprising: proving that the fact database is valid by:
- creating a hash tree of the fact database, wherein a value of a root of the hash tree is unique to a plurality of facts in the fact database, wherein the plurality of facts is used in generating the hash tree;
- computing a proof that the root of the hash tree is correctly constructed from the plurality of facts, and that the plurality of facts conform to user permissions; and
- reducing network bandwidth usage by transmitting the root of the hash tree and the proof to show that the fact database is valid, thereby avoiding transmission of the whole fact database.

32. The system of claim 19, the processor performing the method comprising:
- receiving from a requester a request regarding the linear sequence; and
- providing an answer to the request and a proof that the answer is correct, without providing the linear sequence to the requester, thereby reducing network bandwidth usage.

33. The system of claim 32, the request comprising a request for a list of users in the linear sequence, or a question whether a user is associated with the linear sequence.

* * * * *